United States Patent
Im et al.

(10) Patent No.: US 10,712,596 B2
(45) Date of Patent: Jul. 14, 2020

(54) LIQUID CRYSTAL DISPLAY

(71) Applicant: Samsung Display Co., Ltd., Yongin, Gyeonggi-Do (KR)

(72) Inventors: Wan-Soon Im, Cheonan-si (KR); MinWook Park, Asan-si (KR); SuWan Woo, Osan-si (KR); Eun-Kil Park, Cheonan-si (KR); Jeongman Son, Suwon-si (KR); Changil Tae, Seoul (KR); Kee-Bum Park, Cheonan-si (KR); Kyung-Bae Kim, Yongin-si (KR); Je Hyeong Park, Hwaseong-si (KR); Joohwan Park, Yongin-si (KR); Yu Deok Seo, Hwaseong-si (KR); Seungho Yang, Hwaseong-si (KR); Sejoon Oh, Suwon-si (KR); Heehwan Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 382 days.

(21) Appl. No.: 14/288,553

(22) Filed: May 28, 2014

(65) Prior Publication Data

US 2015/0036073 A1 Feb. 5, 2015

(30) Foreign Application Priority Data

Aug. 2, 2013 (KR) .................. 10-2013-0092200
Aug. 2, 2013 (KR) .................. 10-2013-0092203
(Continued)

(51) Int. Cl.
*G02F 1/1333* (2006.01)
*G02F 1/1337* (2006.01)
(Continued)

(52) U.S. Cl.
CPC ...... *G02F 1/1333* (2013.01); *G02F 1/133753* (2013.01); *G02F 1/134336* (2013.01);
(Continued)

(58) Field of Classification Search
CPC .......................................... G02F 2001/134345
See application file for complete search history.

(56) References Cited

U.S. PATENT DOCUMENTS 5,273,475 A  12/1993 Oshikawa
5,739,882 A  4/1998 Shimizu et al.
(Continued)

FOREIGN PATENT DOCUMENTS

CN  101201486 A  6/2008
CN  101464582 A  6/2009
(Continued)

OTHER PUBLICATIONS

English language machine translation of Korean Office Action for Application No. 10-2013-0092203 dated Jul. 8, 2019 (Year: 2019).*

(Continued)

*Primary Examiner* — Edward J Glick
*Assistant Examiner* — Mark D Teets
(74) *Attorney, Agent, or Firm* — Cantor Colburn LLP

(57) ABSTRACT

A liquid crystal display includes a display substrate which includes a plurality of pixel areas and is curved in a first direction, an opposite substrate which faces the display substrate, is coupled to the display substrate, and is curved along the display substrate, and a liquid crystal layer disposed between the display substrate and the opposite substrate, where a plurality of domains are defined in each of the plurality of pixel areas, directions in which liquid crystal molecules of the liquid crystal layer are aligned are different from each other in at least two domains among the plurality (Continued)

of domains, and the plurality of domains is arranged in a second direction crossing the first direction.

45 Claims, 42 Drawing Sheets

(30) Foreign Application Priority Data

| Aug. 27, 2013 | (KR) | ................ 10-2013-0101907 |
| Sep. 11, 2013 | (KR) | ................ 10-2013-0109223 |
| Sep. 13, 2013 | (KR) | ................ 10-2013-0110647 |
| Oct. 16, 2013 | (KR) | ................ 10-2013-0123515 |

(51) Int. Cl.
*G02F 1/1343* (2006.01)
*G02F 1/1362* (2006.01)

(52) U.S. Cl.
CPC .......... *G02F 1/136209* (2013.01); *G02F 2001/133757* (2013.01); *G02F 2001/134318* (2013.01); *G02F 2001/134345* (2013.01); *G02F 2001/136218* (2013.01)

(56) References Cited

U.S. PATENT DOCUMENTS

| 6,384,882 | B1 | 5/2002 | Nagayama et al. |
| 6,630,971 | B1 | 10/2003 | Woo et al. |
| 6,856,368 | B2 | 2/2005 | Terashita et al. |
| 6,940,575 | B2 | 11/2005 | Sunohara et al. |
| 7,057,698 | B2 | 6/2006 | Chung et al. |
| 7,209,205 | B2 | 4/2007 | Yoshida et al. |
| 7,295,275 | B2 | 11/2007 | Ko |
| 7,430,032 | B2 | 9/2008 | Hong |
| 7,683,990 | B2 | 3/2010 | Li et al. |
| 7,773,165 | B2 | 8/2010 | Sohn et al. |
| 7,812,909 | B2 | 10/2010 | Cho et al. |
| 7,834,962 | B2 | 11/2010 | Satake et al. |
| 7,978,295 | B2 | 7/2011 | Tasaka et al. |
| 7,986,394 | B2 | 7/2011 | Kamoshida |
| 7,999,879 | B2 | 8/2011 | Yoshida et al. |
| 8,077,269 | B2 | 12/2011 | Kim et al. |
| 8,085,366 | B2 | 12/2011 | Chang |
| 8,098,354 | B2 | 1/2012 | Kim et al. |
| 8,174,472 | B2 | 5/2012 | Lee |
| 8,189,155 | B2 | 5/2012 | Chan et al. |
| 8,218,114 | B2 | 7/2012 | Kataoka |
| 8,253,874 | B2 | 8/2012 | Kim et al. |
| 8,264,651 | B2 | 9/2012 | Cho et al. |
| 8,325,306 | B2 | 12/2012 | Nakanishi et al. |
| 8,325,313 | B2 | 12/2012 | Wang et al. |
| 8,421,972 | B2 | 4/2013 | Ohgami et al. |
| 8,427,594 | B2 | 4/2013 | Kim et al. |
| 8,427,621 | B2 | 4/2013 | Jung et al. |
| 8,570,473 | B2 | 10/2013 | Li et al. |
| 8,593,386 | B2 | 11/2013 | Kim |
| 8,629,447 | B2 | 1/2014 | Baek et al. |
| 9,057,917 | B2 | 6/2015 | Choi et al. |
| 9,176,344 | B2 | 11/2015 | Jeong et al. |
| 9,400,408 | B2 * | 7/2016 | Park ............ G02F 1/134336 |
| 9,472,581 | B2 * | 10/2016 | Woo ............ G02F 1/1368 |
| 9,508,748 | B2 * | 11/2016 | Park ............ G02F 1/134309 |
| 9,519,194 | B2 * | 12/2016 | Lee ............ G02F 1/134309 |
| 9,529,235 | B2 * | 12/2016 | Lee ............ G02F 1/134309 |
| 9,618,806 | B2 * | 4/2017 | Hwang ............ G02F 1/133512 |
| 9,690,139 | B2 * | 6/2017 | Tsuei ............ G02F 1/133753 |
| 9,691,788 | B2 * | 6/2017 | Yu ............ H01L 27/1225 |
| 9,746,712 | B2 * | 8/2017 | Kim ............ G02F 1/13624 |
| 9,746,736 | B2 * | 8/2017 | Ahn ............ G02F 1/13624 |
| 9,791,748 | B2 | 10/2017 | Chang et al. |
| 10,036,924 | B2 * | 7/2018 | Tae ............ G02F 1/133707 |
| 10,162,226 | B2 * | 12/2018 | Guo ............ G02F 1/1343 |
| 10,330,982 | B2 * | 6/2019 | Son ............ G02F 1/133753 |

| 2004/0114087 | A1 | 6/2004 | Cho et al. |
| 2007/0159585 | A1 * | 7/2007 | Yoshida ............ G02F 1/134363 349/130 |
| 2007/0216838 | A1 | 9/2007 | Hsu et al. |
| 2008/0036355 | A1 | 2/2008 | Chan et al. |
| 2008/0137013 | A1 | 6/2008 | Kamoshida |
| 2009/0002588 | A1 | 1/2009 | Lee et al. |
| 2009/0046233 | A1 | 2/2009 | Cho et al. |
| 2009/0058784 | A1 | 3/2009 | Shin et al. |
| 2009/0161048 | A1 | 6/2009 | Satake et al. |
| 2010/0007843 | A1 * | 1/2010 | Shen ............ G02F 1/13394 349/155 |
| 2010/0091234 | A1 | 4/2010 | Nakahata et al. |
| 2010/0182557 | A1 | 7/2010 | You et al. |
| 2010/0195027 | A1 | 8/2010 | Yoshida et al. |
| 2011/0013129 | A1 | 1/2011 | Jeong et al. |
| 2011/0228190 | A1 | 9/2011 | Yang et al. |
| 2012/0044448 | A1 | 2/2012 | Kim et al. |
| 2012/0075562 | A1 * | 3/2012 | Yeh ............ G02F 1/1323 349/139 |
| 2012/0229739 | A1 * | 9/2012 | Inoue ............ G02F 1/133753 349/99 |
| 2012/0249940 | A1 | 10/2012 | Choi et al. |
| 2012/0280895 | A1 * | 11/2012 | Yeh ............ G02F 1/1323 345/87 |
| 2013/0010219 | A1 | 1/2013 | Yeh et al. |
| 2013/0134489 | A1 | 5/2013 | Kao et al. |
| 2013/0135546 | A1 | 5/2013 | Wang et al. |
| 2014/0176856 | A1 | 6/2014 | Lee et al. |

FOREIGN PATENT DOCUMENTS

| CN | 102073171 A | 5/2011 |
| CN | 103901677 A | 7/2014 |
| EP | 2749931 A1 | 7/2014 |
| JP | 09297307 A | 11/1997 |
| JP | 2002023170 A | 1/2002 |
| JP | 2002341355 A | 11/2002 |
| JP | 2003315802 A | 11/2003 |
| JP | 2004037853 A | 2/2004 |
| JP | 2004118200 A | 4/2004 |
| JP | 2006106603 A | 4/2006 |
| JP | 2006113204 A | 4/2006 |
| JP | 2006145992 A | 6/2006 |
| JP | 2006338024 A | 12/2006 |
| JP | 2007256811 A | 10/2007 |
| JP | 2007333818 A | 12/2007 |
| JP | 2008112001 A | 5/2008 |
| JP | 2008145700 A | 6/2008 |
| JP | 2008145778 A | 6/2008 |
| JP | 2009037189 A | 2/2009 |
| JP | 2009115933 A | 5/2009 |
| JP | 2009229667 A | 10/2009 |
| JP | 2010054552 A | 3/2010 |
| JP | 2010096856 A | 4/2010 |
| JP | 2010128495 A | 6/2010 |
| JP | 2010145756 A | 7/2010 |
| JP | 2011113085 A | 6/2011 |
| JP | 2011221505 A | 11/2011 |
| KR | 1020050036343 A | 4/2005 |
| KR | 1020060017998 A | 2/2006 |
| KR | 1020070002421 A | 1/2007 |
| KR | 1020070077922 A | 7/2007 |
| KR | 1020070089352 A | 8/2007 |
| KR | 1020070111155 A | 11/2007 |
| KR | 1020080035281 A | 4/2008 |
| KR | 1020080047519 A | 5/2008 |
| KR | 1020090013373 A | 2/2009 |
| KR | 1020090067089 A | 6/2009 |
| KR | 1020100000721 A | 1/2010 |
| KR | 1020100025367 A | 3/2010 |
| KR | 1020100054344 A | 5/2010 |
| KR | 1020110024597 A | 3/2011 |
| KR | 1020110077368 A | 7/2011 |
| KR | 1020110111227 A | 10/2011 |
| KR | 1020110117553 A | 10/2011 |

(56) References Cited

FOREIGN PATENT DOCUMENTS

| KR | 1020110123543 A | 11/2011 |
|----|-----------------|---------|
| KR | 1020130086880 A | 8/2013 |
| TW | 588171 B | 5/2004 |

OTHER PUBLICATIONS

Korean Office Action for Application No. 10-2013-0092203 dated Jul. 8, 2019 enumerating the above references in the Korean Office Action.

Korean Office Action for Application No. 10-2013-0109223 dated Jan. 6, 2020 enumerating the above listed references from the Korean Office Action.

Korean Office Action for Application No. 10-2013-0109223 dated Aug. 14, 2019 enumerating the above references in the Korean Office Action.

Korean Office Action for Application No. 10-2013-0110647 dated Aug. 9, 2019 enumerating the above references in the Korean Office Action.

Korean Office Action for Application No. 10-2013-0101907 dated Jul. 30, 2019 enumerating the above references in the Korean Office Action.

Korean Office Action for Application No. 10-2013-0123515 dated Sep. 26, 2019 enmumerating the above references in the Korean Office Action.

* cited by examiner

LIQUID CRYSTAL DISPLAY

This application claims priority to Korean Patent Applications No. 10-2013-0092200 filed on Aug. 2, 2013, No. 10-2013-0092203 filed on Aug. 2, 2013, No. 10-2013-0101907 filed on Aug. 27, 2013, No. 10-2013-0109223 filed on Sep. 11, 2013, No. 10-2013-0110647 filed on Sep. 13, 2013, and No. 10-2013-0123515 filed on Oct. 16, 2013, and all the benefits accruing therefrom under 35 U.S.C. § 119, the contents of which are hereby incorporated by reference in its entirety.

BACKGROUND

1. Field

The invention relates to a liquid crystal display ("LCD"). More particularly, the invention relates to an LCD having a curved shape.

2. Description of the Related Art

As one of flat panel displays, a liquid crystal display ("LCD") is applied to various electronic appliances, such as a television set, a monitor, a notebook, a mobile phone, etc., to display an image. In recent years, an LCD having a curved shape has been developed. The curved LCD displays the image through a curved display area and provides a user with improved three-dimensional ("3D") effect, a sense of immersion, and virtual presence.

SUMMARY

The invention provides a liquid crystal display ("LCD") having improved display quality of an image displayed through a curved display area thereof.

Embodiments of the invention provide an LCD including a display substrate, an opposite substrate, and a liquid crystal layer. The display substrate includes a plurality of pixel areas and is curved in a first direction. The opposite substrate faces the display substrate. The opposite substrate is coupled to the display substrate and curved along the display substrate. The liquid crystal layer is disposed between the display substrate and the opposite substrate.

In an exemplary embodiment, domains are defined in each of the plurality of pixel areas and directions in which liquid crystal molecules of the liquid crystal layer are aligned are different from each other in at least two domains among the domains. In an exemplary embodiment, the domains are arranged in a second direction crossing the first direction.

According to the above, although a misalignment occurs between the display substrate and the opposite substrate when the display substrate and the opposite substrate are curved, a lower alignment direction and an upper alignment direction of the liquid crystal molecules may be uniformly maintained by alignments layers respectively disposed on the display substrate and the opposite substrate. Therefore, alignment defects caused when the lower alignment direction and the upper alignment direction are different from each other may be effectively prevented. As a result, a transmittance of the light may be effectively prevented from being deteriorated in the domains, and thus the display quality of the LCD may be improved.

In an exemplary embodiment, two branch portions disposed in two domains adjacent to each other are connected to each other by a domain connection portion disposed between the two branch portions, and the two branch portions and the domain connection portion are connected to each other in a zigzag shape. Accordingly, the two branch portions may be effectively prevented from serving as one branch portion in the two domains. As a result, directions in which the liquid crystal molecules are aligned are clearly distinct from each other in the two domains, so that the display quality of the LCD may be improved.

Further, intensity of the inner fringe field is increased by the structure of the auxiliary branch portions, and the intensity of the inner fringe field may become stronger than that of external electric field acting in opposition to the inner fringe field. Therefore, since the inner fringe field more strongly acts on the domains than the external electric field, the liquid crystal molecules may be easily aligned even though the inner fringe field is overlapped with the external electric field in the domains.

In addition, a variation in brightness of the image displayed on the display substrate, which is caused by the viewing direction, may be minimized. Accordingly, a difference between the brightness perceived in a left side of the display substrate and the brightness perceived in a right side of the display substrate is effectively reduced, and thus the display quality of the display substrate is improved.

Further, since the spacers are overlapped with the light blocking layer, the thickness of the spacers is effectively reduced by the thickness of the light blocking layer. Therefore, the thickness of each of the spacers is effectively reduced and the size of bottom surface of each of the spacers is effectively reduced, thereby effectively reducing the size of each of the spacers in a plan view. Thus, the spacers may be easily disposed in the non-pixel area. As a result, the aperture ratio of the plurality of pixel areas may be effectively prevented from being lowered.

In addition, the column spacer is disposed on the display substrate, and thus the column spacer may be effectively prevented from moving by the misalignment between the display substrate and the opposite substrate. Consequently, the cell gap between the display substrate and the opposite substrate may be effectively prevented from being varied. As a result, the display quality of the LCD may be improved.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1A:
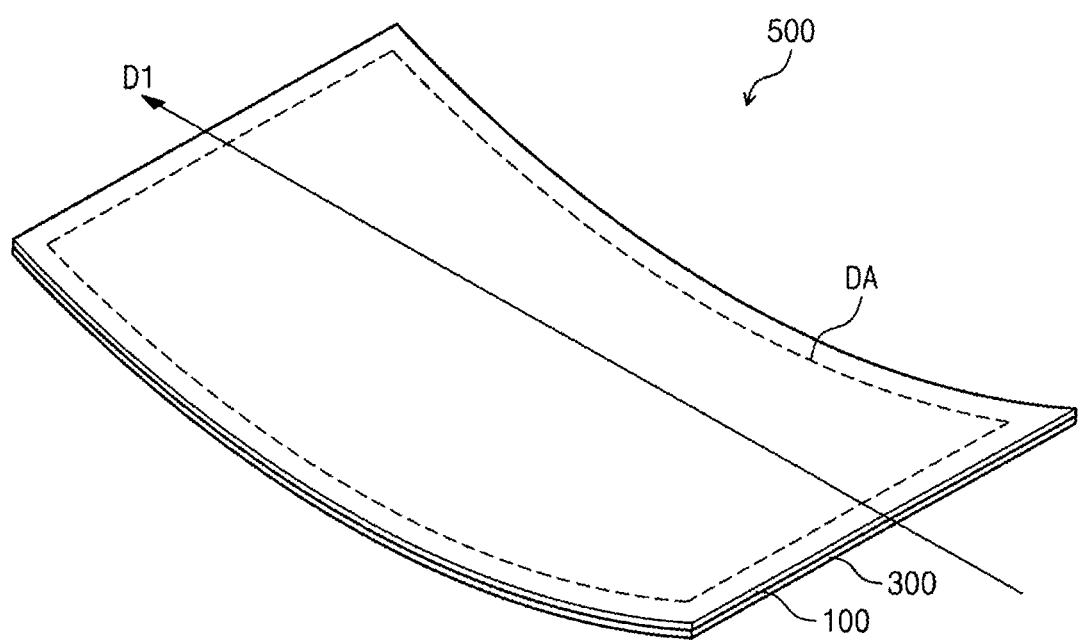
FIG. 1A is a perspective view showing an exemplary embodiment of a liquid crystal display ("LCD") according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1B:
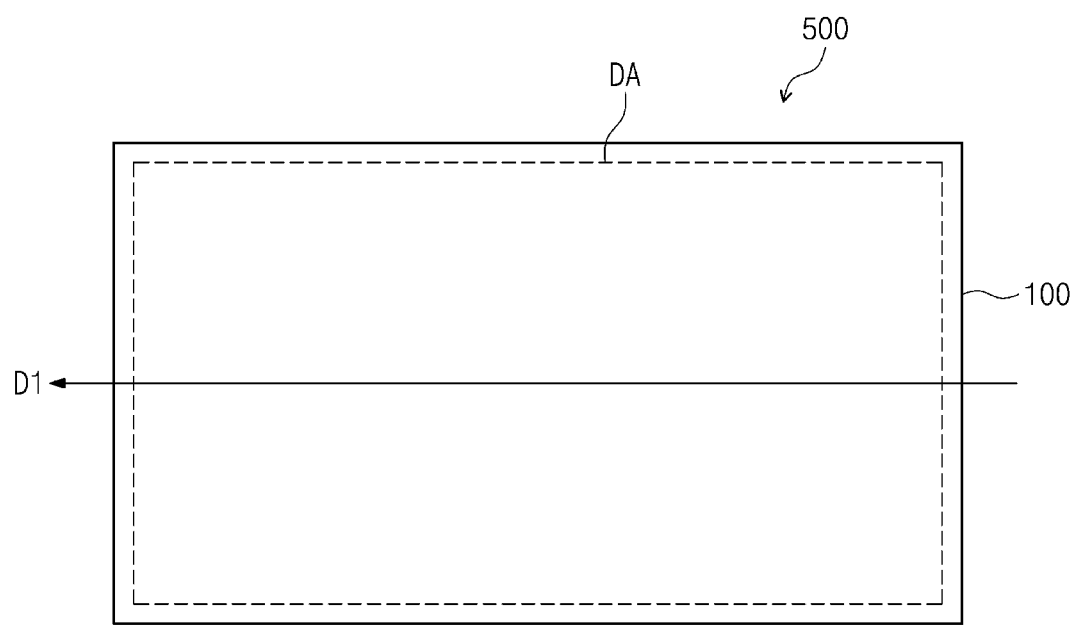
FIG. 1B is a plan view showing the LCD shown in FIG. 1A.
Figure 1C:
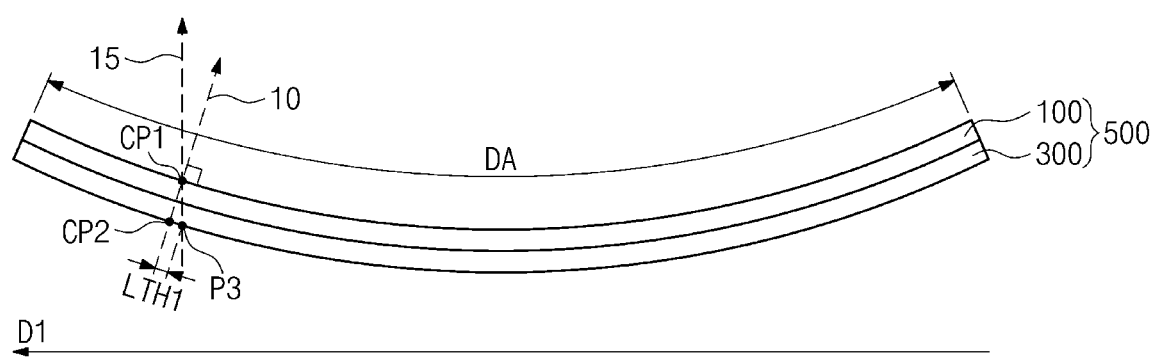
FIG. 1C is a side view showing the LCD shown in FIG. 1A.

FIG. 1A is a perspective view showing a liquid crystal display ("LCD") according to an exemplary embodiment of the invention, FIG. 1B is a plan view showing the LCD shown in FIG. 1A, and FIG. 1C is a side view showing the LCD shown in FIG. 1A.

Referring to FIGS. 1A, 1B, and 1C, an LCD 500 includes a display area DA in which an image is displayed and has a curved shape. Accordingly, the LCD 500 may displays the image with improved three-dimensional ("3D") effect, a sense of immersion, and virtual presence through the display area DA provided in the curved shape.

Figure 3A:
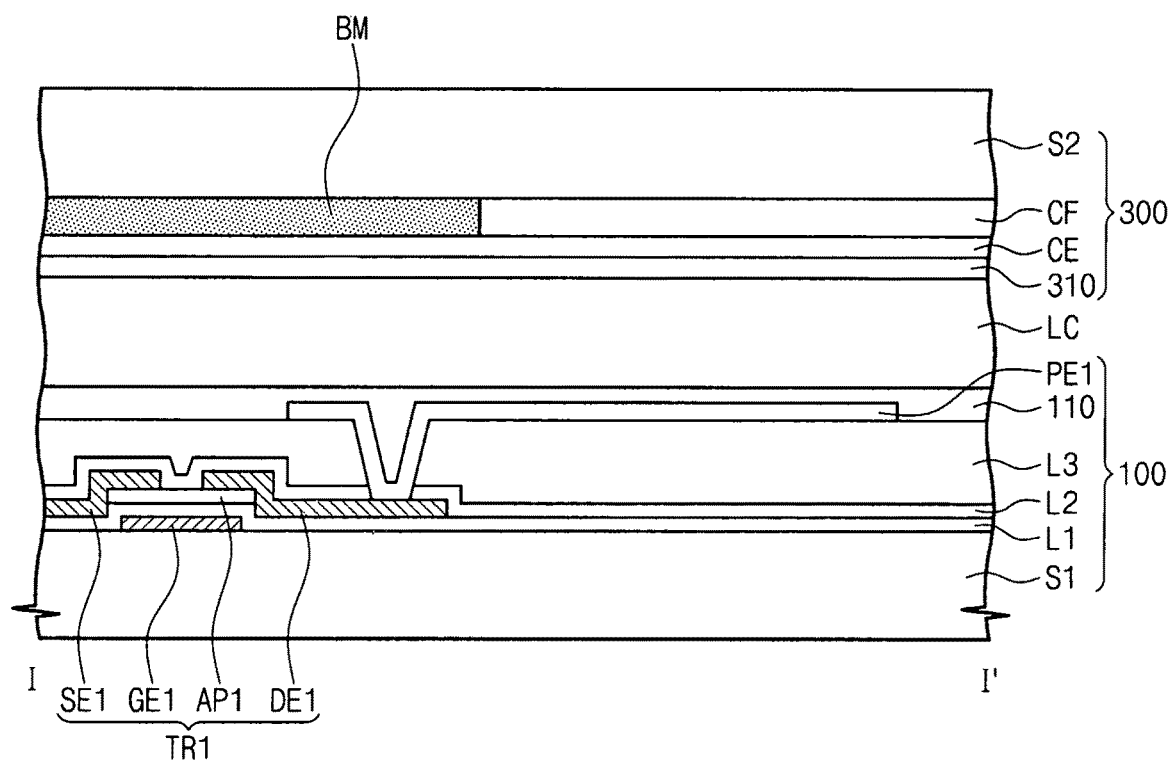
FIG. 3A is a cross-sectional view taken along line I-I' of FIG. 2.

In the illustrated exemplary embodiment, the LCD 500 includes a display substrate 100, an opposite substrate 300, and a liquid crystal layer LC (refer to FIG. 3A). The opposite substrate 300 is coupled to the display substrate 100 and faces the display substrate 100. The liquid crystal layer LC is interposed between the display substrate 100 and the opposite substrate 300.

In an exemplary embodiment, the LCD 500 may further include other elements in addition to the display substrate 100 and the opposite substrate 300, but it should not be limited thereto or thereby. In an exemplary embodiment, the LCD 500 may further include a backlight assembly (not shown) to provide a light to the display substrate 100 and the opposite substrate 300, but a light source for the LCD 500 should not be limited to the backlight assembly.

In the illustrated exemplary embodiment, the LCD 500 is curved in a first direction D1. Therefore, a portion or all of the display substrate 100 is curved in the first direction D1, and the display area DA has a curved shape curved in the first direction D1. In an exemplary embodiment, the opposite substrate 300 is curved as the display substrate 100 is curved.

As shown in FIG. 1C, a first point CP1 is defined on the curved portion of the display substrate 100, a normal line 10 crossing the first point CP1 is defined, and a second point CP2 is defined on the opposite substrate 300 to meet the normal line 10. In an exemplary embodiment, a gaze line 15 substantially parallel to a gaze direction of a user is defined to cross the first point CP1 and a third point P3 is defined on the opposite substrate 300 to meet the gaze line 15. In this case, since the display substrate 100 and the opposite substrate 300 are curved, a position of the second point CP2 may be different from a position of the third point P3 on the opposite substrate 300.

As described above, a phenomenon in which the position of the second point CP2 does not match with the position of the third point P3 is referred to as a misalignment between the display substrate 100 and the opposite substrate 300. Hereinafter, a structure of the LCD 500, which prevents a display quality of the image displayed in the display area DA from being deteriorated due to the misalignment, will be described in detail.

Figure 2:
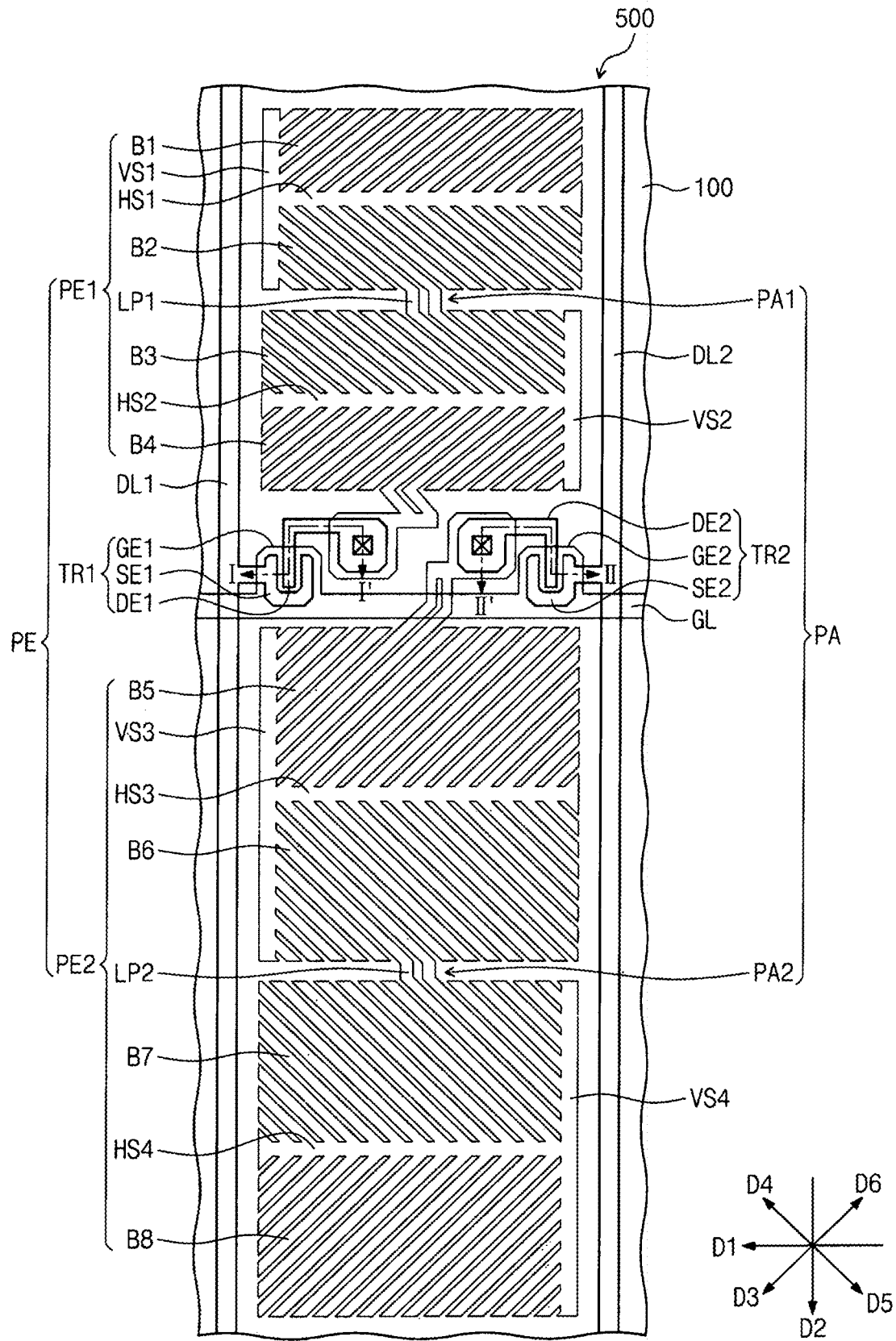
FIG. 2 is a plan view showing a pixel of the LCD shown in FIG. 1A.
Figure 3B:
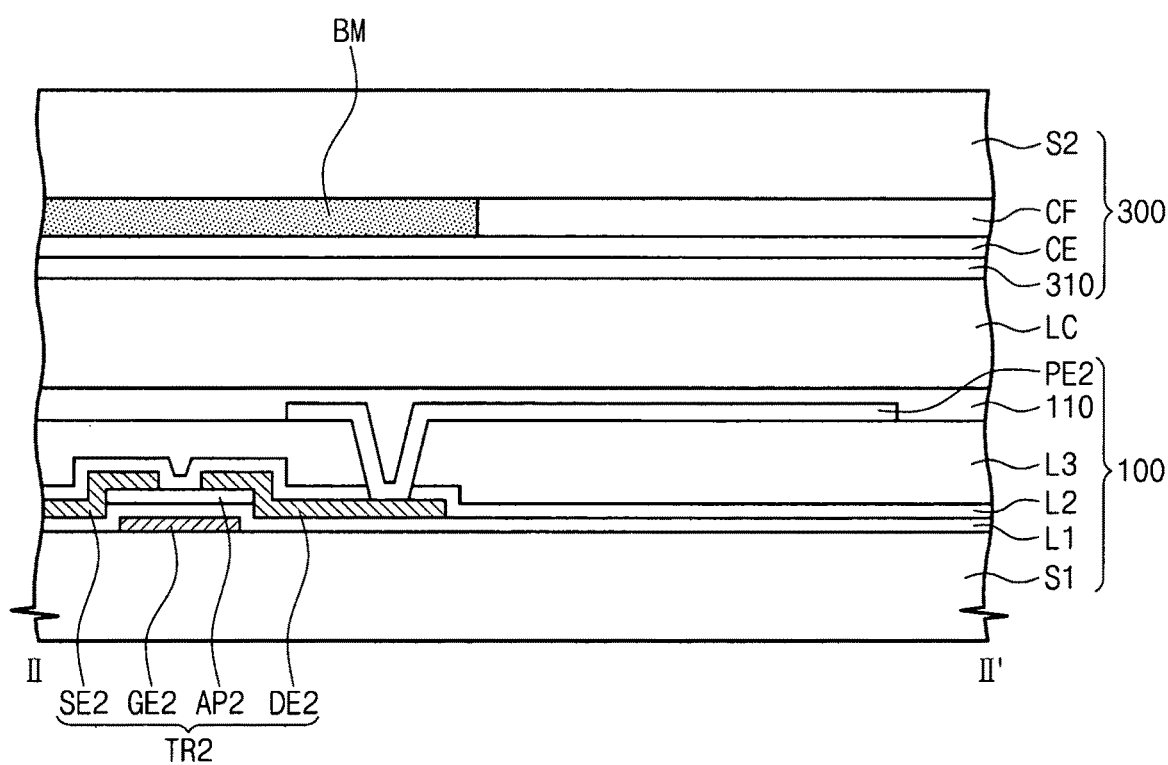
FIG. 3B is a cross-sectional view taken along line II-II' of FIG. 2.

FIG. 2 is a plan view showing a pixel of the LCD 500 shown in FIG. 1A, FIG. 3A is a cross-sectional view taken along line I-I' of FIG. 2, and FIG. 3B is a cross-sectional view taken along line II-II' of FIG. 2.

The LCD 500 includes a plurality of pixels, but only one pixel disposed in one corresponding pixel area is shown in FIG. 2 and details of others will be omitted since the pixels have the same structure and function. In an exemplary embodiment, the display substrate 100 will be mainly described and the opposite substrate 300 will be described with reference to FIGS. 3A and 3B.

Referring to FIGS. 2, 3A, and 3B, the display substrate 100 includes a first base substrate S1, a gate line GL, a first data line DL1, a second data line DL2, a first thin film transistor ("TFT") TR1, a second TFT TR2, a pixel electrode PE, and a first alignment layer 110.

In an exemplary embodiment, the first base substrate S1 may include an insulating substrate having a light transmitting property and a flexible property, e.g., a plastic substrate. The gate line GL is disposed on the first base substrate S1 and connected to the first and second TFTs TR1 and TR2 to apply a gate signal to the first and second TFTs TR1 and TR2.

In the illustrated exemplary embodiment, the pixel area PA includes a first sub-pixel area PA1 and a second pixel area PA2. In this case, the pixel electrode PE includes a first sub-pixel electrode PE1 disposed in a first sub-pixel area PA1 and a second sub-pixel electrode PE2 disposed in a second sub-pixel area PA2.

The first and second data lines DL1 and DL2 are disposed on the first base substrate S1 and insulated from the gate line GL. The first data line DL1 transmits a first data signal and the second data line DL2 transmits a second data signal. In the illustrated exemplary embodiment, the first data line DL1 extends along one side (e.g., left side) of the first and second sub-pixel electrodes PE1 and PE2 and the second data line DL2 extends along the other side (e.g., right side) of the first and second sub-pixel electrodes PE1 and PE2. Thus, the first and second sub-pixel electrodes PE1 and PE2 are disposed between the first and second data lines DL1 and DL2. However, the invention is not limited thereto, and the first and second sub-pixel electrodes PE1 and PE2 may not be disposed between the first and second data lines DL1 and DL2.

The first TFT TR1 is electrically connected to the gate line GL, the first data line DL1, and the first sub-pixel electrode PE1. Accordingly, when the first TFT TR1 is turned on in response to the gate signal, the first data signal is applied to the first sub-pixel electrode PE1.

The first TFT TR1 includes a first gate electrode GE1, a first active pattern APE a first source electrode SE1, and a first drain electrode DE1. The first gate electrode GE1 is branched from the gate line GL and the first active pattern AP1 is disposed on the first gate electrode GE1 such that the first insulating layer L1 is disposed between the first active pattern AP1 and the first gate electrode GE1. The first source electrode SE1 is branched from the first data line DL1 to make contact with the first active pattern APE and the first drain electrode DE1 is spaced apart from the first source electrode SE1 to make contact with the first active pattern API. In an exemplary embodiment, the first source electrode SE1 and the first drain electrode DE1 may be disposed on both ends of the first active pattern APE respectively.

A second insulating layer L2 covers the first TFT TR1 and a third insulating layer L3 is disposed on the second insulating layer L2. The first sub-pixel electrode PE1 is disposed on the third insulating layer L3 and makes contact with the first drain electrode DE1 through a contact hole defined through the second and third insulating layers L2 and L3.

The second TFT TR2 is electrically connected to the gate line GL, the second data line DL2, and the second sub-pixel electrode PE2. Therefore, when the second TFT TR2 is turned on in response to the gate signal, the second signal is applied to the second sub-pixel electrode PE2.

The second TFT TR2 includes a second gate electrode GE2, a second active pattern AP2, a second source electrode SE2, and a second drain electrode DE2. The second gate electrode GE2 is branched from the gate line GL and the second active pattern AP2 is disposed on the second gate electrode GE2 such that the first insulating layer L1 is disposed between the second active pattern AP2 and the second gate electrode GE2. The second source electrode SE2 is branched from the second data line DL2 to make contact with the second active pattern AP2, and the second drain electrode DE2 is spaced apart from the second source electrode SE2 to make contact with the second active pattern AP2.

The second sub-pixel electrode PE2 is disposed on the third insulating layer L3 and makes contact with the second drain electrode DE2 through a contact hole defined through the second and third insulating layers L2 and L3.

In the illustrated exemplary embodiment, each of the first and second active patterns AP1 and AP2 includes a semiconductor material, e.g., amorphous silicon, crystalline silicon, etc., but it should not be limited to the semiconductor material. In an exemplary embodiment, each of the first and second active patterns AP1 and AP2 may include oxide semiconductor, such as indium gallium zinc oxide ("IGZO"), ZnO, $SnO_2$, $In_2O_3$, $Zn_2SnO_4$, $Ge_2O_3$, $HfO_2$, etc., or compound semiconductor, such as GaAs, GaP, InP, etc.

As described above, the first and second TFTs TR1 and TR2 are turned on in response to the gate signal. In this case, the first data signal is applied to the first sub-pixel electrode PE1 through the first TFT TR1 and the second data signal different from the first data signal is applied to the second sub-pixel electrode PE2 through the second TFT TR2. Thus, the first and second sub-pixel electrodes PE1 and PE2 are driven in response to different data signals, and thus different gray scales are displayed in the first and second sub-pixel areas PA1 and PA2.

The first alignment layer 110 is disposed above the pixel electrode PE and makes contact with the liquid crystal layer LC. When electric field does not exist between the display substrate 100 and the opposite substrate 300, the first alignment layer 100 aligns liquid crystal molecules RM (refer to FIGS. 4A to 4D) of the liquid crystal layer LC to be inclined with respect to the first alignment layer 110. In this case, the liquid crystal molecules aligned inclined with respect to the first alignment layer 110 become more inclined by the electric field, and thus the liquid crystal molecules are aligned in a direction substantially in parallel to the display substrate 100. The above-described operation mode of the liquid crystal molecules against the electric field is called a super vertical alignment ("SVA") mode, and in this case, a response time required to display the image on the LCD 500 may be improved.

The opposite substrate 300 includes a second base substrate S2, a color filter CF, a light blocking layer BM, a common electrode CE, and a second alignment layer 310. In an exemplary embodiment, the second base substrate S2 may be an insulating substrate having a light transmitting property and a flexible property.

The common electrode CE is disposed on the second base substrate S2 to generate the electric field applied to the liquid crystal layer LC in cooperation with the pixel electrode PE. The light blocking layer BM is disposed on the second base substrate S2 to correspond to the gate line GL, the first and second data lines DL1 and DL2, and the first and second TFTs TR1 and TR2. In an exemplary embodiment, the color filter CF is disposed on the second base substrate S2 to filter the light passing through the liquid crystal layer LC to a color light.

In the illustrated exemplary embodiment, the light blocking layer BM and the color filter CF are disposed on the second base substrate S2, but the light blocking layer BM and the color filter CF should not be limited thereto or thereby. In an exemplary embodiment, at least one of the light blocking layer BM and the color filter CF may be disposed on the first base substrate S1.

In the illustrated exemplary embodiment, the first sub-pixel electrode PE1 includes a first horizontal stem portion HS1, a second horizontal stem portion HS2, a first vertical stem portion VS1, a second vertical stem portion VS2, and first, second, third, and fourth branch portions B1, B2, B3, and B4.

The first vertical stem portion VS1 is connected to the first horizontal stem portion HS1, edges of the first branch portions B1, and edges of the second branch portions B2, and the second vertical stem portion VS2 is connected to the second horizontal stem portion HS2, edges of the third branch portions B3, and edges of the fourth branches B4. In the illustrated exemplary embodiment, each of the first and second vertical stem portions VS1 and VS2 extends in the second direction D2 crossing the first direction D1 in which the LCD 500 is curved. In an exemplary embodiment, the second direction D2 may be substantially perpendicular to the first direction D1 when viewed in a plan view, for example.

The first horizontal stem portion HS1 is connected to the first vertical stem portion VS1, edges of the first branch portions B1, and edges of the second branch portions B2. In the illustrated exemplary embodiment, the first horizontal stem portion HS1 extends in the first direction D1 and is branched from a center portion of the first vertical stem portion VS1 in a plan view. The first branch portions B1 are symmetrical with the second branch portions B2 with respect to the first horizontal stem portion HS1, and the first horizontal stem portion HS1 is disposed between first and second domains DM1 and DM2 (refer to FIG. 5).

The second horizontal stem portion HS2 is connected to the second vertical stem portion VS2, edges of the third branch portions B3, and edges of the fourth branch portions B4. In the illustrated exemplary embodiment, the second horizontal stem portion HS2 extends in the first direction D1 and is branched from a center portion of the second vertical stem portion VS2. The third branch portions B3 are symmetrical with the fourth branch portions B4 with respect to the second horizontal stem portion HS2, and the second horizontal stem portion HS2 is disposed between third and fourth domains DM3 and DM4 (refer to FIG. 5).

A portion of the first branch portions B1 is branched from the first horizontal stem portion HS1 and the other portion of the first branch portions B1 is branched from the first vertical stem portion VS1. In an exemplary embodiment, each of the first branch portions B1 extends in the third direction D3 inclined with respect to the first direction D1 and the second direction D2 when viewed in a plan view, and each of the first branch portions B1 is arranged to be spaced apart from each other.

A portion of the second branch portions B2 is branched from the first horizontal stem portion HS1 and the other portion of the second branch portions B2 is branched from the first vertical stem portion VS1. In an exemplary embodiment, each of the second branch portions B2 extends in the fourth direction D4 inclined with respect to the first and second directions D1 and D2 when viewed in a plan view, and each of the second branch portions B2 is arranged to be spaced apart from each other.

In the illustrated exemplary embodiment, the fourth direction D4 crosses the third direction D3 when viewed in a plan view. In an exemplary embodiment, the third and fourth directions D3 and D4 are substantially perpendicular to each other when viewed in a plan view, and each of the third and fourth directions D3 and D4 defines an angle of about 45 degrees with respect to the first direction D1 or the second direction D2.

A portion of the third branch portions B3 is branched from the second horizontal stem portion HS2 and the other portion of the third branch portions B3 is branched from the second vertical stem portion VS2. In an exemplary embodiment, each of the third branch portions B3 extends in a fifth third direction D5 inclined with respect to the first and second directions D1 and D2 when viewed in a plan view, and each of the third branch portions B3 is arranged to be spaced apart from each other.

A portion of the fourth branch portions B4 is branched from the second horizontal stem portion HS2 and the other portion of the fourth branch portions B4 is branched from the second vertical stem portion VS2. In an exemplary embodiment, each of the fourth branch portions B4 extends in the sixth direction D6 inclined with respect to the first and second directions D1 and D2 when viewed in a plan view, and each of the fourth branch portions B4 is arranged to be spaced apart from each other.

In the illustrated exemplary embodiment, the sixth direction D6 crosses the fifth direction D5 when viewed in a plan view. In an exemplary embodiment, the fifth and sixth directions D5 and D6 are substantially perpendicular to each other when viewed in a plan view, and each of the fifth and sixth directions D5 and D6 defines an angle of about 45 degrees with respect to the first direction D1 or the second direction D2.

In the illustrated exemplary embodiment, the second sub-pixel electrode PE2 may have a size different from that of the first sub-pixel electrode PE1, but have a shape similar to that of the first sub-pixel electrode PE1.

The second sub-pixel electrode PE2 includes a third horizontal stem portion HS3, a fourth horizontal stem portion HS4, a third vertical stem portion VS3, a fourth vertical stem portion VS4, and fifth, sixth, seventh, and eighth branch portions B5, B6, B7, and B8.

The third vertical stem portion VS3 extends in the second direction D2 and is connected to the third horizontal stem portion HS3, edges of the fifth branch portions B5, and edges of the sixth branch portions B6. The fourth vertical stem portion VS4 extends in the second direction D2 and is connected to the fourth horizontal stem portion HS4, edges of the seventh branch portions B7, and edges of the eighth branch portions B8.

The third horizontal stem portion HS3 is branched from the third vertical stem portion VS3 and extends in the first direction D1, and the fourth horizontal stem portion HS4 is branched from the fourth vertical stem portion VS4 and extends in the first direction D1. In the illustrated exemplary embodiment, the third horizontal stem portion HS3 is branched from a center portion of the third vertical stem portion VS3 and the fourth horizontal stem portion HS4 is branched from a center portion of the fourth vertical stem portion VS4 in a plan view.

A portion of the fifth branch portion B5 is branched from the third horizontal stem portion HS3 and the other portion of the fifth branch portion B5 is branched from the third vertical stem portion VS3. Each of the fifth branch portions B5 extends in the third direction D3 when viewed in a plan view, and each of the fifth branch portions B5 is arranged to be spaced apart from each other.

A portion of the sixth branch portion B6 is branched from the third horizontal stem portion HS3 and the other portion of the sixth branch portion B6 is branched from the third vertical stem portion VS3. Each of the sixth branch portions B6 extends in the fourth direction D4 when viewed in a plan view, and each of the sixth branch portions B6 is arranged to be spaced apart from each other.

A portion of the seventh branch portion B7 is branched from the fourth horizontal stem portion HS4 and the other portion of the seventh branch portion B7 is branched from the fourth vertical stem portion VS4. Each of the seventh branch portions B7 extends in the fifth direction D5 when viewed in a plan view, and each of the seventh branch portions B7 is arranged to be spaced apart from each other.

A portion of the eighth branch portion B8 is branched from the fourth horizontal stem portion HS4 and the other portion of the eighth branch portion B8 is branched from the fourth vertical stem portion VS4. Each of the eighth branch portions B8 extends in the sixth direction D6 when viewed in a plan view, and each of the eighth branch portions B8 is arranged to be spaced apart from each other.

When the first to eighth branch portions B1 to B8 have the above-described structure, first to fourth domains DM1 to DM4 (refer to FIG. 5) are defined in the first sub-pixel area PA1 and fifth to eighth domains DM5 to DM8 (refer to FIG. 5) are defined in the second sub-pixel area PA2. These will be described in detail later with reference to FIGS. 4A to 4D and 5.

In an exemplary embodiment, when the first to eighth domains are defined in the first and second sub-pixel areas PA1 and PA2 as described above, the first sub-pixel electrode PE1 further includes a first domain connection portion LP1 and the second sub-pixel electrode PE2 further includes a second domain connection portion LP2.

The first domain connection portion LP1 is disposed between the second domain and the third domain to connect the second and third branch portions B2 and B3, and the second domain connection portion LP2 is disposed between the sixth domain and the seventh domain to connect the sixth and seventh branch portions B6 and B7. In the illustrated exemplary embodiment, the first domain connection portion LP1 is disposed at a center portion of a boundary area between the second and third domains, and the second domain connection portion LP2 is disposed at a center portion of a boundary area between the sixth and seventh domains.

Figure 4A:
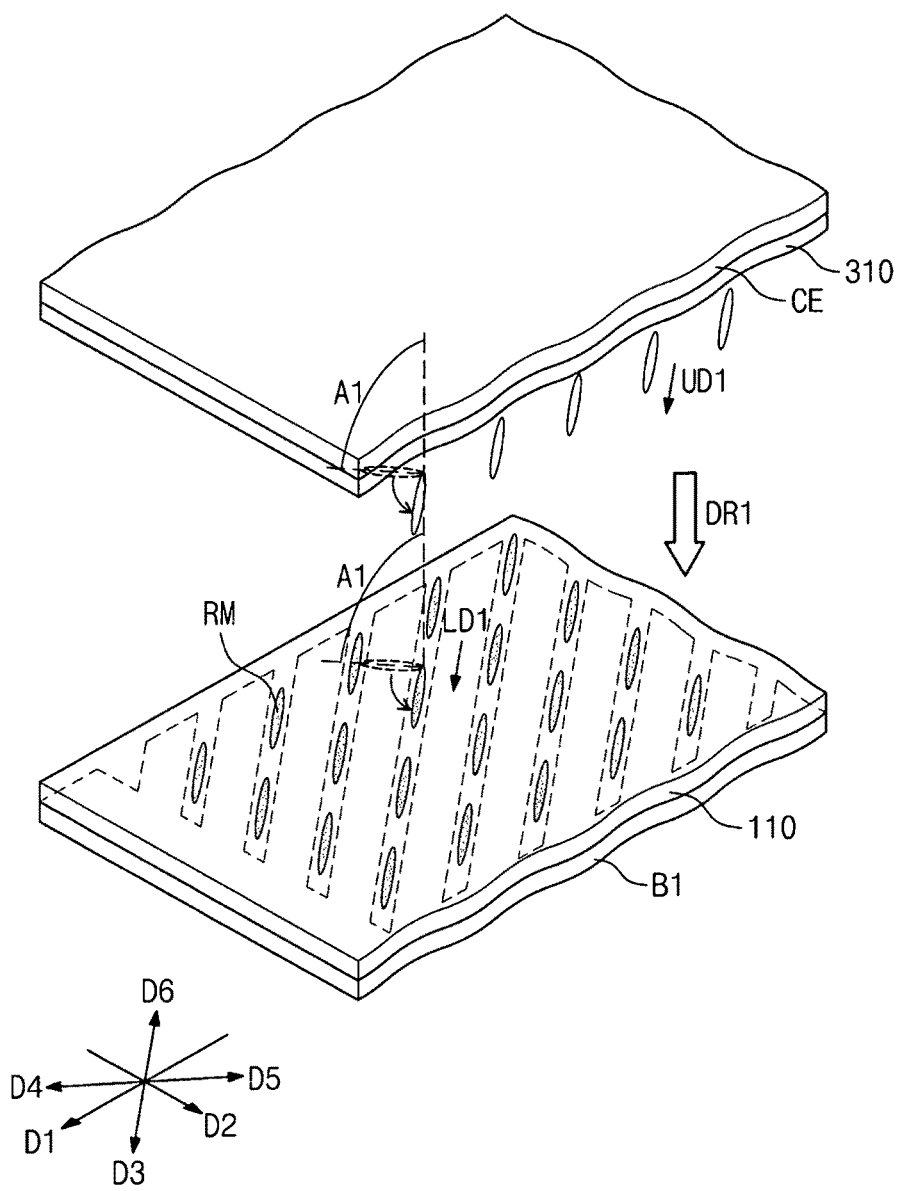
FIGS. 4A, 4B, 4C, and 4D are perspective views showing liquid crystal molecules aligned by an electric field generated between a display substrate and an opposite substrate.
Figure 4B:
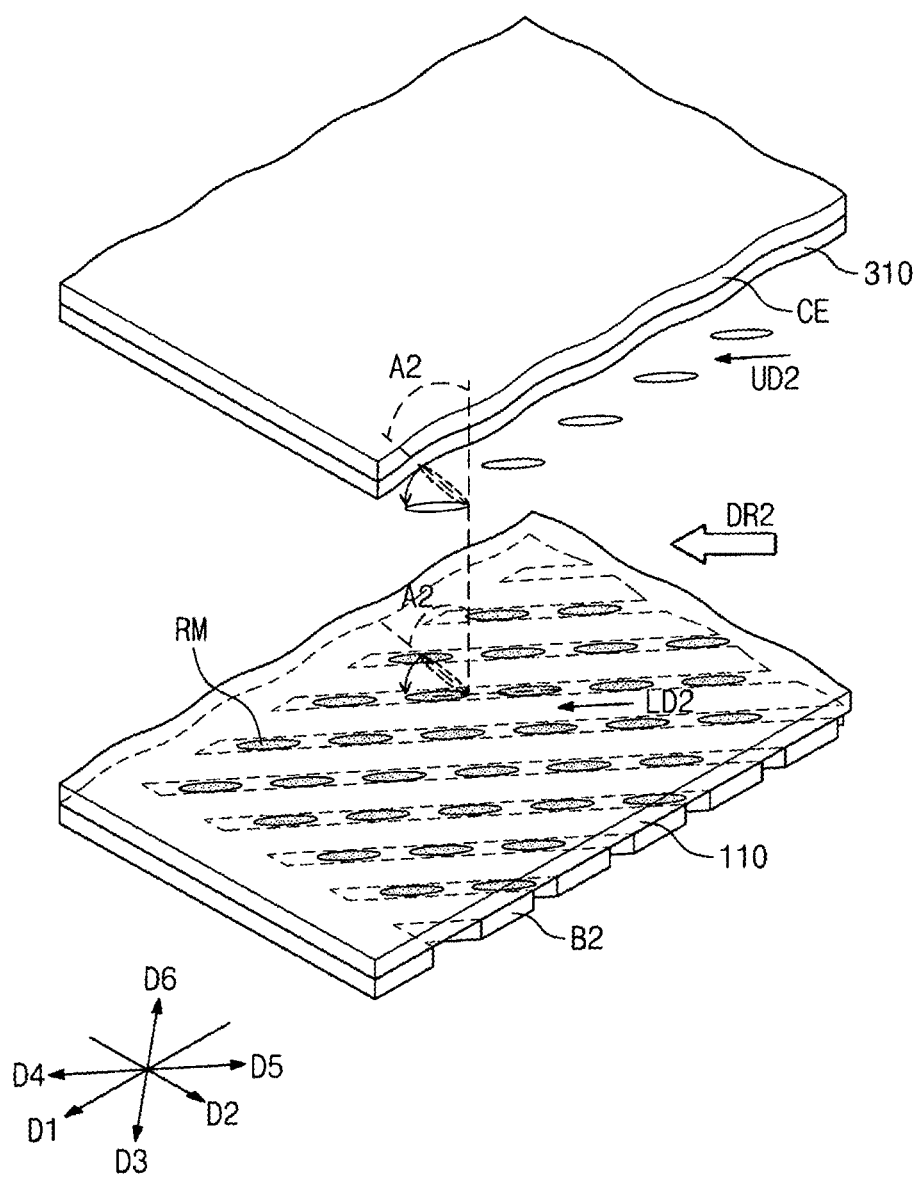
Figure 4C:
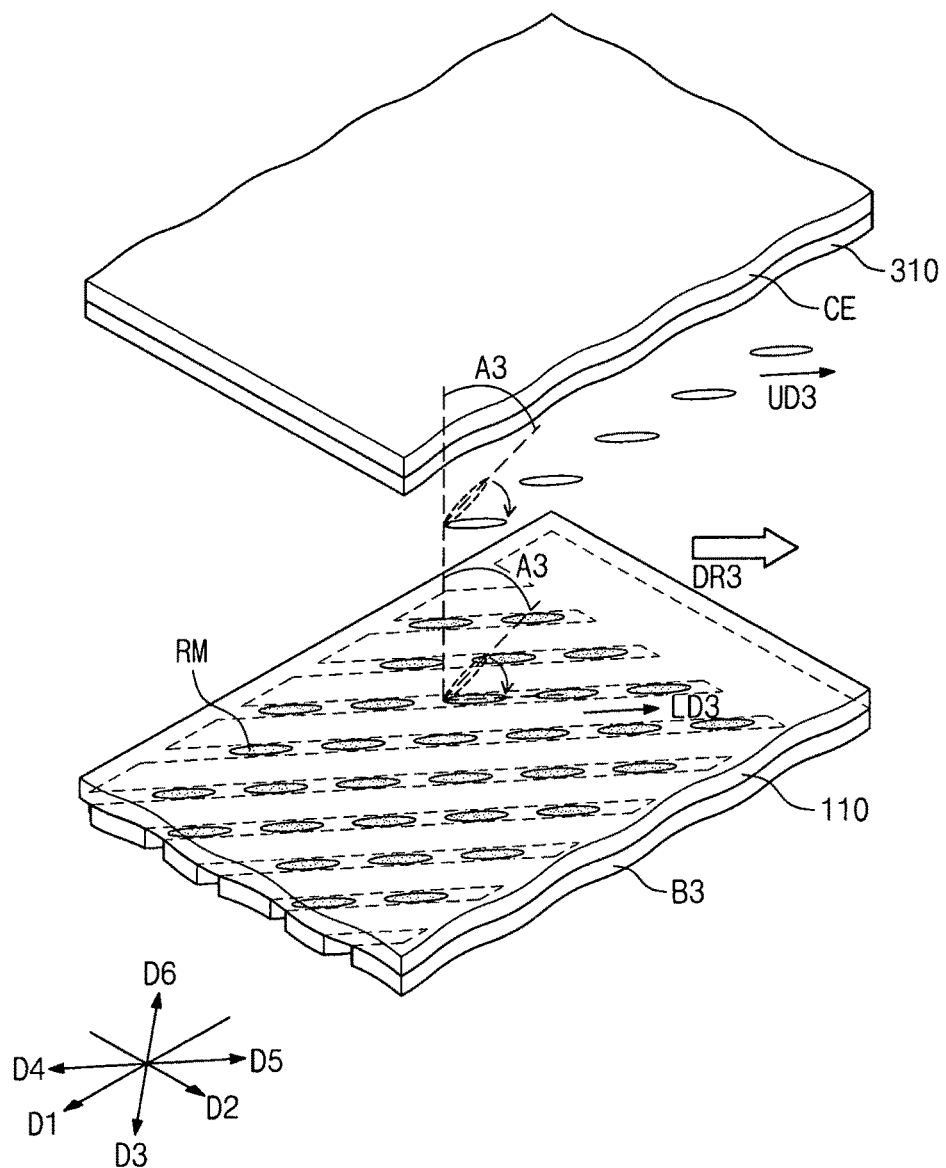
Figure 4D:
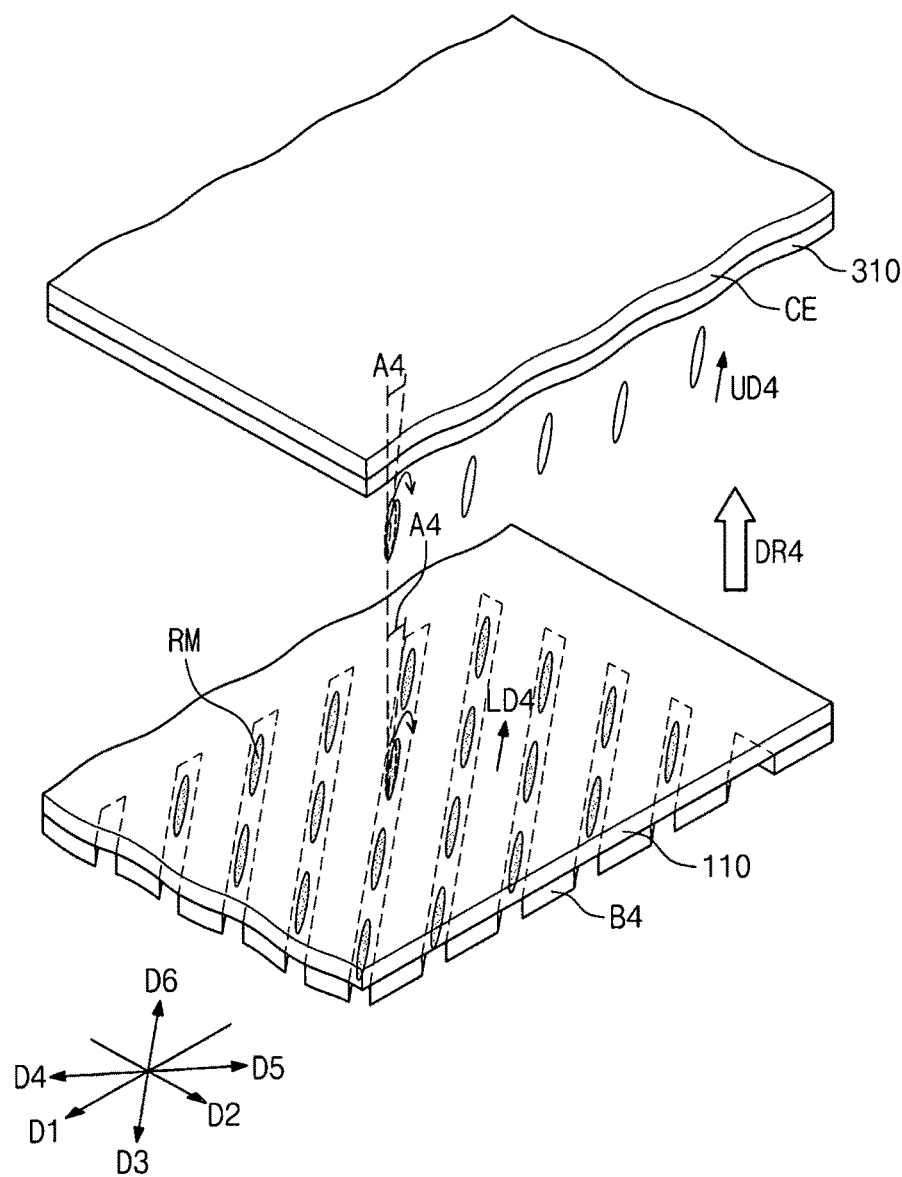
Figure 5:
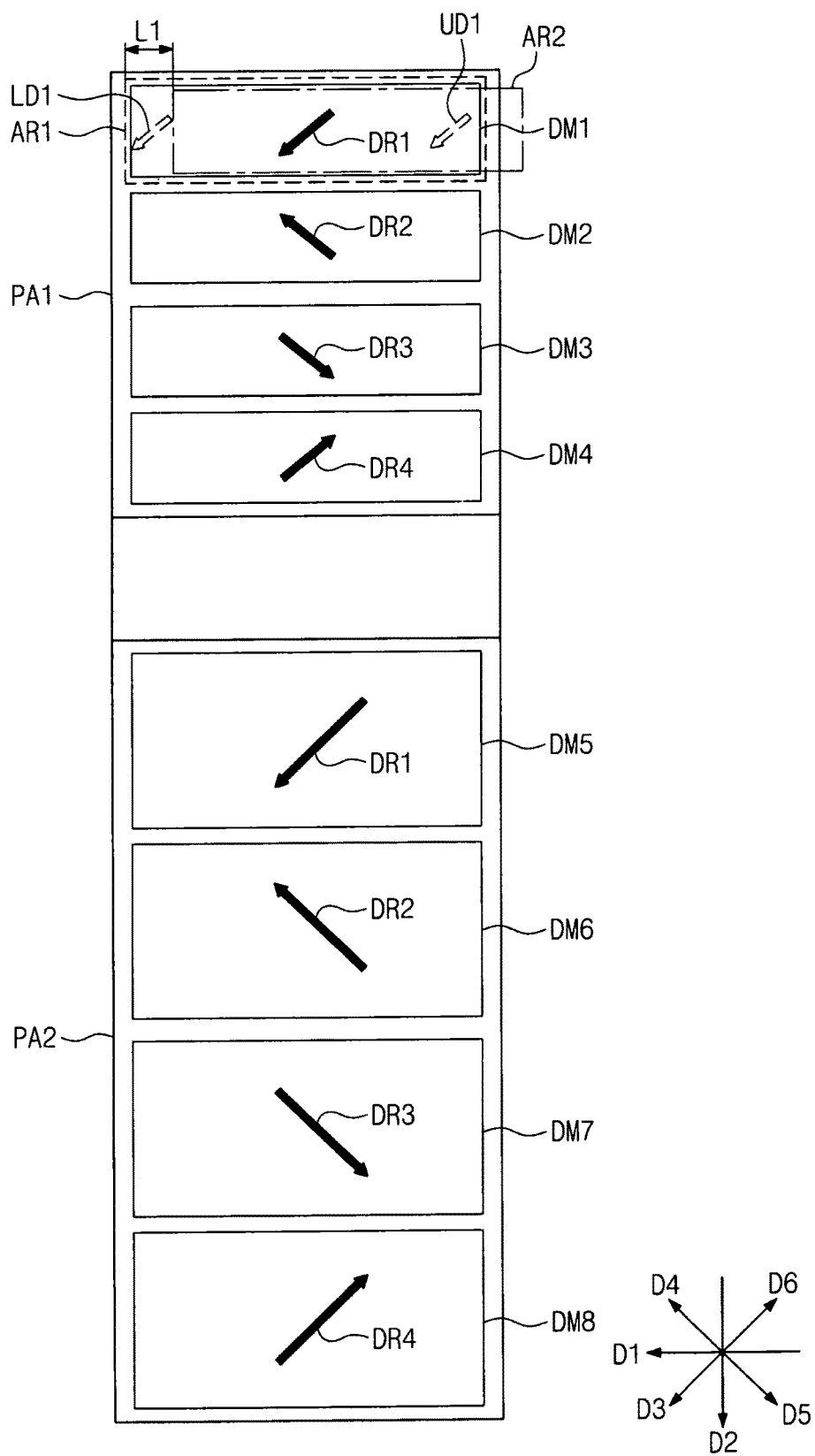
FIG. 5 is a view showing domains defined in a pixel area and alignment directions of liquid crystal molecules.

FIGS. 4A, 4B, 4C, and 4D are perspective views showing liquid crystal molecules aligned by the electric field generated between the display substrate and the opposite substrate and FIG. 5 is a view showing the domains defined in the pixel area and alignment directions of the liquid crystal molecules.

In detail, FIG. 4A is a perspective view showing an alignment state of the liquid crystal molecules disposed on the first branch portions B1 by the electric field, FIG. 4B is a perspective view showing an alignment state of the liquid crystal molecules disposed on the second branch portions B2 by the electric field, FIG. 4C is a perspective view showing an alignment state of the liquid crystal molecules disposed on the third branch portions B3 by the electric field, and FIG. 4D is a perspective view showing an alignment state of the liquid crystal molecules disposed on the fourth branch portions B4 by the electric field.

Referring to FIGS. 4A and 5, the first branch portions B1 extend in the third direction D3. When electric field is not generated between the display substrate 100 (refer to FIG. 3A) and the opposite substrate 300 (refer to FIG. 3A), a portion of the liquid crystal molecules RM, which is disposed adjacent to the first alignment layer 110, is aligned at a first pre-tilt angle A1 by the first alignment layer 110, and a portion of the liquid crystal molecules RM, which is disposed adjacent to the second alignment layer 310, is aligned at a first pre-tilt angle A1 by the second alignment layer 310.

When a direction in which the liquid crystal molecules RM are aligned by the first alignment layer 110 in a plan view is referred to as a first lower alignment direction LD1 and a direction in which the liquid crystal molecules RM are aligned by the second alignment layer 310 in a plan view is referred to as a first upper alignment direction UD1, the first upper alignment direction UD1 and the first lower alignment direction LD1 are substantially parallel to the third direction D3. That is, the first lower alignment direction LD1 is the same as the first upper alignment direction UD1.

When the electric field is generated, the liquid crystal molecules RM become more inclined by the electric field, and thus the liquid crystal molecules RM are aligned in the third direction D3 substantially parallel to the first branch portions B1. That is, the pre-tilted liquid crystal molecules RM by the first and second alignment layers 110 and 310 become more inclined toward the third direction D3 by the electric field.

Different from the illustrated exemplary embodiment, when the first upper alignment direction UD1 and the first lower alignment direction LD1 are different from each other, directions, in which the liquid crystal molecules RM disposed adjacent to the first and second alignment layers 110 and 310 are inclined in response to the electric field, are opposite to each other. In this case, the number of the liquid crystal molecules RM aligned in the third direction D3 by the electric field is reduced, and thus alignment defects occur in the liquid crystal layer LC. In the illustrated exemplary embodiment, however, the first upper alignment direction UD1 is the same as the first lower alignment direction LD1 and the liquid crystal molecules RM are aligned in the same direction by the electric field, so that the alignment defects in the liquid crystal layer LC may be prevented.

Accordingly, when an area in which the liquid crystal molecules RM are aligned by the first branch portions B1 is referred to as the first domain DM1 and a direction in which the liquid crystal molecules RM are aligned in the first domain DM1 by the electric field is referred to as a first liquid crystal alignment direction DR1, the first liquid crystal alignment direction DR1 may be the third direction D3 that is the same as the first lower alignment direction LD1 and the first upper alignment direction UD1 in the first domain DM1.

Referring to FIGS. 4B and 5, the second branch portions B2 extend in the fourth direction D4. Therefore, when electric field is not generated, a portion of the liquid crystal molecules RM, which is disposed adjacent to the first alignment layer 110, is aligned at the second pre-tilt angle A2 by the first alignment layer 110, and a portion of the liquid crystal molecules RM, which is disposed adjacent to the second alignment layer 310, is aligned at the second pre-tilt angle A2 by the second alignment layer 310.

When a direction in which the liquid crystal molecules RM are aligned by the first alignment layer 110 in a plan view is referred to as a second lower alignment direction LD2 and a direction in which the liquid crystal molecules RM are aligned by the second alignment layer 310 in a plan view is referred to as a second upper alignment direction UD2, the second upper alignment direction UD2 and the second lower alignment direction LD2 are substantially parallel to the fourth direction D4. That is, the second lower alignment direction LD2 is the same as the second upper alignment direction UD2.

When the electric field is generated, the liquid crystal molecules RM become more inclined by the electric field, and thus the liquid crystal molecules RM are aligned in the fourth direction D4 substantially parallel to the second branch portions B2. Thus, the second upper alignment direction UD2 and the second lower alignment direction LD2 are the same and directions in which the liquid crystal molecules RM are aligned by the electric field are the same. As a result, a second liquid crystal alignment direction DR2 may be the fourth direction D4 that is the same as the second lower alignment direction LD2 and the second upper alignment direction UD2 in the second domain DM2.

Referring to FIGS. 4C and 5, the third branch portions B3 extend in the fifth direction D5. Therefore, when electric field is not generated, a portion of the liquid crystal molecules RM, which is disposed adjacent to the first alignment layer 110, is aligned at a third pre-tilt angle A3 by the first alignment layer 110, and a portion of the liquid crystal molecules RM, which is disposed adjacent to the second alignment layer 310, is aligned at the third pre-tilt angle A3 by the second alignment layer 310.

When a direction in which the liquid crystal molecules RM are aligned by the first alignment layer 110 in a plan view is referred to as a third lower alignment direction LD3 and a direction in which the liquid crystal molecules RM are aligned by the second alignment layer 310 in a plan view is referred to as a third upper alignment direction UD3, the third upper alignment direction UD3 and the third lower alignment direction LD3 are substantially the same as the fifth direction D5. That is, the third lower alignment direction LD3 is the same as the third upper alignment direction UD3.

When the electric field is generated, the liquid crystal molecules RM become more inclined by the electric field, and thus the liquid crystal molecules RM are aligned in the fifth direction D5 substantially parallel to the third branch portions B3. Thus, the third upper alignment direction UD3 and the third lower alignment direction LD3 are the same and directions in which the liquid crystal molecules RM are aligned by the electric field are the same. As a result, a third liquid crystal alignment direction DR3 may be the fifth direction D5 that is the same as the third lower alignment direction LD3 and the third upper alignment direction UD3 in the third domain DM3.

Referring to FIGS. 4D and 5, the fourth branch portions B4 extend in the sixth direction D6. Therefore, when electric field is not generated, a portion of the liquid crystal molecules RM, which is disposed adjacent to the first alignment layer 110, is aligned at a fourth pre-tilt angle A4 by the first alignment layer 110, and a portion of the liquid crystal molecules RM, which is disposed adjacent to the second alignment layer 310, is aligned at the fourth pre-tilt angle A4 by the second alignment layer 310.

When a direction in which the liquid crystal molecules RM are aligned by the first alignment layer 110 in a plan view is referred to as a fourth lower alignment direction LD4 and a direction in which the liquid crystal molecules RM are aligned by the second alignment layer 310 in a plan view is referred to as a fourth upper alignment direction UD4, the fourth upper alignment direction UD4 and the fourth lower alignment direction LD4 are substantially the same as the sixth direction D6. That is, the fourth lower alignment direction LD4 is the same as the fourth upper alignment direction UD4.

When the electric field is generated, the liquid crystal molecules RM become more inclined by the electric field, and thus the liquid crystal molecules RM are aligned in the sixth direction D6 substantially parallel to the fourth branch portions B4. Thus, the fourth upper alignment direction UD4 and the fourth lower alignment direction LD4 are the same and directions in which the liquid crystal molecules RM are aligned by the electric field are the same. As a result, a fourth liquid crystal alignment direction DR4 may be the sixth direction D6 that is the same as the fourth lower alignment direction LD4 and the fourth upper alignment direction UD4 in the fourth domain DM4.

As described above, the first to fourth domains DM1 to DM4 sequentially arranged in the second direction D2 are defined in the first sub-pixel area PA1 and the liquid crystal alignment directions in the first to fourth domains DM1 to DM4, in which the liquid crystal molecules RM are aligned by the electric field, are different from each other. Accordingly, a viewing range about the first sub-pixel area PA1 may be expanded. In an exemplary embodiment, when the electric field is not generated, the alignment defects do not occur in the first to fourth domains DM1 to DM4 since the direction in which the liquid crystal molecules RM are aligned by the first alignment layer 110 in each of the first to fourth domains DM1 to DM4 is substantially the same as the direction in which the liquid crystal molecules RM are aligned by the second alignment layer 310.

Similar to the first sub-pixel area PA1, the second sub-pixel area PA2 includes the fifth to eighth domains DM5 to DM8 sequentially arranged in the second direction D2 and the liquid crystal alignment directions, in which the liquid crystal molecules RM are aligned by the electric field in the fifth to eighth domains DM5 to DM8 are different from each other. In an exemplary embodiment, when the electric field is not generated, the alignment defects do not occur in the fifth to eighth domains DM5 to DM8 since the direction in which the liquid crystal molecules RM are aligned by the first alignment layer 110 in each of the fifth to eighth domains DM5 to DM8 is substantially the same as the direction in which the liquid crystal molecules RM are aligned by the second alignment layer 310.

Hereinafter, effects obtained when the first to eighth domains DM1 to DM8 are defined in the first and second sub-pixel areas PA1 and PA2 will be described through the first and second domains DM1 and DM2.

Referring to FIGS. 1C, 4A, and 5, when the LCD 500 is curved in the first direction D1, the misalignment occurs between the display substrate 100 and the opposite substrate 300 by a first length LTH1.

According to the illustrated exemplary embodiment, however, since the first to eighth domains DM1 to DM8 are arranged in the second direction D2 substantially vertical to the first direction D1, the alignment defects which are caused by the misalignment do not occur in the first domain DM1.

In more detail, when an area AR1 in which the liquid crystal molecules RM are aligned by the first alignment layer 110 disposed on the display substrate 100 is referred to as a lower alignment area AR1 and an area AR2 in which the liquid crystal molecules RM are aligned by the second alignment layer 310 disposed on the opposite substrate 300 is referred to as an upper alignment area AR2, the liquid crystal molecules RM are aligned in the first lower alignment direction LD1 in the lower alignment area AR1 and aligned in the first upper alignment direction UD1 in the upper alignment area AR2. In this case, when the opposite substrate 300 is shifted by the first length LTH1 by the misalignment, a position of the lower alignment area AR1 matches with a position of the first domain DM1, but a position of the upper alignment area AR2 is shifted from the position of the first domain DM1 to the first direction D1 by the first length LTH1.

In the illustrated exemplary embodiment, although the position of the lower alignment area AR1 does not match with the upper alignment area AR2 by the shift of the opposite substrate 300, the lower alignment area AR1 is overlapped with the upper alignment area AR2 in the first domain DM1. That is, the lower alignment area AR1 is not overlapped with another upper alignment area, which is aligned in a different direction from the upper alignment area AR2, in the first domain DM1.

Accordingly, alignment defects, which are caused by the overlap between the upper alignment area and the lower alignment area aligned in the different direction from the upper alignment area, do not occur in the first domain DM1. As a result, a transmittance of the light passing through the first domain DM1 may be prevented from being lowered due to the alignment defects.

Hereinafter, a structure of first and second sub-pixel electrodes according to another exemplary embodiment will be described.

Figure 6A:
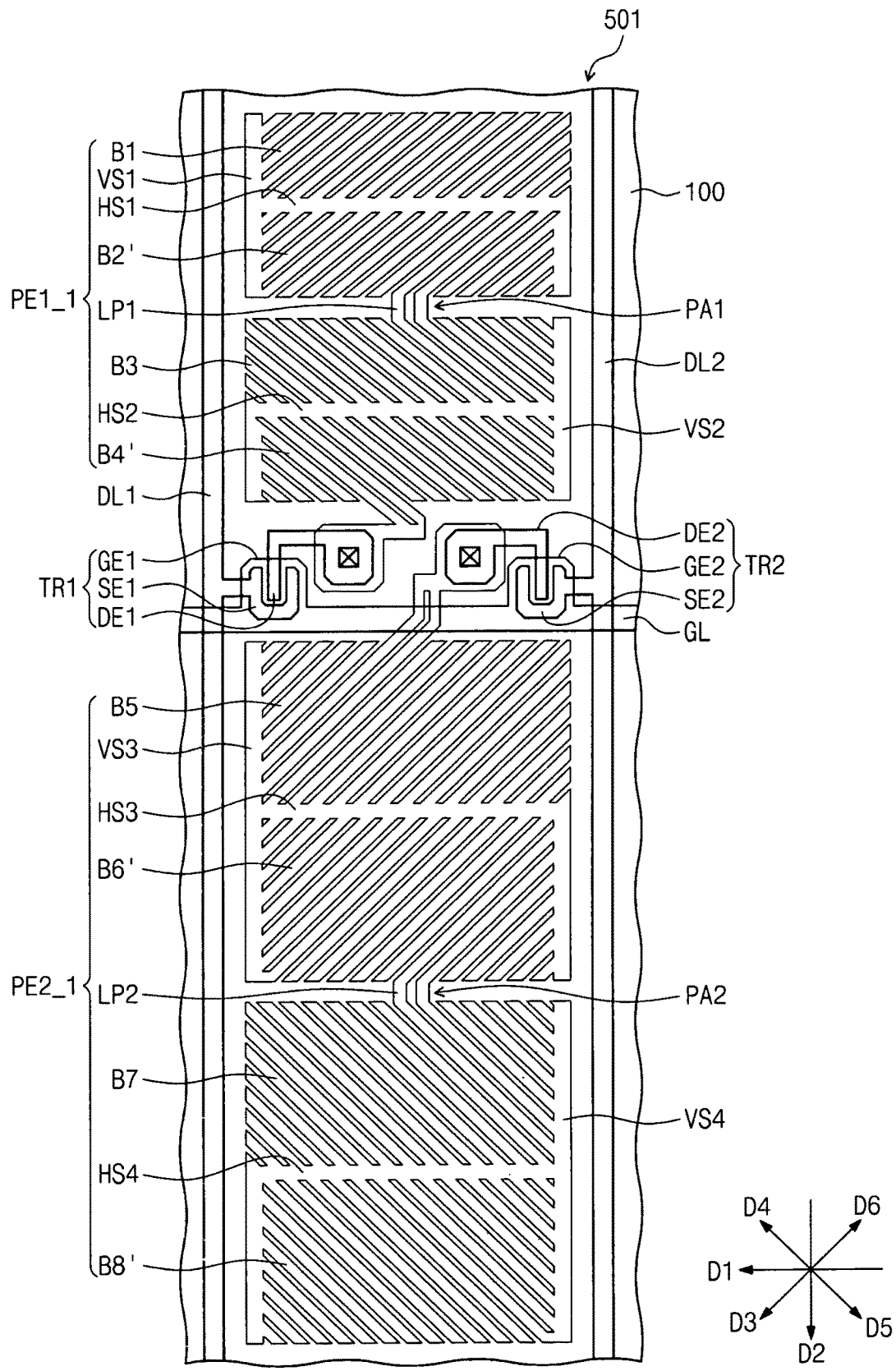
FIG. 6A is a plan view showing another exemplary embodiment of a pixel of an LCD according to the invention.
Figure 6B:
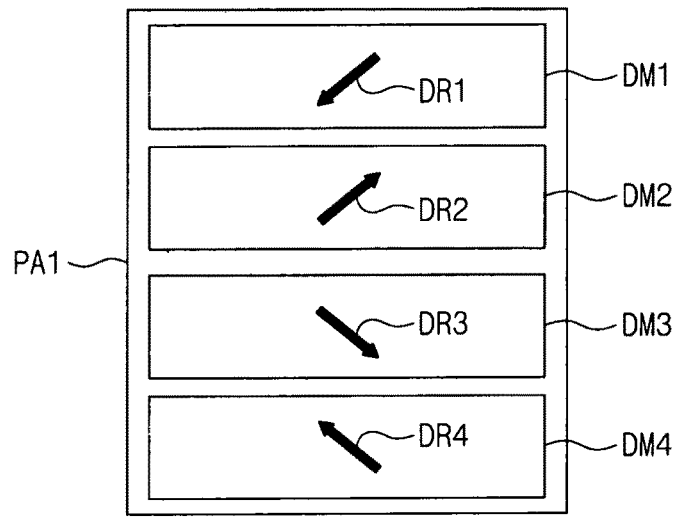
FIG. 6B is a view showing domains of the pixel shown in FIG. 6A.

FIG. 6A is a plan view showing a pixel of an LCD 501 according to another exemplary embodiment of the invention and FIG. 6B is a view showing domains of the pixel shown in FIG. 6A. In FIGS. 6A and 6B, the same reference numerals denote the same elements in the above-described figures, and thus detailed descriptions of the same elements will be omitted.

Referring to FIGS. 6A and 6B, different from the first sub-pixel electrode PE1 shown in FIG. 2, each of second branch portions B2' of a first sub-pixel electrode PE1_1 extends in a sixth direction D6 and each of fourth branch portions B4' of the first sub-pixel electrode PE1_1 extends in a fourth direction D4. In an exemplary embodiment, each of sixth branch portions B6' of a second sub-pixel electrode PE2_1 extends in the sixth direction D6 and each of eighth branch portions B8' of the second sub-pixel electrode PE2_1 extends in the fourth direction D4.

As a result, a first liquid crystal alignment direction DR1 substantially parallel to the third direction D3 may be defined in the first domain DM1, a second liquid crystal alignment direction DR2 substantially parallel to the sixth direction D6 may be defined in the second domain DM2, a third liquid crystal alignment direction DR3 substantially parallel to the fifth direction D5 may be defined in the third domain DM3, and a fourth liquid crystal alignment direction DR4 substantially parallel to the fourth direction D4 may be defined in the fourth domain DM2. Accordingly, the first, second, third, and fourth liquid crystal alignment directions DR1, DR2, DR3, and DR4, which are different from each other, may be defined in the first to fourth domains DM1 to DM4.

Figure 7:
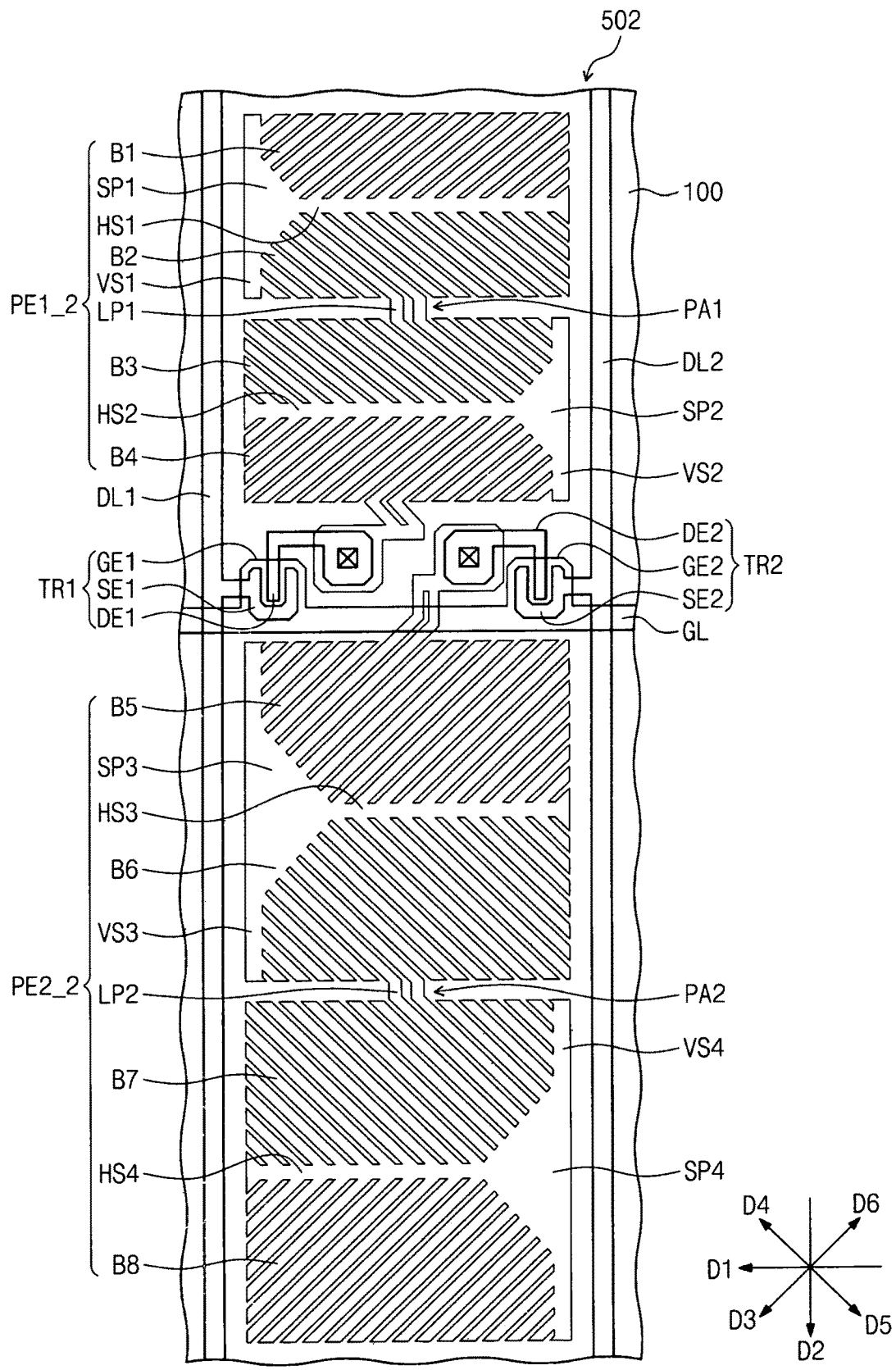
FIG. 7 is a plan view showing another exemplary embodiment of a pixel of an LCD according to the invention.

FIG. 7 is a plan view showing a pixel of an LCD 502 according to another exemplary embodiment of the invention. In FIG. 7, the same reference numerals denote the same elements in the above-described figures, and thus detailed descriptions of the same elements will be omitted.

Referring to FIG. 7, a first sub-pixel electrode PE1_2 includes a first stem connection portion SP1 and a second stem connection portion SP2 and a second sub-pixel electrode PE2-2 includes a third stem connection portion SP3 and a fourth stem connection portion SP4. Since the first to fourth stem connection portions SP1 to SP4 have the similar structure, the first stem connection portion SP1 will be described in detail as a representative example and details of the second to fourth stem connection portions SP2 to SP4 will be omitted.

In the illustrated exemplary embodiment, the first stem connection portion SP1 is disposed at a position, at which a first vertical stem portion VS1 cross a first horizontal stem portion HS1, and connected to the first vertical stem portion VS1 and the first horizontal stem portion HS1. In an exemplary embodiment, the first stem connection portion SP1 may have a triangular shape when viewed in a plan view.

Different from the illustrated exemplary embodiment, when the first stem connection portion SP1 is omitted from the first sub-pixel electrode PE1_2, an angle between the first vertical stem portion VS1 and the first horizontal stem portion HS1 connected to the first vertical stem portion VS1 is about 90 degrees, and thus an intensity of a first fringe field generated at the position at which the first vertical stem portion VS1 crosses the first horizontal stem portion HS1 is increased. In this case, since the first fringe field and a second fringe field having a different direction from that of the first fringe field act in opposition to each other, the alignment defects occur in the liquid crystal molecules in the first and second domains DM1 and DM2 (refer to FIG. 5). In the illustrated exemplary embodiment, however, the angle between the first vertical stem portion VS1 and the first horizontal stem portion HS1 connected to the first vertical stem portion VS1 is smaller than 90 degrees by the first stem connection portion SP1. As a result, the intensity of the first fringe field is reduced and the first and second fringe fields may be prevented from acting in opposition to each other, thereby preventing the occurrence of the alignment defects.

Figure 8A:
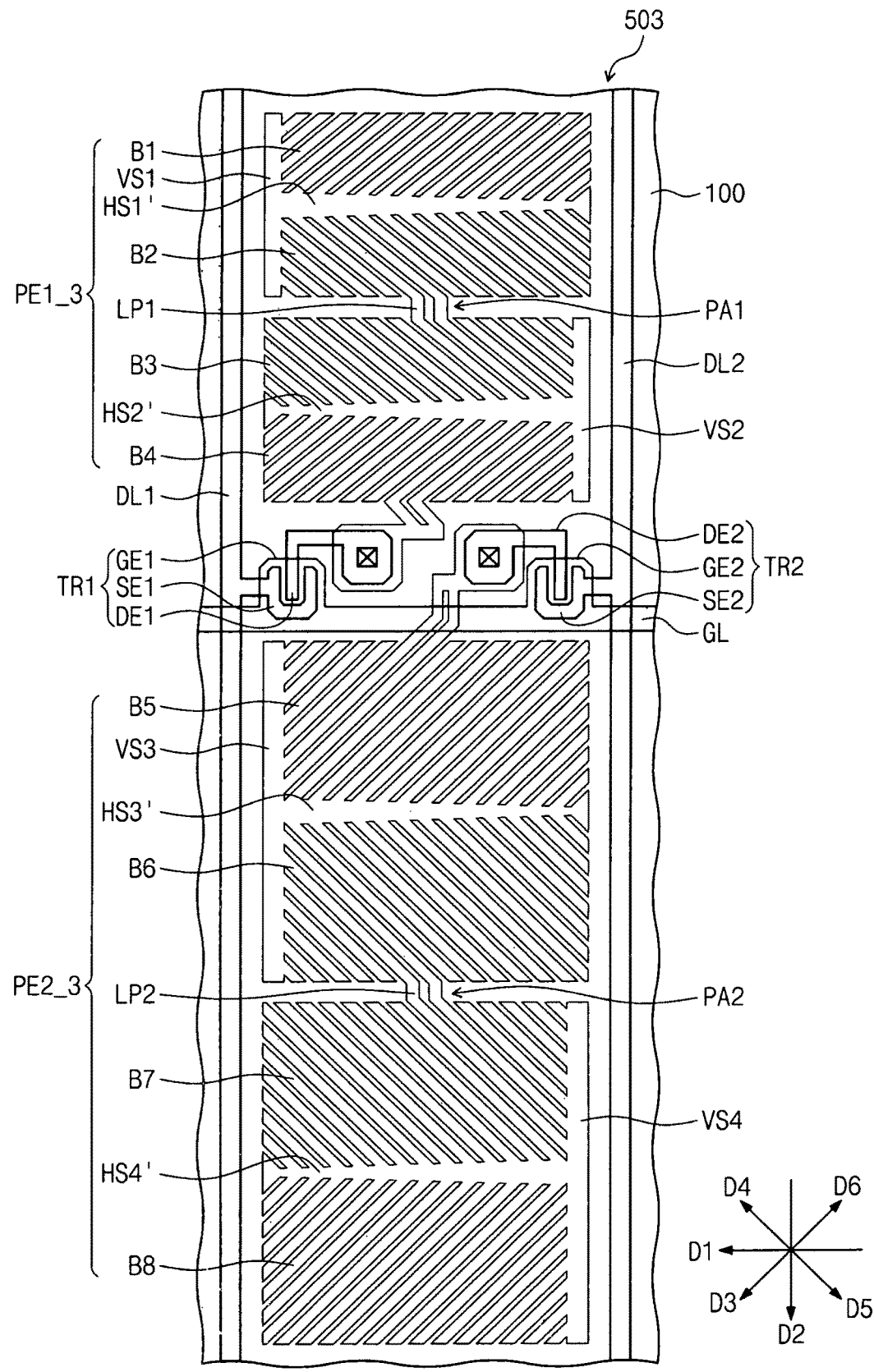
FIG. 8A is a plan view showing another exemplary embodiment of a pixel of an LCD according to the invention.
Figure 8B:
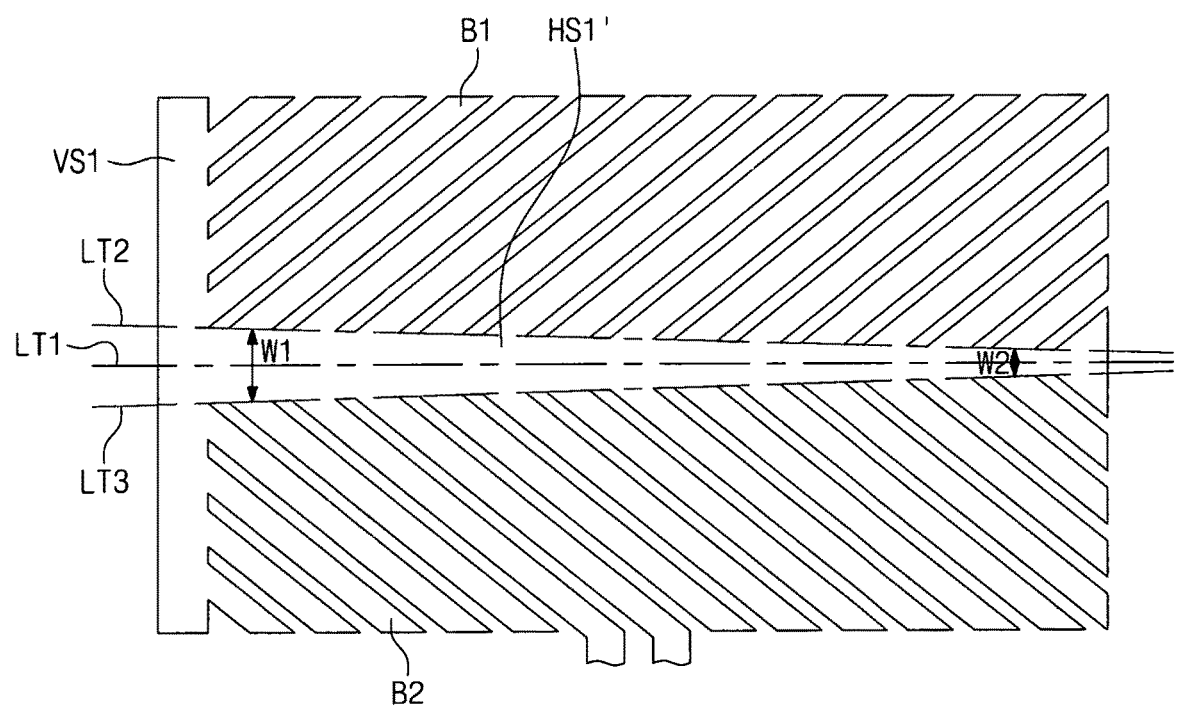
FIG. 8B is an enlarged view showing a first horizontal stem portion shown in FIG. 8A.

FIG. 8A is a plan view showing a pixel of an LCD 503 according to another exemplary embodiment of the invention and FIG. 8B is an enlarged view showing a first horizontal stem portion shown in FIG. 8A. In FIGS. 8A and 8B, the same reference numerals denote the same elements in the above-described figures, and thus detailed descriptions of the same elements will be omitted.

Referring to FIGS. 8A and 8B, a first sub-pixel electrode PE1_3 includes first and second horizontal stem portions HS1' and HS2' and a second sub-pixel electrode PE2_3 includes third and fourth horizontal stem portions HS3' and HS4'. Since the first, second, third, and fourth horizontal stem portions HS1', HS2', HS3', and HS4' have the similar shape, the first horizontal stem portion HS1' will be described in detail as a representative example.

In the illustrated exemplary embodiment, a width of the first horizontal stem portion HS1' becomes smaller as it is farther away from the first vertical stem portion VS1. In more detail, a first width W1 of the first horizontal stem portion HS1' is greater than a second width W2 of the first horizontal stem portion HS1' as shown in FIG. 8B.

In an exemplary embodiment, when a reference line LT1 crossing a center portion of the first horizontal stem portion HS1' is defined and a first auxiliary line LT2 crossing an edge of the first horizontal stem portion HS1' and a second auxiliary line LT3 crossing an edge of the other edge of the first horizontal stem portion HS1' are defined, a slope between the reference line LT1 and the first auxiliary line LT2 is in a range from about 0.5 degree to about 2.0 degrees and a slope between the reference line LT1 and the second auxiliary line LT3 is in a range from about 0.5 degree to about 2.0 degrees.

As the width of the first horizontal stem portion HS1' is decreased, the intensity of the fringe field acting to the first horizontal stem portion HS1' is increased. Accordingly, when the width of the first horizontal stem portion HS1' becomes smaller as it is farther away from the first vertical stem portion VS1, the intensity of the fringe filed becomes stronger as it is farther from one end of and closer to the other end of each of the first and second domains DM1 and DM2 (refer to FIG. 5). As a result, the fringe fields acting in different directions at both ends of the first horizontal stem portion HS1' have the same intensity, and thus the alignment defects may be prevented from occurring in the liquid crystal molecules due to the fringe fields acting in opposition to each other.

Figure 9:
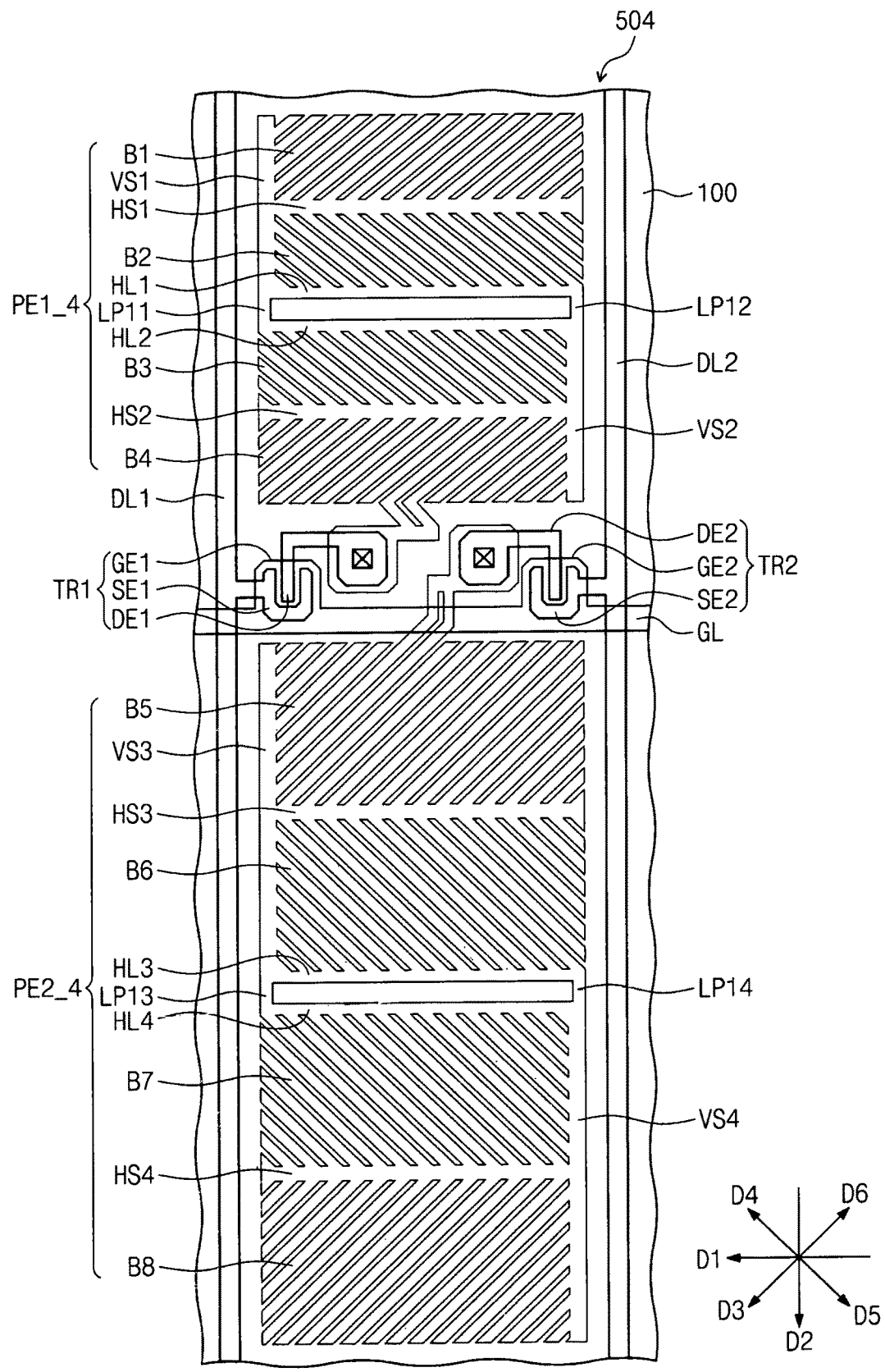
FIG. 9 is a plan view showing another exemplary embodiment of a pixel of an LCD according to the invention.

FIG. 9 is a plan view showing a pixel of an LCD 504 according to another exemplary embodiment of the invention. In FIG. 9, the same reference numerals denote the same elements in the above-described figures, and thus detailed descriptions of the same elements will be omitted.

Referring to FIG. 9, a first sub-pixel electrode PE1_4 includes a first branch connection portion HL1, a second branch connection portion HL2, a first domain connection portion LP11, and a second domain connection portion LP12, and a second sub-pixel electrode PE2_4 includes a third branch connection portion HL3, a fourth branch connection portion HL4, a third domain connection portion LP13, and a fourth domain connection portion LP14.

Since the first to fourth branch connection portions HL1 to HL4 have the similar structure and function, the first and second branch connection portions HL1 and HL2 will be described in detail as representative examples. In an exemplary embodiment, since the first and second domain connection portions LP11 and LP12 have the similar structure and function as those of the third and fourth domain connection portions LP13 and LP14, the first and second domain connection portions LP11 and LP12 will be described in detail as representative examples.

Each of the first and second branch connection portions HL1 and HL2 extends in a first direction D1. The first branch connection portion HL1 connects edges of the second branch portions B2 to each other and the second branch connection portion HL2 connects edges of the third branch portions B3. As a result, a fringe field acting to the edges of the second branch portions B2 may be prevented from acting to the third domain DM3 (refer to FIG. 5) by the first branch connection portion HL1, and a fringe field acting to the edges of the third branch portions B3 may be prevented from acting to the second domain DM2 (refer to FIG. 5) by the second branch connection portion HL2. Thus, the second and third domains DM2 and DM3 may be clearly distinct from each other by the first and second branch connection portions HL1 and HL2.

In the above-described embodiment shown in FIG. 2, the domain connection portion LP1 (refer to FIG. 2) that connects the second branch portions B2 and the third branch portions B3 is disposed at the center portion of the boundary area between the second and third domains. In the illustrated exemplary embodiment shown in FIG. 9, however, the first and second domain connection portions LP11 and LP12 are disposed at both ends of the boundary area to connect the second branch portions B2 to the third branch portions B3.

Figure 10A:
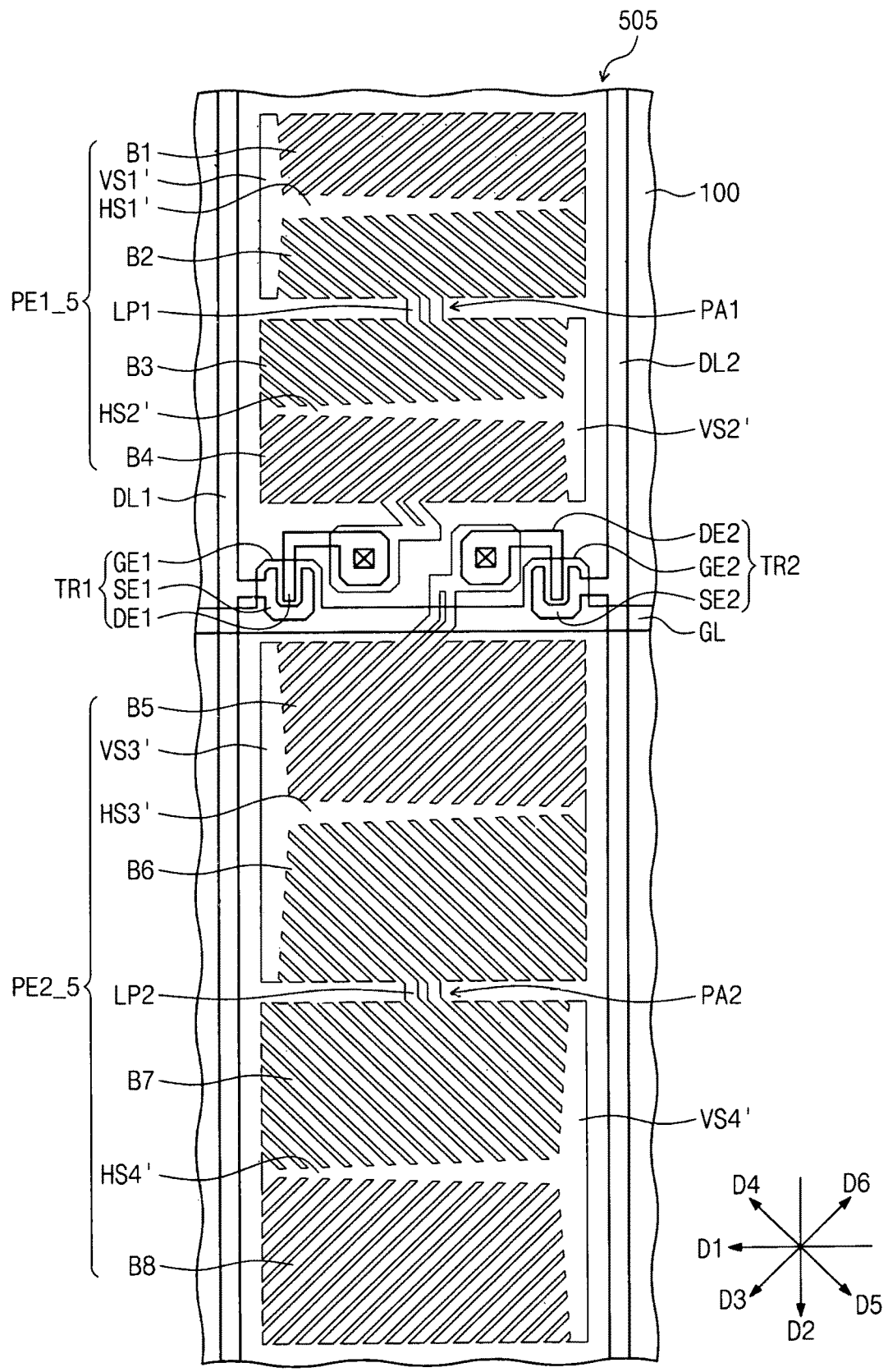
FIG. 10A is a plan view showing another exemplary embodiment of a pixel of an LCD according to the invention.
Figure 10B:
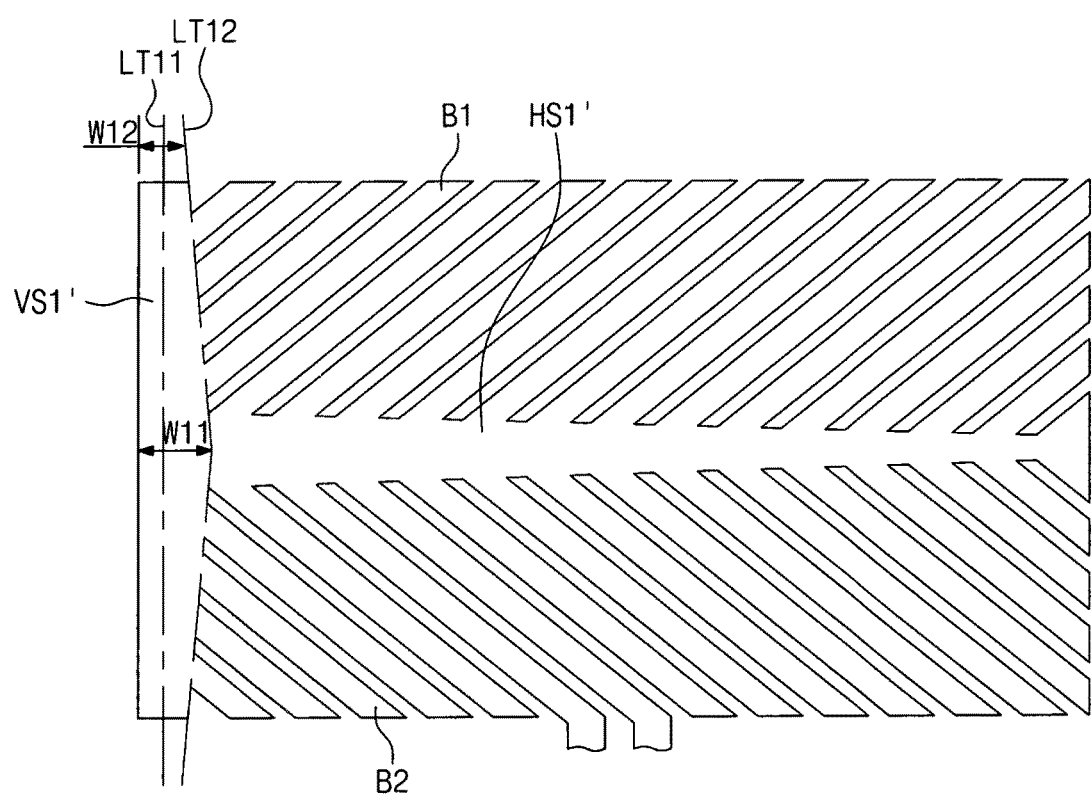
FIG. 10B is an enlarged view showing a first vertical stem portion shown in FIG. 10A.

FIG. 10A is a plan view showing a pixel of an LCD 505 according to another exemplary embodiment of the invention and FIG. 10B is an enlarged view showing a first vertical stem portion shown in FIG. 10A. In FIGS. 10A and 10B, the same reference numerals denote the same elements in the above-described figures, and thus detailed descriptions of the same elements will be omitted.

Referring to FIGS. 10A and 10B, a first sub-pixel electrode PE1_5 includes first and second vertical stem portions VS1' and VS2' and a second sub-pixel electrode PE2_5 includes third and fourth vertical stem portions VS3' and VS4'. Since the first to fourth vertical stem portions VS1' to VS4' have the similar structure and function, the first vertical stem portion VS1' will be described in detail as a representative example.

In the illustrated exemplary embodiment, a width of the first vertical stem portion VS1' becomes smaller as it is farther away from a center portion thereof and closer to an edge thereof in a plan view. In more detail, a first width W11 of the first vertical stem portion VS1' is greater than a second width W12 of the first vertical stem portion VS1' as shown in FIG. 10B.

In an exemplary embodiment, when a reference line LT11 crossing the center portion of the first vertical stem portion VS1' is defined and an auxiliary line LT12 crossing the edge of the first vertical stem portion VS1' is defined, a slope between the reference line LT11 and the auxiliary line LT12 is in a range from about 0.5 degree to about 2.0 degrees.

As the width of the first vertical stem portion VS1' is decreased, the intensity of the fringe field acting to the first vertical stem portion VS1' is increased. Accordingly, when the edge of the first vertical stem portion VS1' corresponds to one end of the first domain DM1 (refer to FIG. 5) and the center portion of the first vertical horizontal portion VS1' corresponds to the other end of the first domain, the width of the first vertical stem portion VS1' becomes smaller as it is closer to the edge from the center portion, and thus the intensity of the fringe field acting to the first vertical stem portion VS1' becomes stronger as it is closer to the one end of the first domain DM1 (refer to FIG. 5) from the other end of the first domain DM1. As a result, the fringe fields acting in different directions at both ends of the first vertical stem portion VS1' have the same intensity, and thus the alignment defects may be prevented from occurring in the liquid crystal molecules due to the fringe fields acting in opposition to each other at both ends of the first domain.

Figure 11:
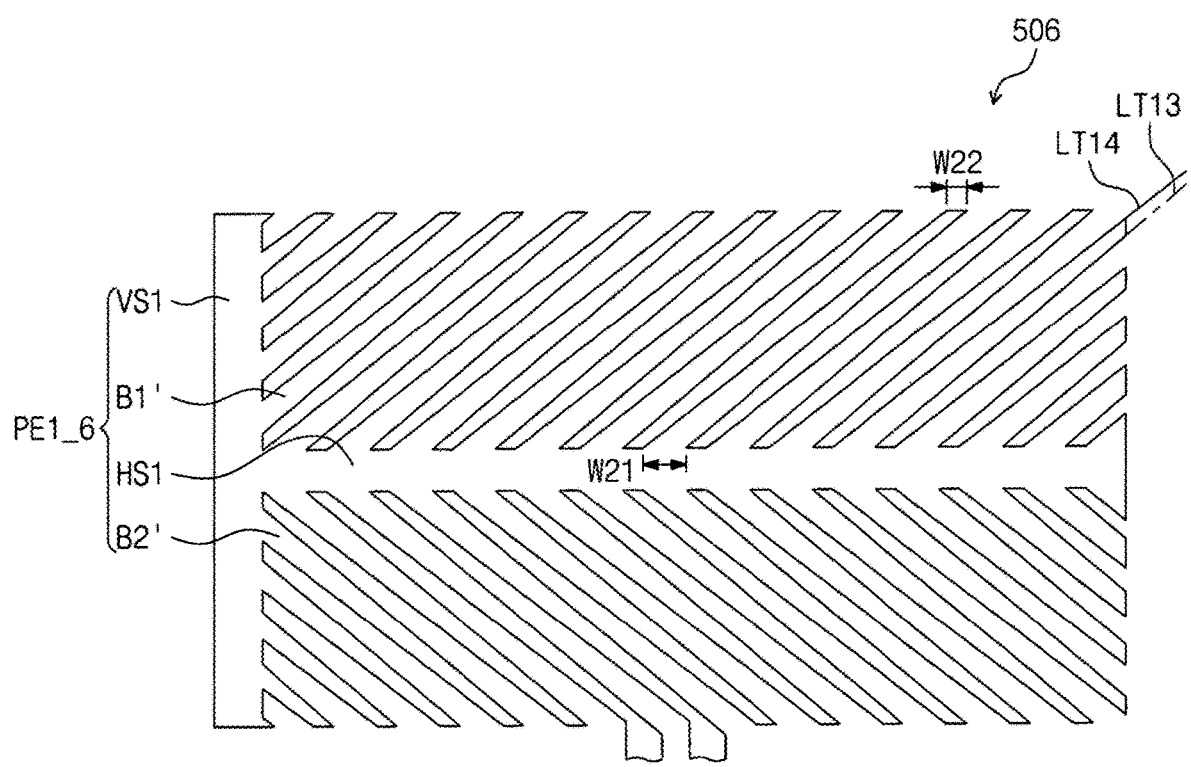
FIG. 11 is a plan view showing another exemplary embodiment of a portion of a first sub-pixel electrode of an LCD according to the invention.

FIG. 11 is a plan view showing a portion of a first sub-pixel electrode PE1_6 of an LCD 506 according to another exemplary embodiment of the invention. In FIG. 11, the same reference numerals denote the same elements in the above-described figures, and thus detailed descriptions of the same elements will be omitted.

Referring to FIG. 11, the first sub-pixel electrode PE1_6 includes first branch portions B1' and second branch portions B2'. In the illustrated exemplary embodiment, a width of each of the first branch portions B1' becomes smaller as it is farther away from the first vertical stem portion VS1 or the first horizontal stem portion HS1, and a width of each of the second branch portions B2' becomes smaller as it is farther away from the first vertical stem portion VS1 or the first horizontal stem portion HS1. Hereinafter, one first branch portion B1' of the first branch portions B1' will be described in detail as a representative example.

A first width W21 of the first branch portion B1' is greater than a second width W22 of the first branch portion B1'. In an exemplary embodiment, when a reference line LT13 crossing one edge of the first branch portion B1' is defined and an auxiliary line LT14 crossing the other edge of the first branch portion B1' is defined, a slope between the reference line LT13 and the auxiliary line LT14 is in a range from about 0.1 degree to about 0.5 degree.

As the width of the first branch portion B1' is decreased, the intensity of the fringe field acting to the first branch portion B1' is increased. Accordingly, when the first branch portion B1' has the above-described structure, the intensity of the fringe field acting to the first branch portion B1' becomes stronger as it is closer to the other end of the first domain DM1 (refer to FIG. 5) from the one end of the first domain DM1. As a result, the fringe fields acting in different directions at both ends of the first branch portion B1' have the same intensity, and thus the alignment defects may be prevented from occurring in the liquid crystal molecules due to the fringe fields acting in opposition to each other at both ends of the first domain.

Figure 12:
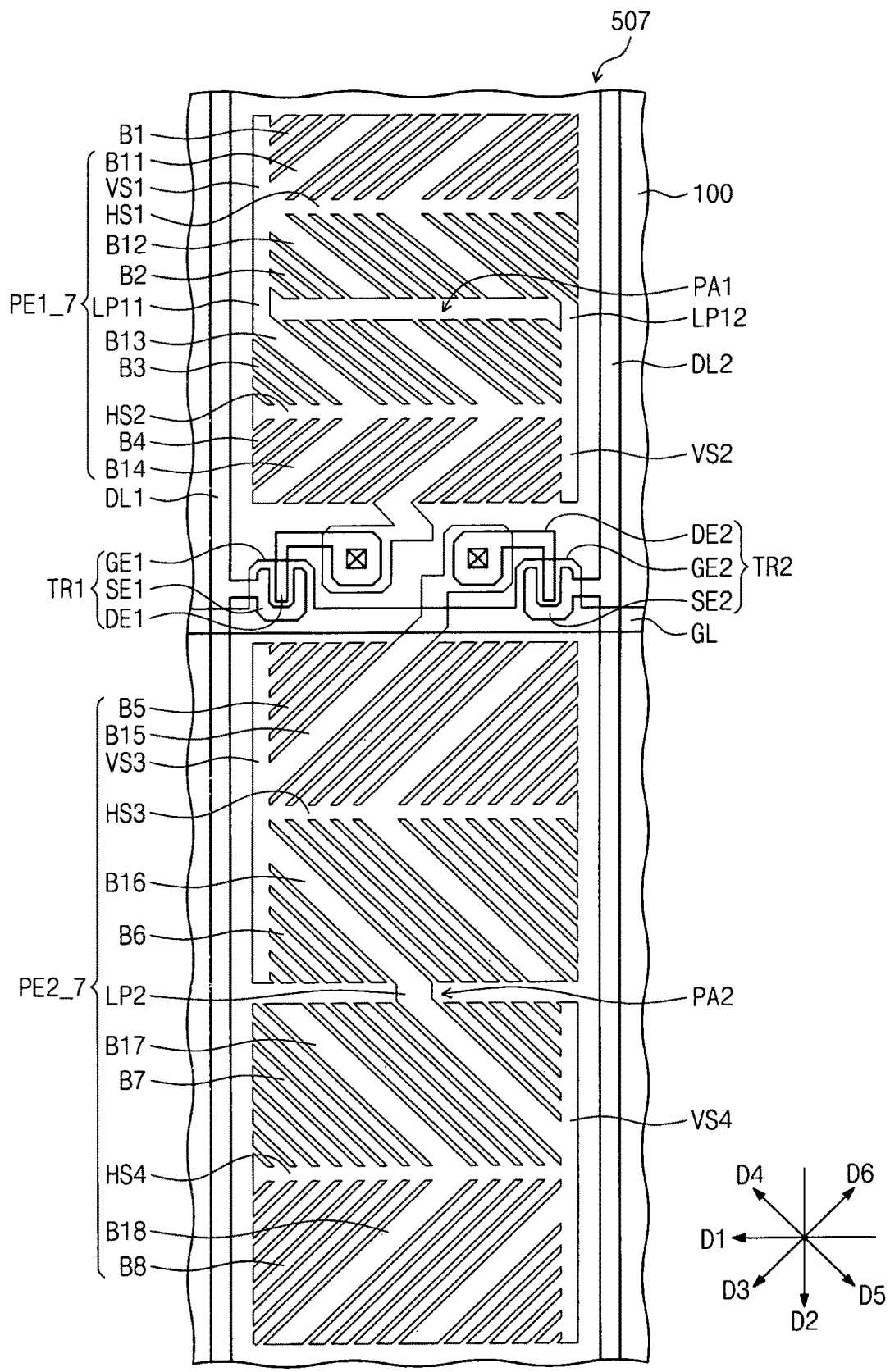
FIG. 12 is a plan view showing another exemplary embodiment of a pixel of an LCD according to the invention.

FIG. 12 is a plan view showing a pixel of an LCD 507 according to another exemplary embodiment of the invention. In FIG. 12, the same reference numerals denote the same elements in the above-described figures, and thus detailed descriptions of the same elements will be omitted.

Referring to FIG. 12, a first sub-pixel electrode PE1_7 includes first, second, third, and fourth branch portions B1, B2, B3, and B4 and first, second, third, and fourth sub-branch portions B11, B12, B13, and B14, and a second sub-pixel electrode PE2_7 includes fifth, sixth, seventh, and eighth branch portions B5, B6, B7, and B8 and fifth, sixth, seventh, and eighth sub-branch portions B15 B16, B17, and B18. Since the first to eighth sub-branch portions B11 to B18 have the similar structure and function, one first sub-branch portion B11 will be described in detail as a representative example.

A width of the first sub-branch portion B11 is greater than a width of each of the first branch portions B1, and thus an intensity of a first fringe field acting to the first sub-branch portion B11 is smaller than an intensity of a second fringe field acting to each of the first branch portions B1. Therefore, since the first sub-branch portion B11 is disposed between two adjacent first branch portions B1 to each other in the first domain DM1 (refer to FIG. 5), the fringe field acting to the first domain may be easily induced from an edge to a center portion of the first domain DM1. Thus, alignment defects caused by the unclear direction of the fringe field in the first domain DM1 may be prevented.

Figure 13:
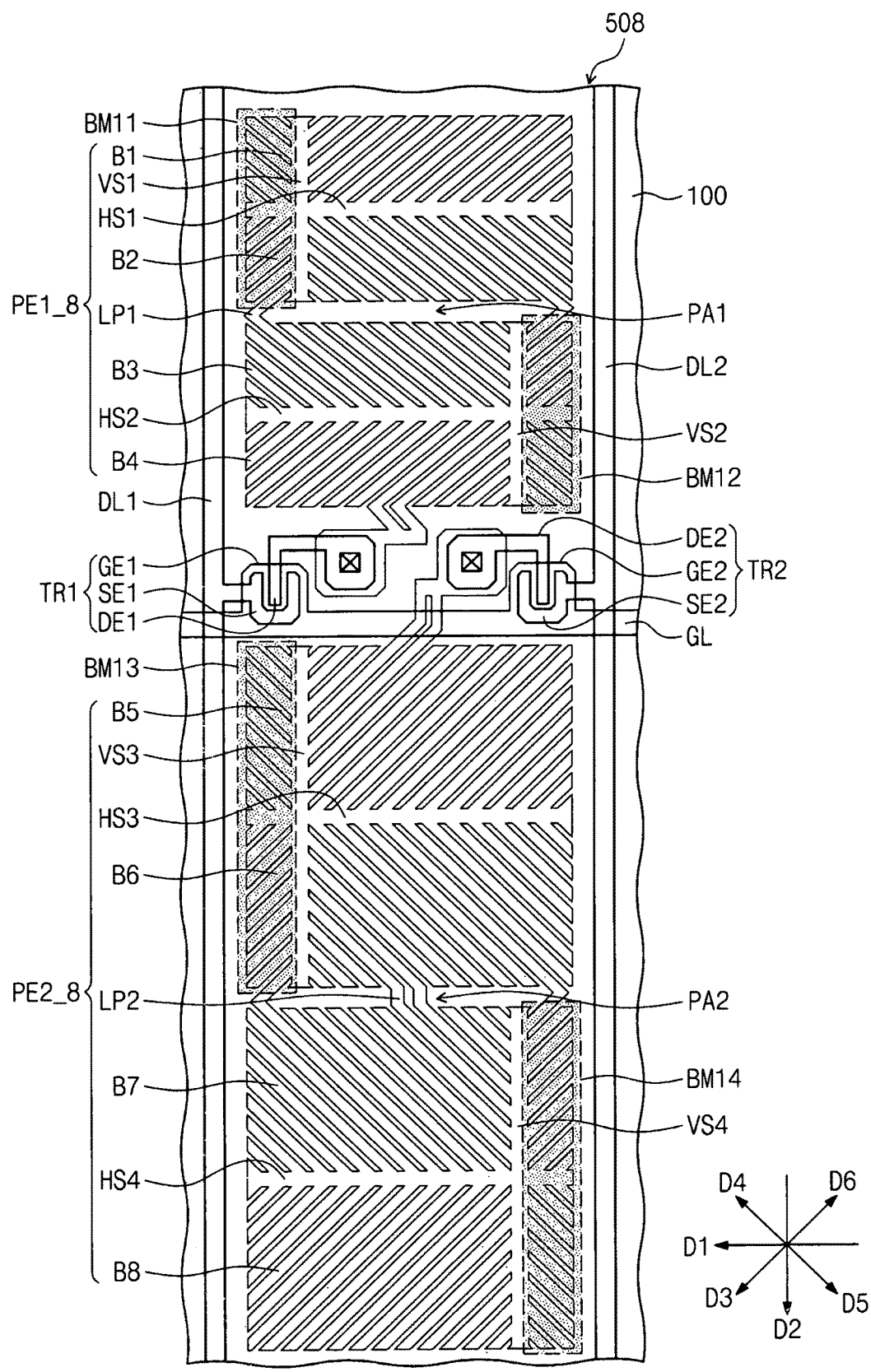
FIG. 13 is a plan view showing another exemplary embodiment of a pixel of an LCD according to the invention.

FIG. 13 is a plan view showing a pixel of an LCD 508 according to another exemplary embodiment of the invention. In FIG. 13, the same reference numerals denote the same elements in the above-described figures, and thus detailed descriptions of the same elements will be omitted.

Referring to FIG. 13, the LCD 508 includes a first sub-pixel electrode PE1_8, a second sub-pixel electrode PE2_8, and first, second, third, and fourth light blocking members BM11, BM12, BM13, and BM14. Since the first to fourth light blocking members BM11 to BM14 have the similar structure and function, the first light blocking member BM11 will be described in detail as a representative example.

In the illustrated exemplary embodiment, a first vertical stem portion VS1 is spaced apart from edges of the first branch portions B1 and edges of the second branch portions B2 and connected to the first and second branch portions B1 and B2, and a second vertical stem portion VS2 is spaced apart from edges of the third branch portions B3 and edges of the fourth branch portions B4 and connected to the third and fourth branch portions B3 and B4.

In the illustrated exemplary embodiment, a portion of the first branch portions B1 disposed at one side of the first vertical stem portion VS1 extends in a third direction D3 and a portion of the first branch portions B1 disposed at the other side of the first vertical stem portion VS1 extends in a fourth direction D4. In an exemplary embodiment, a portion of the second branch portions B2 disposed at one side of the first vertical stem portion VS1 extends in the fourth direction D4 and a portion of the second branch portions B2 disposed at the other side of the first vertical stem portion VS1 extends in the third direction D3.

When the first vertical stem portion VS1, the first branch portions B1, and the second branch portions B2 have the above-described structure in the first and second domains DM1 and DM2 (refer to FIG. 5), the liquid crystal alignment directions may be defined by the directions in which the first and second branch portions B1 and B2 extend in the first and second domains. Thus, the liquid crystal alignment directions crossing each other in each of the first and second domains with respect to the first vertical stem portion VS1. When the LCD 508 is curved in the first direction D1, abnormal alignments may partially occur in each of the first and second domains DM1 and DM2.

Therefore, the first light blocking member BM11 may be overlapped with a portion of the first branch portions B1, which extends in the fourth direction, and a portion of the second branch portions B2, which extends in the third direction. As a result, the first light blocking member BM11 covers the portions in which the abnormal alignments occurs in each of the first and second domains, and thus the abnormal alignments of the LCD 508 is not perceived by the user.

In the illustrated exemplary embodiment, each of the first to fourth light blocking members BM11 to BM14 may include a material that blocks the light, e.g., a black matrix, and the first to fourth light blocking members BM11 to BM14 may be disposed on the second base substrate S2 (refer to FIG. 3A), but the first to fourth light blocking members BM11 to BM14 should not be limited thereto or thereby. According to another exemplary embodiment, the first to fourth light blocking members BM11 to BM14 may be disposed on the first base substrate S1 (refer to FIG. 3A) of the LCD 508.

Figure 14:
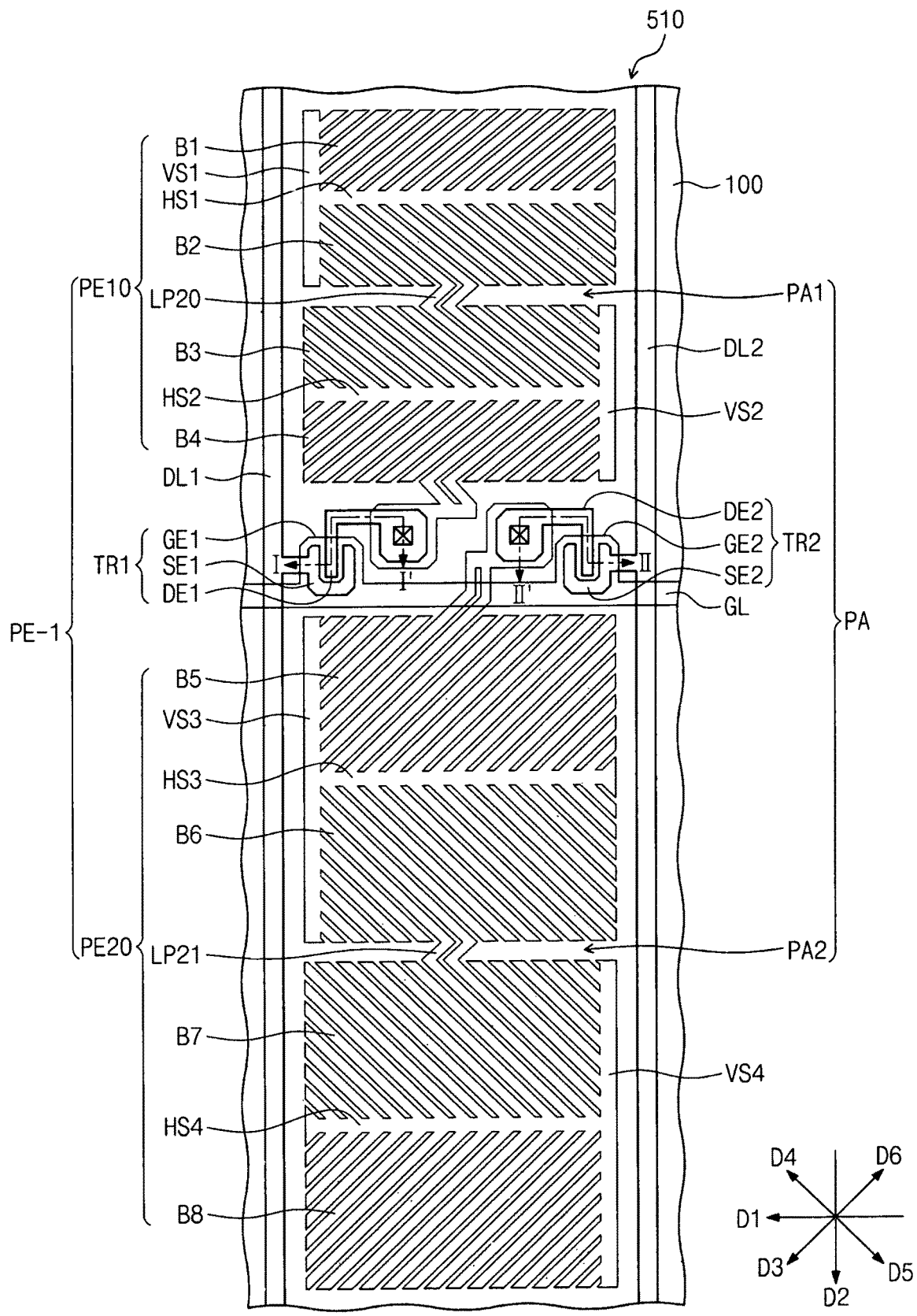
FIG. 14 is a plan view showing another exemplary embodiment of a pixel of an LCD according to the invention.

FIG. 14 is a plan view showing a pixel of an LCD according to another exemplary embodiment of the invention. In FIG. 14, the same reference numerals denote the same elements in the above-described figures, and thus detailed descriptions of the same elements will be omitted.

Referring to FIG. 14, an LCD 510 includes a pixel electrode PE-1 including a first sub-pixel electrode PE10 and a second sub-pixel electrode PE20. In an exemplary embodiment, the first sub-pixel electrode PE10 includes first domain connection portions LP20 and the second sub-pixel electrode PE20 includes second domain connection portions LP21.

The first domain connection portions LP20 is disposed between the second domain DM2 (refer to FIG. 5) and the third domain DM3 (refer to FIG. 5) and each of the first domain connection portions LP20 connects the second and third branch portions B2 and B3. The second domain connection portions LP21 is disposed between the sixth domain DM6 (refer to FIG. 5) and the seventh domain DM7 (refer to FIG. 5) and each of the second domain connection portions LP21 connects the sixth and seventh branch portions B6 and B7. In the illustrated exemplary embodiment, the first domain connection portions LP20 is disposed at a center portion between the second and third domains, and the second domain connection portions LP21 is disposed at a center portion between the sixth and seventh domains.

Hereinafter, the structure of the first domain connection portions LP20 and the second domain connection portions LP21 will be described in detail with reference to FIGS. 15A and 15B.

Figure 15A:
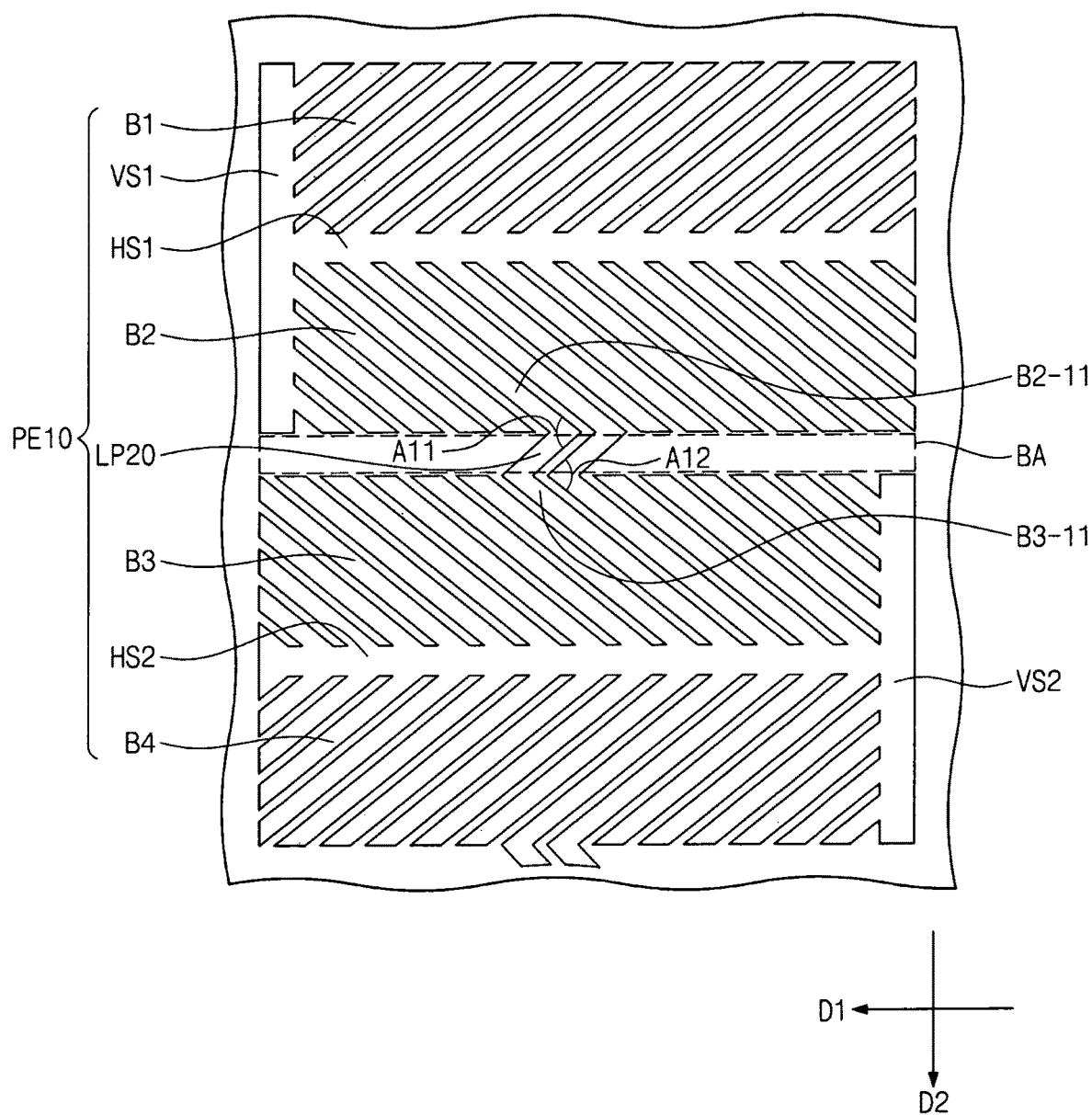
FIG. 15A is an enlarged view showing a first sub-pixel electrode shown in FIG. 14.
Figure 15B:
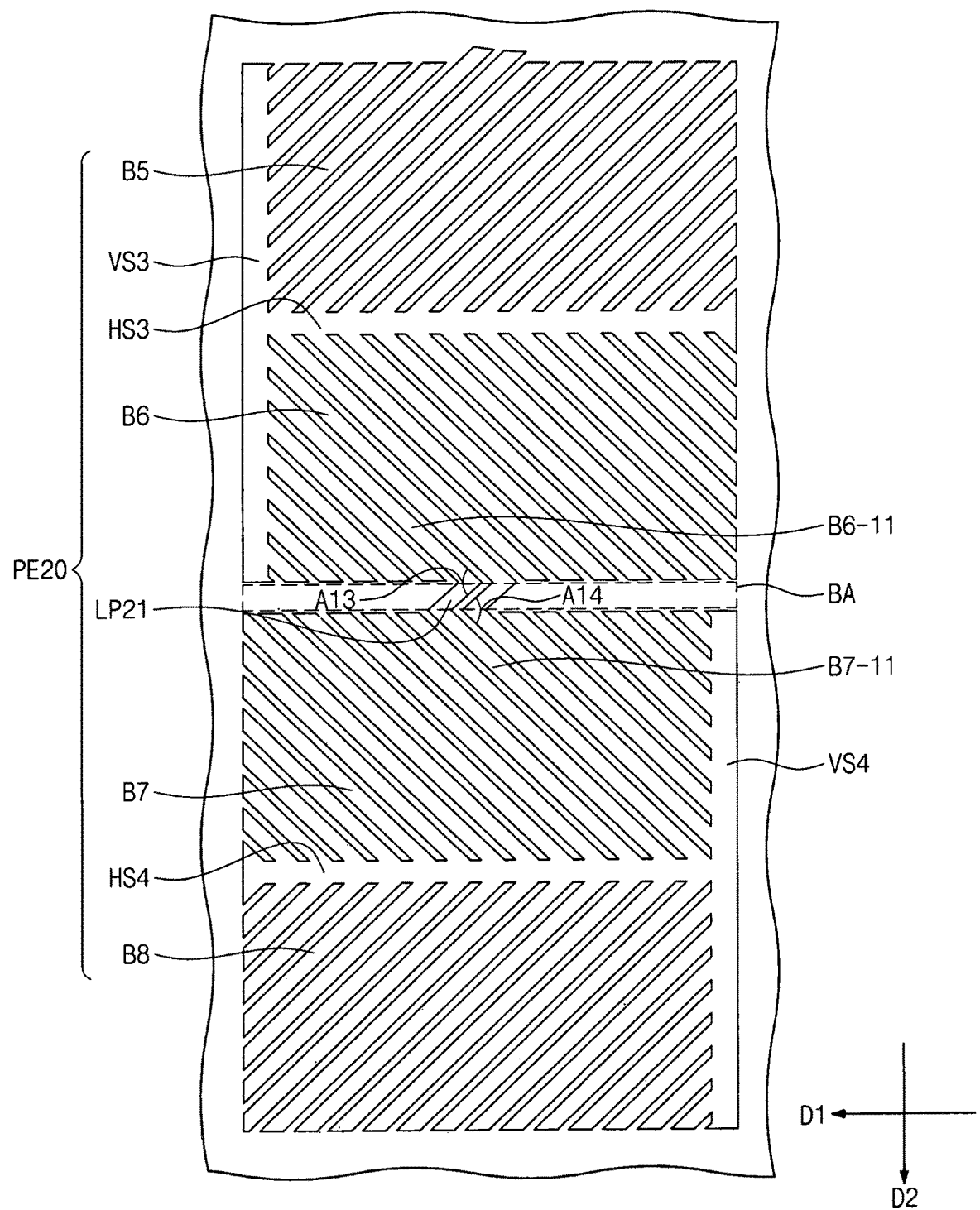
FIG. 15B is an enlarged view showing a second sub-pixel electrode shown in FIG. 14.

FIG. 15A is an enlarged view showing the first sub-pixel electrode shown in FIG. 14 and FIG. 15B is an enlarged view showing the second sub-pixel electrode shown in FIG. 14.

Referring to FIGS. 5 and 15A, the first sub-pixel electrode PE10 includes first domain connection portions LP20, e.g., two first domain connection portions. In the illustrated exemplary embodiment, since the first domain connection portions LP20 have the similar structure and function, one first domain connection portion LP20 will be described in detail as a representative example.

The first domain connection portion LP20 connects one of the second branch portions B2 to one of the third branch portions B3. For the convenience of explanation, when the one second branch portion B2 connected to the first domain connection portion LP20 is referred to as a first connection branch portion B2-11 and one third branch portion B3 connected to the first domain connection portion LP20 is referred to as a second connection branch portion B3-11, one end of the first domain connection portion LP20 is connected to the first connection branch portion B2-11 and the other end of the first domain connection portion LP20 is connected to the second connection branch portion B3-11.

The first domain connection portion LP20 extends in a direction inclined with respect to the first and second directions D1 and D2 when viewed in a plan view, and the first connection branch portion B2-11, the first domain connection portion LP20, and the second connection branch portion B3-11 are connected to each other in a zigzag shape. In the illustrated exemplary embodiment, a first connection angle A11 between the first domain connection portion LP11 and the first connection branch portion B2-11 is in a range from about 60 degrees to about 120 degrees and a second connection angle A12 between the first domain connection portion LP20 and the second connection branch portion B3-11 is in a range from about 60 degrees to about 120 degrees. In an exemplary embodiment, when an acute angle between the first direction D1 and the direction in which each of the first connection branch portion B2-11, the second connection branch portion B3-11, and the first domain connection portion LP20 extends is about 45 degrees, each of the first and second connection angles A11 and A12 is about 90 degrees, for example.

When the first connection branch portion B2-11, the first domain connection portion LP20, and the second connection branch portion B3-11 are connected to each other in the zigzag shape, the following effects occur.

As described with reference to FIGS. 4B and 4C, the liquid crystal molecules RM (refer to FIG. 4B) are aligned in the second liquid crystal alignment direction DR2 in response to the electric field generated between the common electrode CE (refer to FIG. 4B) and the first sub-pixel electrode PE10 in the second domain DM2, and the liquid crystal molecules RM are aligned in the third liquid crystal alignment direction DR3 in the third domain DM3 in response to the electric field. That is, the direction in which the liquid crystal molecules are aligned in the second domain DM2 is different from the direction in which the liquid crystal molecules are aligned in the third domain DM3, and the display quality of the LCD may be improved as the directions in which the liquid crystal molecules are aligned are clearly distinct from each other.

Different from the illustrated exemplary embodiment, when each of the first and second connection angles A11 and A12 exceeds about 120 degrees, i.e., in a range from about 135 degrees to about 180 degrees, the first domain connection portion LP20 is connected to the first and second connection branches B2-11 and B3-11 at a gradual degree. Therefore, the first and second connection branch portions B2-11 and B3-11 are connected to each other by the first domain connection portion LP20 may serve as one branch portion extending from the second domain DM2 to the third domain DM3. As a result, due to the first and second connection branch portions B2-11 and B3-11 crossing through the second and third domains DM2 and DM3 and acting as one branch portion, the directions in which the liquid crystal molecules are aligned are not clearly distinct from each other in the second and third domains DM2 and DM3, and thus the display quality of the LCD including the first sub-pixel area PA1 may be deteriorated. According to the illustrated exemplary embodiment, however, since the first connection branch portion B2-11, the first domain connection portion LP20, and the second connection branch portion B3-11 are connected to each other in the zigzag shape, the first and second connection branch portions B2-11 and B3-11 may be prevented from acting as one branch portion that extends from the second domain DM2 to the third domain DM3.

Referring to FIGS. 5 and 15B, the second sub-pixel electrode PE20 includes second domain connection portions LP21, e.g., two second domain connection portions. In the illustrated exemplary embodiment, the second domain connection portions LP21 are disposed at a center portion of a boundary area between the sixth domain DM6 and the seventh domain DM7.

Hereinafter, one second domain connection portion LP21 will be described in detail as a representative example. The second domain connection portion LP21 connects one of sixth branch portions B6 and one of seventh branch portions B7. When one sixth branch portion B6 connected to the second domain connection portion LP21 is referred to as a third connection branch portion B6-11 and one seventh branch portion B7 connected to the second domain connection portion LP21 is referred to as a fourth connection branch portion B7-11, one end of the second domain connection portion LP21 is connected to the third connection branch portion B6-11 and the other end of the second domain connection portion LP21 is connected to the fourth connection branch portion B7-11.

Figure 6B:
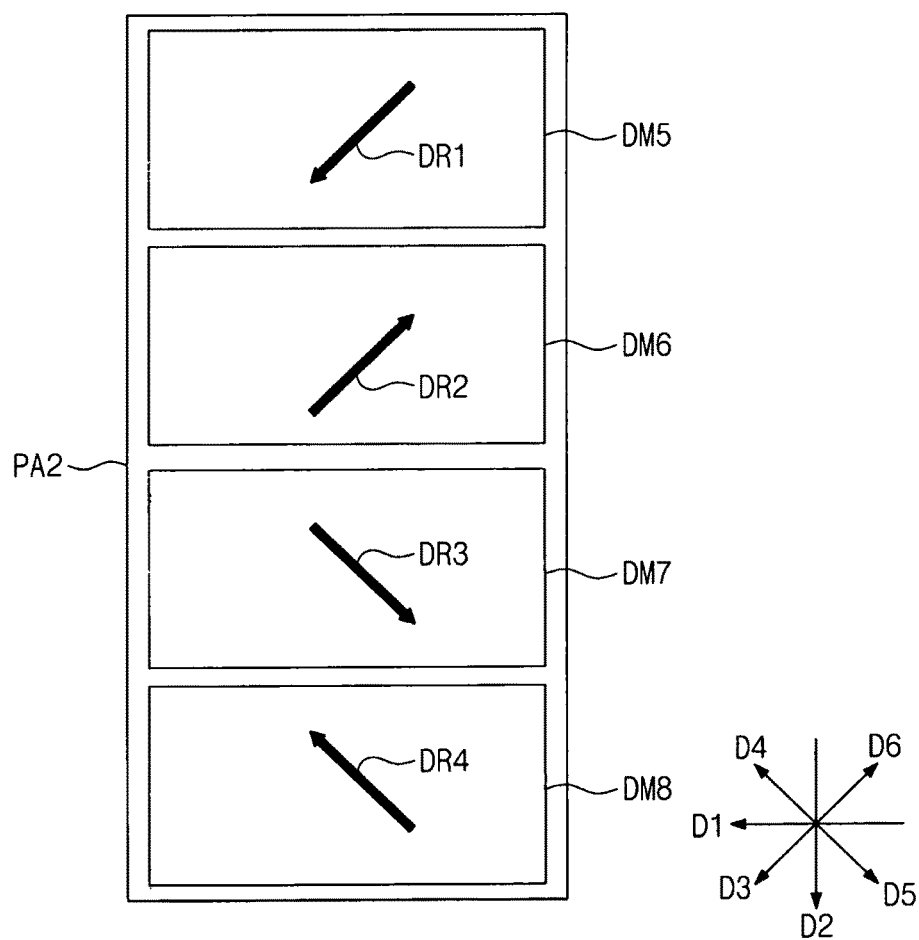

The second domain connection portion LP21 extends in a direction inclined with respect to the first and second directions D1 and D2, and the third connection branch portion B6-11, the second domain connection portion LP21, and the fourth connection branch portion B7-11 are connected to each other in a zigzag shape. Similar to the first and second connection angles A11 and A12 (refer to FIG. 6A) described with reference to FIG. 6, each of third and fourth connection angles A13 and A14 may be in a range from about 60 degrees to about 120 degrees.

As described above, since the third connection branch portion B6-11, the second domain connection portion LP21, and the fourth connection branch portion B7-11 are connected to each other in the zigzag shape over the sixth and seventh domains DM6 and DM7, the third and fourth connection branch portions B6-11 and B7-11 may be prevented from acting as one branch portion that extends from the sixth domain DM6 to the seventh domain DM7. As a result, the directions in which the liquid crystal molecules are aligned are clearly distinct from each other in the sixth and seventh domains DM6 and DM7, and thus the display quality of the LCD including the second sub-pixel area PA2 may be improved.

Figure 16:
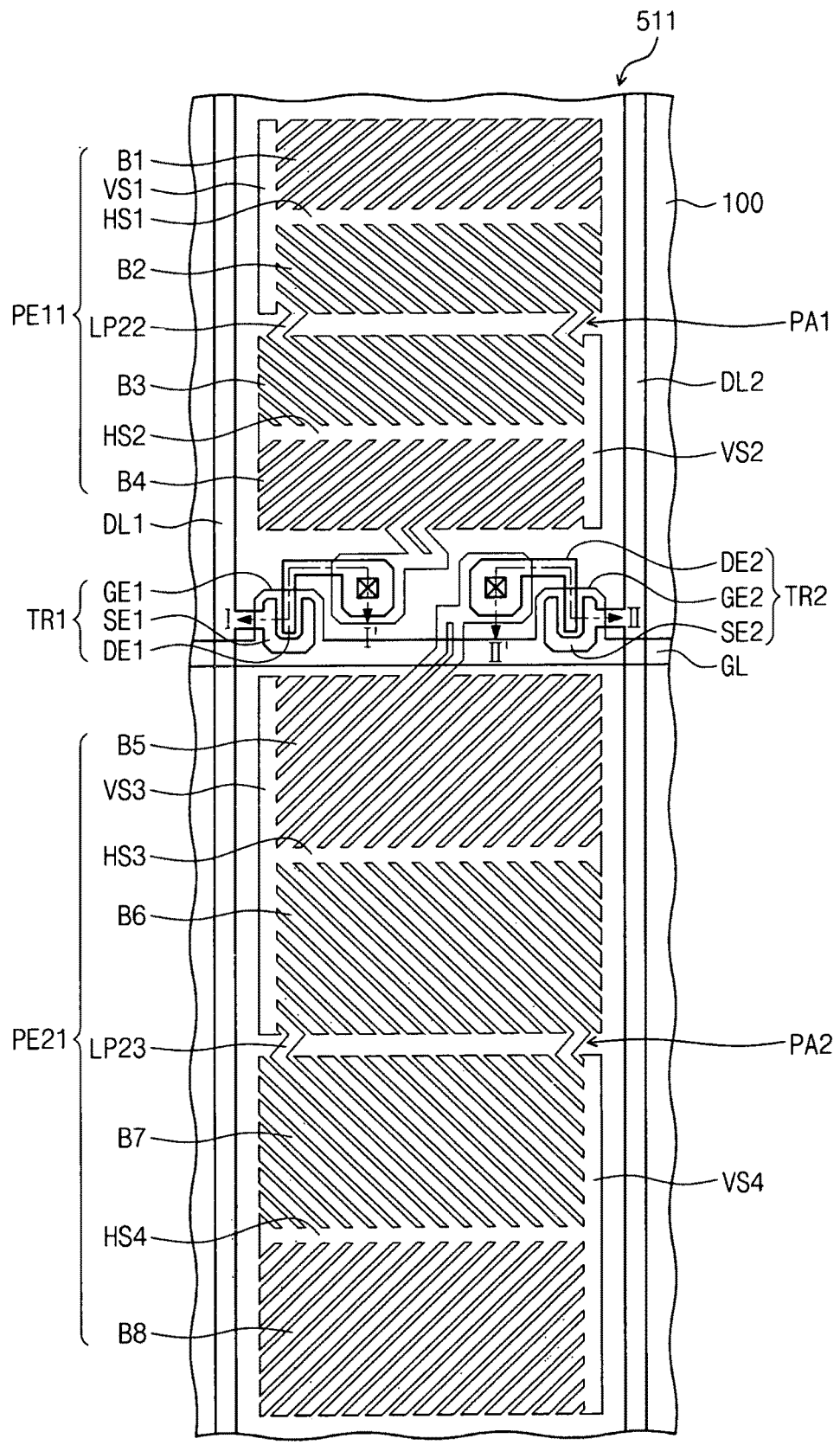
FIG. 16 is a plan view showing another exemplary embodiment of a pixel of an LCD according to the invention.

FIG. 16 is a plan view showing a pixel of an LCD 511 according to another exemplary embodiment of the invention. In FIG. 16, the same reference numerals denote the same elements in the above-described figures, and thus detailed descriptions of the same elements will be omitted.

Referring to FIG. 16, the LCD 511 includes a first sub-pixel electrode PE11 and a second sub-pixel electrode PE21, the first sub-pixel electrode PE11 includes first domain connection portions LP22, and the second sub-pixel electrode PE21 includes second domain connection portions LP23. In the illustrated exemplary embodiment, the first domain connection portions LP22 have the similar shape and function as those of the second domain connection portions LP23, the first domain connection portions LP22 will be described in detail as representative examples.

According to the exemplary embodiment shown in FIG. 15A, the first domain connection portions LP20 are disposed at the center portion of the boundary area BA, but the first domain connection portions LP22 are disposed at edges of the boundary area in a one-to-one correspondence in the exemplary embodiment shown in FIG. 16.

Similar to the exemplary embodiment described with reference to FIG. 15A, each of the first domain connection portions LP22 is connected to the second branch portion B2 and the third branch portion B3 in a zigzag shape. Accordingly, the directions in which the liquid crystal molecules are aligned are clearly distinct from each other in the domain in which the second branch portion B2 is disposed and in the domain in which the third branch portion B3 is disposed by the first domain connection portions LP22, the display quality of the LCD 511 may be improved.

Figure 17:
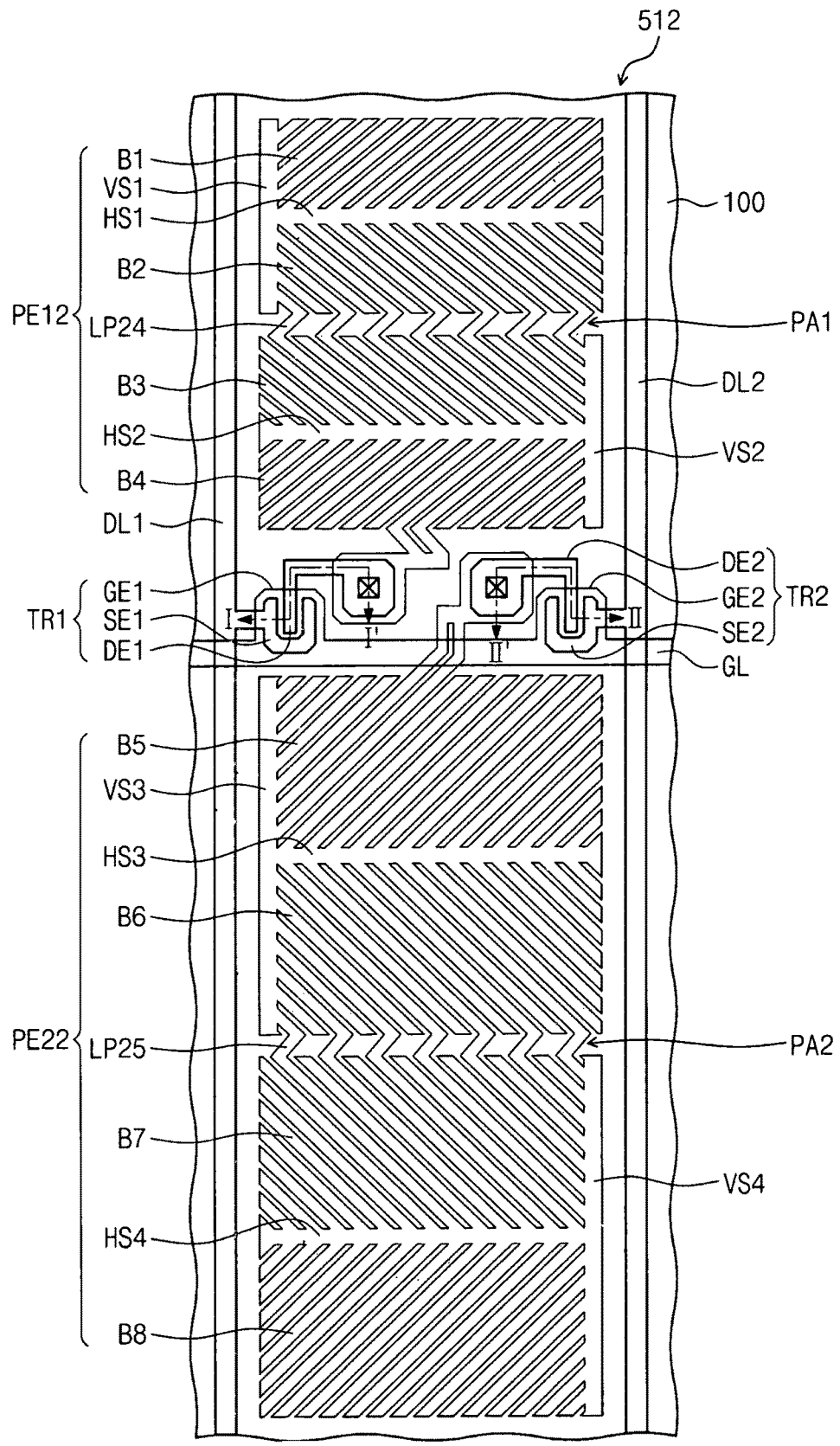
FIG. 17 is a plan view showing another exemplary embodiment of a pixel of an LCD according to the invention.

FIG. 17 is a plan view showing a pixel of an LCD 512 according to another exemplary embodiment of the invention. In FIG. 17, the same reference numerals denote the same elements in the above-described figures, and thus detailed descriptions of the same elements will be omitted.

Referring to FIG. 17, the LCD 512 includes a first sub-pixel electrode PE12 and a second sub-pixel electrode PE22, the first sub-pixel electrode PE12 includes first domain connection portions LP24, and the second sub-pixel electrode PE22 includes second domain connection portions LP25.

The first domain connection portions LP24 are arranged in a boundary area between the second and third domains DM2 and DM3 (refer to FIG. 5) and spaced apart from each other at a regular pitch, and the second domain connection portions LP25 are arranged in a boundary area between the sixth and seventh domains DM6 and DM7 (refer to FIG. 5) and spaced apart from each other at a regular pitch.

Similar to the exemplary embodiment described with reference to FIG. 15A, each of the first domain connection portions LP24 is connected to the second branch portion B2 and the third branch portion B3 in a zigzag shape, and each of the second domain connection portions LP25 is connected to the sixth branch portion B6 and the seventh branch portion B7 in the zigzag shape. Accordingly, the directions in which the liquid crystal molecules are aligned are clearly distinct from each other in the domain in which the second branch portion B2 is disposed and in the domain in which the third branch portion B3 is disposed by the first domain connection portions LP24, and the directions in which the liquid crystal molecules are aligned are clearly distinct from each other in the domain in which the sixth branch portion B6 is disposed and in the domain in which the seventh branch portion B7 is disposed by the second domain connection portions LP25, thereby improving the display quality of the LCD 512.

Figure 18:
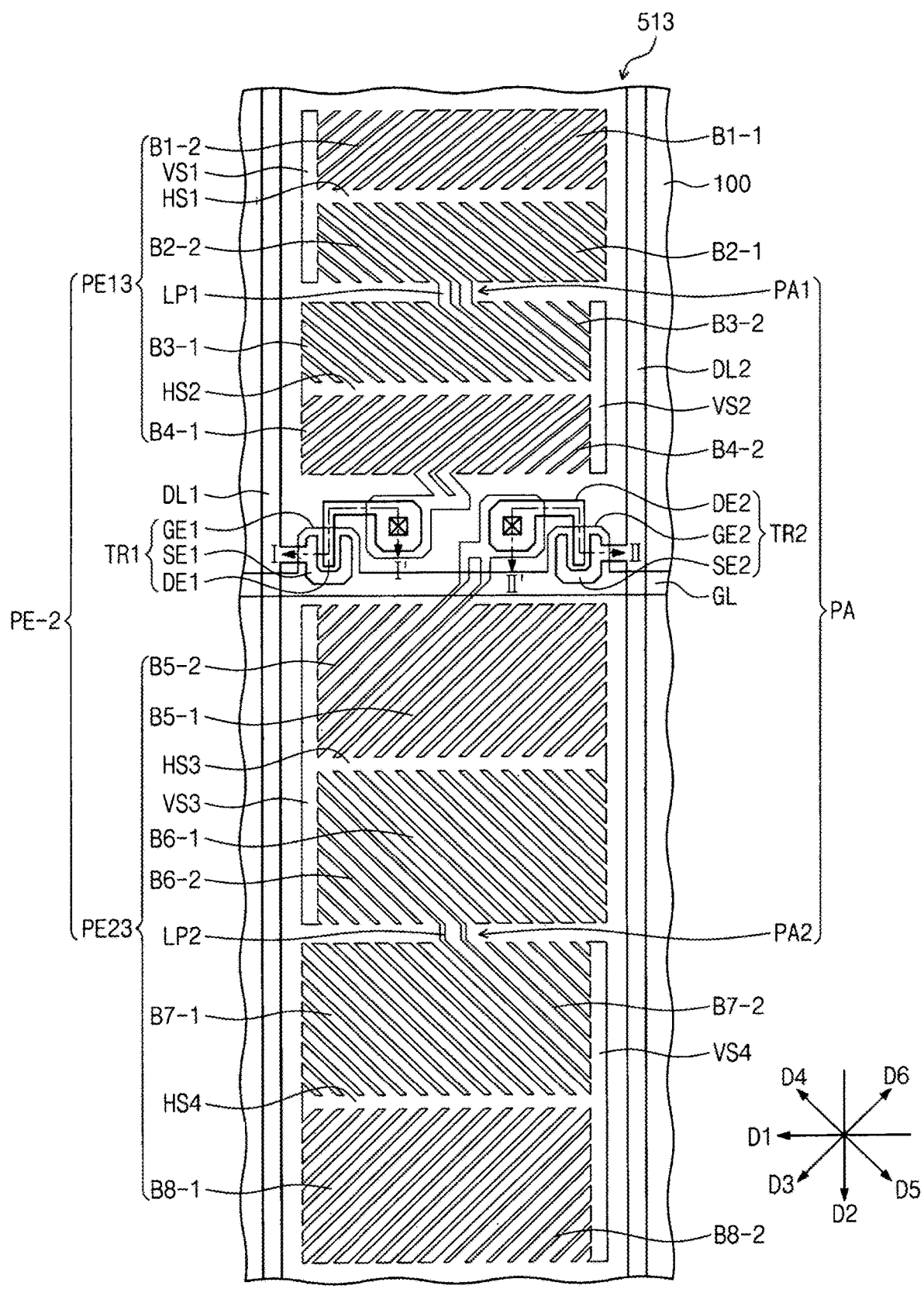
FIG. 18 is a plan view showing another exemplary embodiment of a pixel of an LCD according to the invention.

FIG. 18 is a plan view showing a pixel of an LCD 513 according to another exemplary embodiment of the invention. In FIG. 18, the same reference numerals denote the same elements in the above-described figures, and thus detailed descriptions of the same elements will be omitted.

The LCD 513 includes a pixel electrode PE-2 including a first sub-pixel electrode PE13 and a second sub-pixel electrode PE23.

The first sub-pixel electrode PE13 includes first, second, third, and fourth branch portions B1-1, B2-1, B3-1, and B4-1 and first, second, third, and fourth sub-branch portions B1-2, B2-2, B3-2, and B4-2.

A first vertical stem portion VS1 is connected to a first horizontal stem portion HS1, edges of the first sub-branch portions B1-2, and edges of the second sub-branch portions B2-2, and a second vertical stem portion VS2 is connected to a second horizontal stem portion HS2, edges of the third sub-branch portions B3-2, and edges of the fourth sub-branch portions B4-2. In the illustrated exemplary embodiment, each of the first and second vertical stem portions VS1 and VS2 extends in a second direction D2 and crosses a first direction D1 in which the LCD 513 is curved. In an exemplary embodiment, the second direction D2 may be substantially perpendicular to the first direction D1.

In the illustrated exemplary embodiment, the first sub-branch portions B1-2 are symmetrical with the second sub-branch portions B2-2 with respect to the first horizontal stem portion HS1 when viewed in a plan view, and the third sub-branch portions B3-2 are symmetrical with the fourth sub-branch portions B4-2 with respect to the second horizontal stem portion HS2 when viewed in a plan view.

The first horizontal stem portion HS1 is connected to the first vertical stem portion VS1, edges of the first branch portions B1-1, and edges of the second branch portions B2-1. In the illustrated exemplary embodiment, the first horizontal stem portion HS1 extends in the first direction D1 and is branched from a center portion of the first vertical stem portion VS1. The first branch portions B1-1 are symmetrical with the second branch portions B2-1 with respect to the first horizontal stem portion HS1, and the first horizontal stem portion HS1 is disposed between the first and second domains DM1 and DM2 (refer to FIG. 5).

The second horizontal stem portion HS2 is connected to the second vertical stem portion VS2, edges of the third branch portions B3-1, and edges of the fourth branch portions B4-1. In the illustrated exemplary embodiment, the second horizontal stem portion HS2 extends in the first direction D1 and is branched from a center portion of the second vertical stem portion VS2. The third branch portions B3-1 are symmetrical with the fourth branch portions B4-1 with respect to the second horizontal stem portion HS2, and the second horizontal stem portion HS2 is disposed between the third and fourth domains DM3 and DM4 (refer to FIG. 5).

Each of the first branch portions B1-1 and each of the first sub-branch portions B1-2 extend in a third direction D3 inclined with respect to the first and second directions D1 and D2 when viewed in a plan view. Each of the second branch portions B2-1 and each of the second sub-branch portions B2-2 extend in a fourth direction D4 inclined with respect to the first and second directions D1 and D2 when viewed in a plan view. In the illustrated exemplary embodiment, the fourth direction D4 may cross the third direction D3. In an exemplary embodiment, the third and fourth directions D3 and D4 may be substantially perpendicular to each other when viewed in a plan view, and each of the third and fourth directions D3 and D4 may define an angle of about 45 degrees with the first direction D1 or the second direction D2.

Each of the third branch portions B3-1 and each of the third sub-branch portions B3-2 extend in a fifth direction D5 inclined with respect to the first and second directions D1 and D2 when viewed in a plan view. Each of the fourth branch portions B4-1 and each of the fourth sub-branch portions B4-2 extend in a sixth direction D6 inclined with respect to the first and second directions D1 and D2 when viewed in a plan view. In the illustrated exemplary embodiment, the sixth direction D6 may cross the fifth direction D5. In an exemplary embodiment, the fifth and sixth directions D5 and D6 may be substantially perpendicular to each other when viewed in a plan view, and each of the fifth and sixth directions D5 and D6 may define an angle of about 45 degrees with the first direction D1 or the second direction D2.

The second sub-pixel electrode PE23 includes a third horizontal stem portion HS3, a fourth horizontal stem portion HS4, a third vertical stem portion VS3, a fourth vertical stem portion VS4, fifth, sixth, seventh, and eighth branch portions B5-1, B6-1, B7-1, and B8-1, and fifth, sixth, seventh, and eighth sub-branch portions B5-2, B6-2, B7-2, and B8-2.

The third vertical stem portion VS3 extends in the second direction D2 and is connected to the third horizontal stem portion HS3, edges of the fifth sub-branch portions B5-2, and edges of the sixth sub-branch portions B6-2. The fourth vertical stem portion VS4 extends in the second direction D2 and is connected to the fourth horizontal stem portion HS4, edges of the seventh sub-branch portions B7-2, and edges of the eighth sub-branch portions B8-2.

In the illustrated exemplary embodiment, the fifth sub-branch portions B5-2 are symmetrical with the sixth sub-branch portions B6-2 with respect to the third horizontal stem portion HS3 when viewed in a plan view, and the seventh sub-branch portions B7-2 are symmetrical with the eighth sub-branch portions B8-2 with respect to the fourth horizontal stem portion HS4 when viewed in a plan view.

The third horizontal stem portion HS3 is connected to the third vertical stem portion VS3, edges of the fifth branch portions B5-1, and edges of the sixth branch portions B6-1.

In the illustrated exemplary embodiment, the third horizontal stem portion HS3 extends in the first direction D1 and is branched from a center portion of the third vertical stem portion VS3. The fifth branch portions B5-1 are symmetrical with the sixth branch portions B6-1 with respect to the third horizontal stem portion HS3, and the third horizontal stem portion HS3 is disposed between the fifth and sixth domains DM5 and DM6 (refer to FIG. 5).

The fourth horizontal stem portion HS4 is connected to the fourth vertical stem portion VS4, edges of the seventh branch portions B7-1, and edges of the eighth branch portions B8-1. In the illustrated exemplary embodiment, the fourth horizontal stem portion HS4 extends in the first direction D1 and is branched from a center portion of the fourth vertical stem portion VS4. The seventh branch portions B7-1 are symmetrical with the eighth branch portions B8-1 with respect to the fourth horizontal stem portion HS4, and the fourth horizontal stem portion HS4 is disposed between the seventh and eighth domains DM7 and DM8 (refer to FIG. 5).

Each of the fifth branch portions B5-1 and each of the fifth sub-branch portions B5-2 extend in the third direction D3 when viewed in a plan view, and each of the sixth branch portions B6-1 and each of the sixth sub-branch portions B6-2 extend in the fourth direction D4 when viewed in a plan view. In an exemplary embodiment, each of the seventh branch portions B7-1 and each of the seventh sub-branch portions B7-2 extend in the fifth direction D5 when viewed in a plan view, and each of the eighth branch portions B8-1 and each of the eighth sub-branch portions B8-2 extend in the sixth direction D6 when viewed in a plan view.

Figure 19:
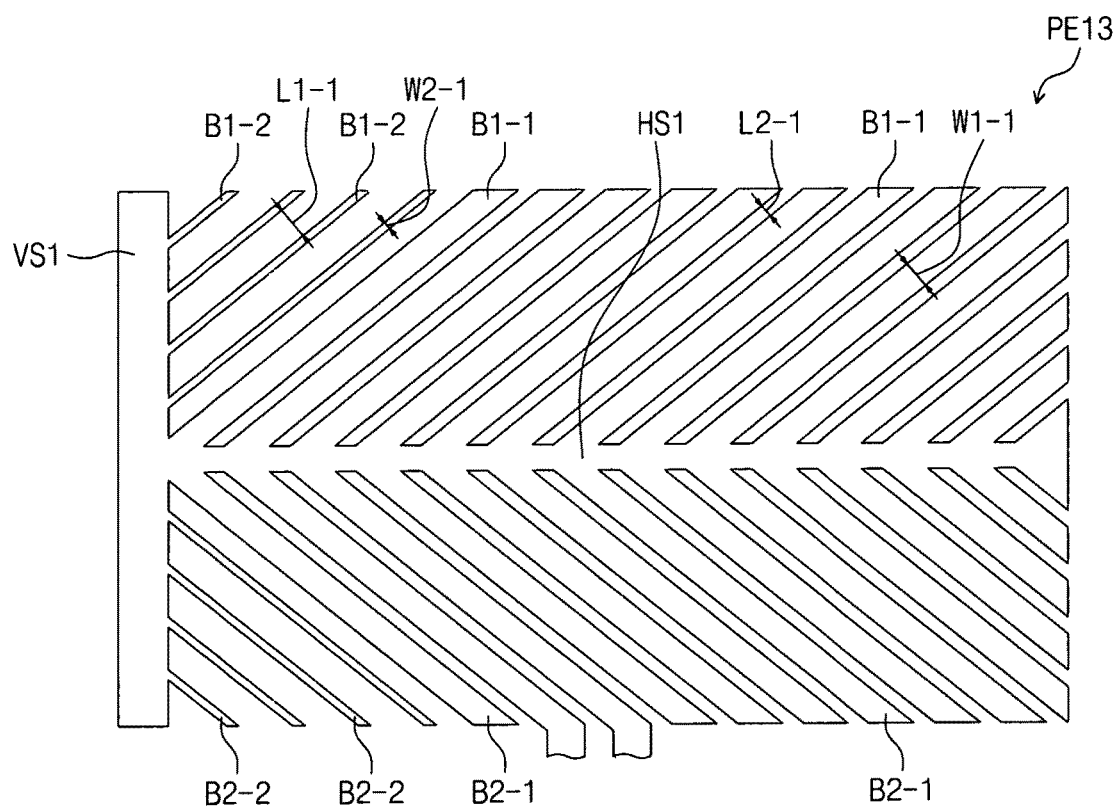
FIG. 19 is an enlarged view showing a portion of a first sub-pixel electrode shown in FIG. 18.

FIG. 19 is an enlarged view showing a portion of the first sub-pixel electrode shown in FIG. 18.

Referring to FIG. 19, the first sub-pixel electrode PE13 includes the first vertical stem portion VS1, the first horizontal stem portion HS1, the first branch portions B1-1, and the first sub-branch portions B1-2. The first branch portions B1-1 are connected to the first horizontal stem portion HS1 and the first sub-branch portions B1-2 are connected to the first vertical stem portion VS1.

When each of the first branch portions B1-1 has a first width W1-1 and each of the first sub-branch portions B1-2 has a second width W2-1, the second width W2-1 is greater than the first width W1-1. In the illustrated exemplary embodiment, the second width W2-1 corresponds to about 3 percent (%) to about 50% of the first width W1-1. In an exemplary embodiment, when the first width W1-1 is about 3 micrometers (μm), the second width W2-1 may be about 0.10 μm to about 1.5 μm. In an exemplary embodiment, similar to the first branch portions B1-1 and the first sub-branch portions B1-2, a width of each of the second sub-branch portions B2-2 is smaller than a width of each of the second branch portions B2-1.

As described above, when the width of each of the first sub-branch portions B1-2 is smaller than the width of each of the first branch portions B1-1, a first distance L1-1 between two adjacent first sub-branch portions among the first sub-branch portions B1-2 is greater than a second distance L2-1 between two adjacent first branch portions among the first branch portions B1-1. Therefore, the intensity of the fringe field applied to each of the first sub-branch portions B1-2 may be greater than the intensity of the fringe field applied to each of the first branch portions B1-1.

In an exemplary embodiment, since the width of the second sub-branch portions B2-2 is smaller than the width of each of the second branch portions B2-1, a distance between two adjacent second sub-branch portions among the second sub-branch portions B2-2 is greater than a distance between two adjacent second branch portions among the second branch portions B2-1. Thus, the intensity of the fringe field applied to each of the second sub-branch portions B2-2 may be greater than the intensity of the fringe field applied to each of the second branch portions B2-1.

In the illustrated exemplary embodiment, an electric field generated by the first branch portions B1-1, the second branch portions B2-1, the first sub-branch portions B1-2, and the second sub-branch portions B2-2 and directed to the first vertical stem portion VS1 from an inner side of the first and second domains DM1 and DM2 (refer to FIG. 5) is referred to as an inner fringe field. The intensity of the inner fringe field may be increased by the structure of the first and second sub-branch portions B1-2 and B2-2. As a result, when an electric field directed to the first vertical stem portion VS1 from an outer side of the first and second domains DM1 and DM2 is referred to as an outer electric field, the intensity of the inner fringe field may be stronger than the intensity of the outer electric field.

When the intensity of the inner fringe field is stronger than the intensity of the outer electric field, the following effects may be obtained. When the intensity of the inner fringe field is equal to or smaller than the intensity of the outer electric field while the liquid crystal molecules are aligned by the inner fringe field in the first and second domains, the liquid crystal molecules are not normally aligned in an area in which the inner fringe field is overlapped with the outer electric field since the inner fringe field acts in opposite direction to the outer electric field. However, when the intensity of the inner fringe field becomes stronger by using the structure of the first and second sub-branch portions B1-2 and B2-2 as described in the illustrated exemplary embodiment, the intensity of the inner fringe field becomes greater than the intensity of the outer electric field. As a result, the inner fringe field more strongly acts on the first and second domains than the outer electric field, and thus the liquid crystal molecules may be easily aligned.

Figure 20:
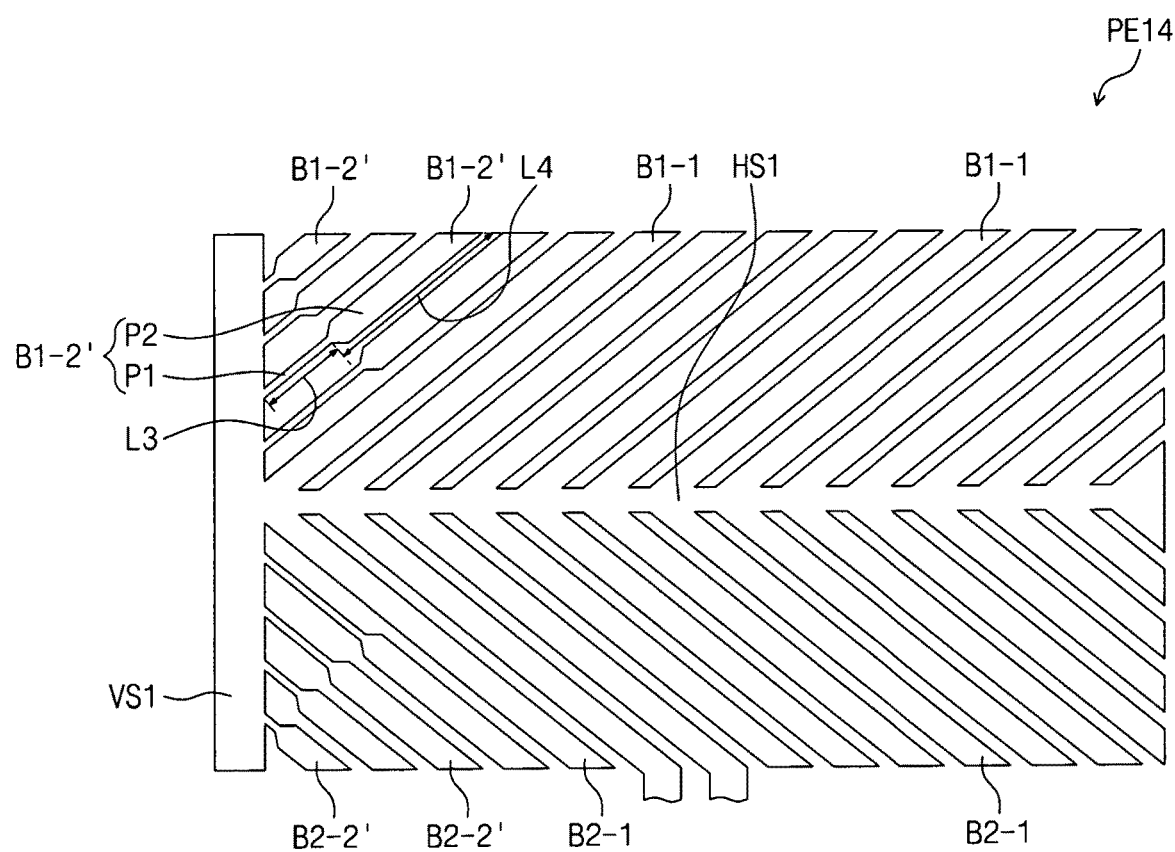
FIG. 20 is an enlarged view showing another exemplary embodiment of a portion of a first sub-pixel electrode of an LCD according to the invention.

FIG. 20 is an enlarged view showing a portion of a first sub-pixel electrode of an LCD according to another exemplary embodiment of the invention. In FIG. 20, the same reference numerals denote the same elements in the above-described figures, and thus detailed descriptions of the same elements will be omitted.

Referring to FIG. 20, a first sub-pixel electrode PE14 includes a first vertical stem portion VS1, a first horizontal stem portion HS1, first branch portions B1-1, second branch portions B2-1, first sub-branch portions B1-2', and second sub-branch portions B2-2'. The first branch portions B1-1 are connected to the first horizontal stem portion HS1 and the first sub-branch portions B1-2' are connected to the first vertical stem portion VS1. In an exemplary embodiment, the second branch portions B2-1 are connected to the first horizontal stem portion HS1 and the second sub-branch portions B2-2' are connected to the first vertical stem portion VS1.

Hereinafter, a structure of the first sub-branch portions B1-2' will be described in detail. Each of the first sub-branch portions B1-2' includes a first portion P1 and a second portion P2. The first portion P1 is connected to the first vertical stem portion VS1 and the second portion P2 is connected to the first vertical stem portion VS1 while the first portion P1 is disposed between the second portion P2 and the first vertical stem portion VS1.

A width of the first portion P1 is smaller than a width of the second portion P2. In the illustrated exemplary embodiment, the width of the first portion P1 corresponds to about 3% to about 50% of the width of the second portion P2. In an exemplary embodiment, a length L3 of the first portion P1 may be smaller than a length L4 of the second portion P2. In an exemplary embodiment, the length L3 of the first portion P1 corresponds to about 10% to about 50% of the length L4 of the second portion P2.

Since each of the first sub-branch portions B1-2' and each of the second sub-branch portions B2-2' include the first portion P1 with the width smaller than that of the second portion P2, the intensity of the inner fringe field described with reference to FIG. 19 may be increased. As a result, the intensity of the inner fringe field may be greater than the intensity of the outer electric field described with reference to FIG. 19, and thus the inner fringe field more strongly acts on the first and second domains DM1 and DM2 (refer to FIG. 5) than the outer electric field, thereby easily aligning the liquid crystal molecules.

Figure 21:
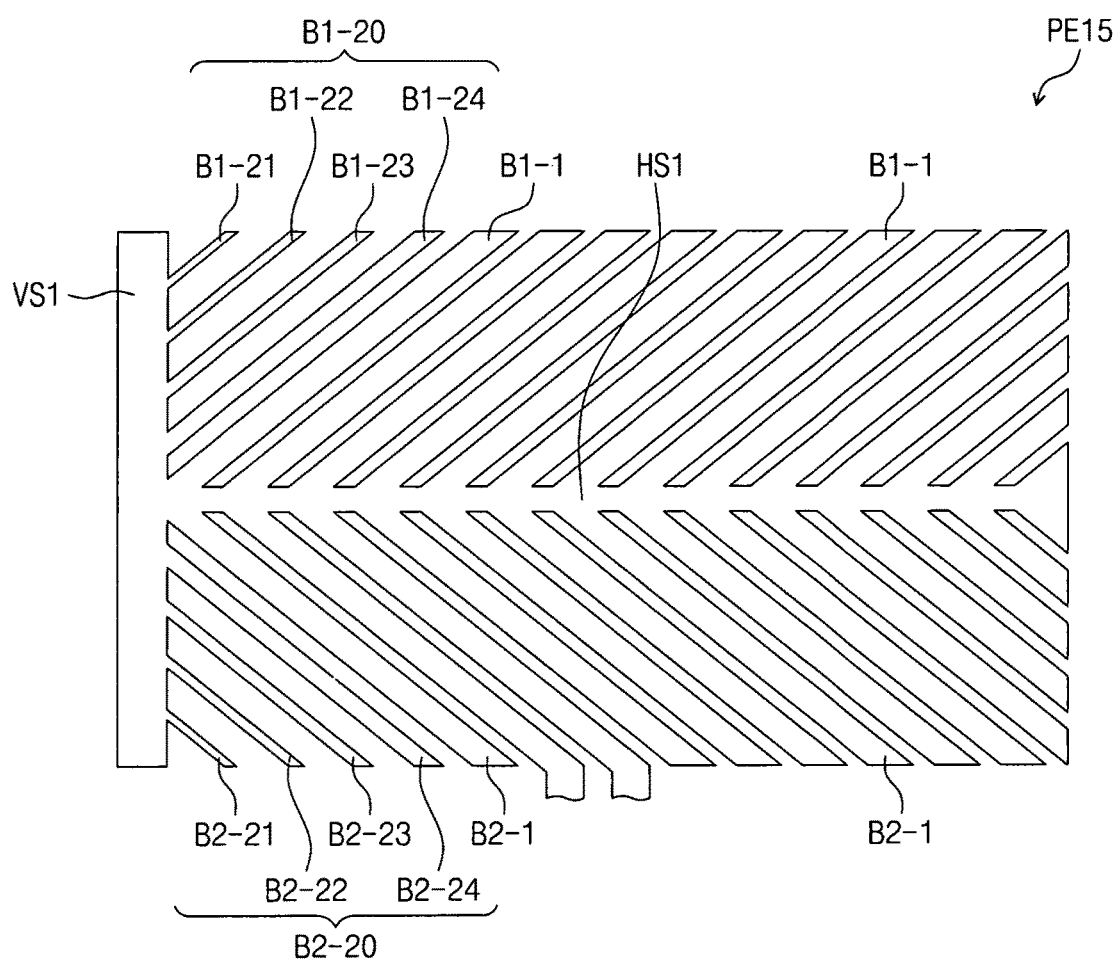
FIG. 21 is an enlarged view showing to another exemplary embodiment of a portion of a first sub-pixel electrode of an LCD according the invention.

FIG. 21 is an enlarged view showing a portion of a first sub-pixel electrode of an LCD according to another exemplary embodiment of the invention. In FIG. 21, the same reference numerals denote the same elements in the above-described figures, and thus detailed descriptions of the same elements will be omitted.

Referring to FIG. 21, a first sub-pixel electrode PE15 of the LCD includes first branch portions B1-1, second branch portions B2-1, first sub-branch portions B1-20, and second sub-branch portions B2-20. The first branch portions B1-1 are connected to the first horizontal stem portion HS1, the first sub-branch portions B1-20 are connected to the first vertical stem portion VS1, the second branch portions B2-1 are connected to the first horizontal stem portion HS1, and the second sub-branch portions B2-20 are connected to the first vertical stem portion VS1.

Among the first and second sub-branch portions B1-20 and B2-20, the first sub-branch portions B1-20 will be described in detail. Each of the first sub-branch portions B1-20 includes a first branch electrode B1-21, a second branch electrode B1-22, a third branch electrode B1-23, and a fourth branch electrode B1-24. In the illustrated exemplary embodiment, the first, second, third, and fourth branch electrodes B1-21, B1-22, B1-23, and B1-24 are sequentially arranged from an outer side of the first sub-pixel electrode PE15 to an inner side of the first sub-pixel electrode PE15.

In the illustrated exemplary embodiment, a width of each of the first sub-branch portions B1-20 is smaller than a width of each of the first branch portions B1-1. That is, a width of each of the first, second, third, and fourth branch electrodes B1-21, B1-22, B1-23, and B1-24 is smaller than a width of each of the first branch portions B1-1.

In an exemplary embodiment, the first sub-branch portions B1-20 may have different widths from each other. In the illustrated exemplary embodiment, the width of the first sub-branch portions B1-20 becomes smaller as it is closer to the outer side of the first sub-pixel electrode PE15. That is, a width of the first branch electrode B1-21 is smaller than a width of the second branch electrode B1-22, the width of the second branch electrode B1-22 is smaller than a width of the third branch electrode B1-23, and the width of the third branch electrode B1-23 is smaller than a width of the fourth branch electrode B1-24.

Similarly, the second sub-branch portions B2-20 may have different widths from each other. In the illustrated exemplary embodiment, the width of the second sub-branch portions B2-20 becomes smaller as it is closer to the outer side of the first sub-pixel electrode PE15. That is, a width of the first branch electrode B2-21 is smaller than a width of the second branch electrode B2-22, the width of the second branch electrode B2-22 is smaller than a width of the third branch electrode B2-23, and the width of the third branch electrode B2-23 is smaller than a width of the fourth branch electrode B2-24.

When the first and second sub-branch portions B1-20 and B2-20 have the above-described structure, the width of each of the first sub-branch portions B1-20 is smaller than the width of each of the first branch portions B1-1 and the width of each of the second sub-branch portions B2-20 is smaller than the width of each of the second branch portion B2-1 as described with reference to FIG. 19. Accordingly, the intensity of the inner fringe field described with reference to FIG. 19 may be increased. As a result, the intensity of the inner fringe field may be greater than that of the outer electric field and the inner fringe field more strongly acts on the first and second domains DM1 and DM2 (refer to FIG. 5) than the outer electric field, thereby easily aligning the liquid crystal molecules.

Figure 22:
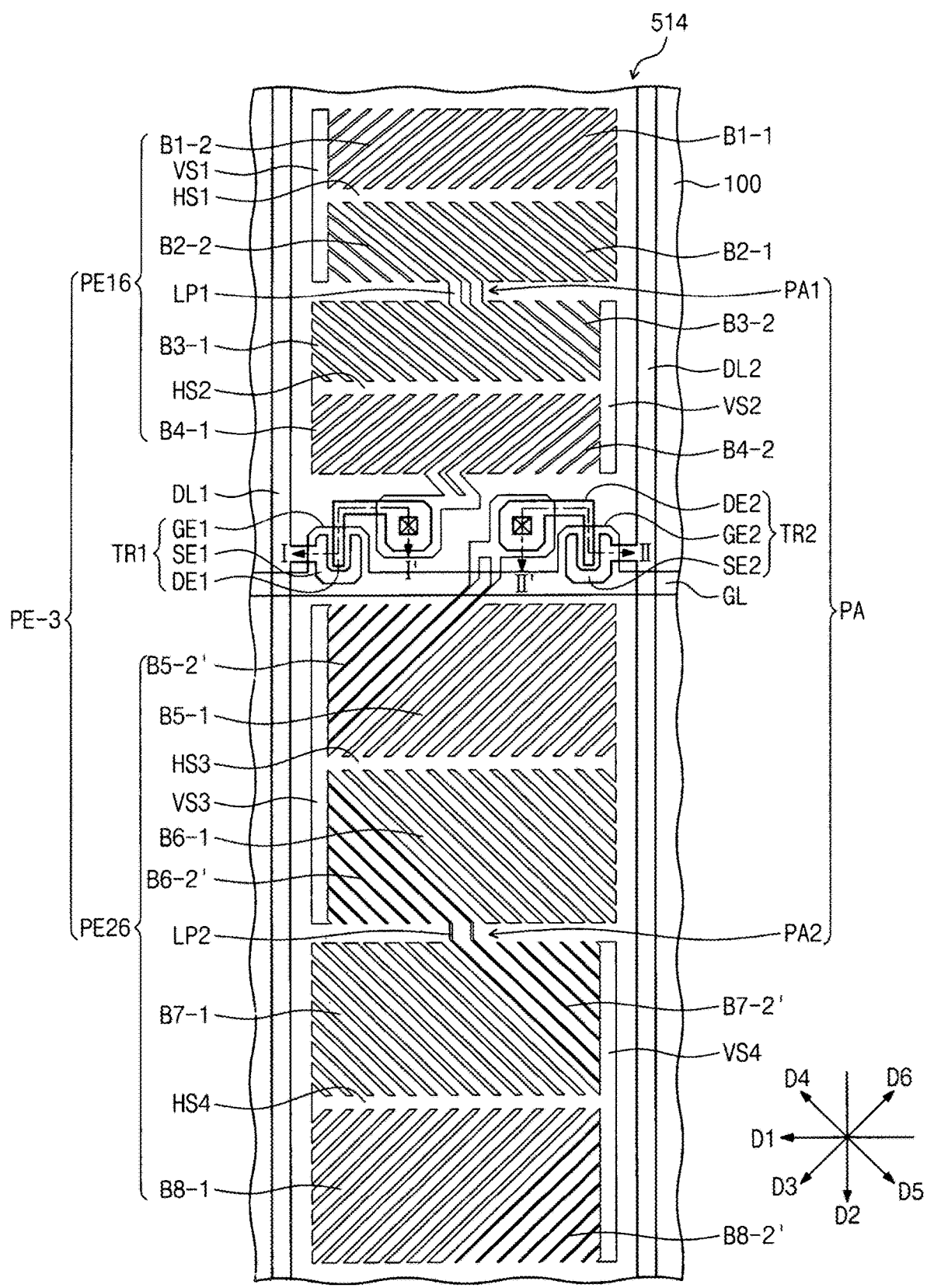
FIG. 22 is a plan view showing another exemplary embodiment of a pixel electrode of an LCD according to the invention.

FIG. 22 is a plan view showing a pixel electrode of an LCD 514 according to another exemplary embodiment of the invention. In FIG. 22, the same reference numerals denote the same elements in the above-described figures, and thus detailed descriptions of the same elements will be omitted.

Referring to FIG. 22, the LCD 514 includes a pixel electrode PE-3 which is disposed in a pixel area PA and includes a first sub-pixel electrode PE16 disposed in a first sub-pixel area PA1 and a second sub-pixel electrode PE26 disposed in a second sub-pixel area PA2.

In the illustrated exemplary embodiment, the first sub-pixel electrode PE16 includes first sub-branch portions B1-2, second sub-branch portions B2-2, third sub-branch portions B3-2, and fourth sub-branch portions B4-2, and the second sub-pixel electrode PE26 includes fifth sub-branch portions B5-2', sixth sub-branch portions B6-2', seventh sub-branch portions B7-2', and eighth sub-branch portions B8-2'.

As described with reference to FIG. 19, each of the first branch portions B1-1 has the first width W1-1 (refer to FIG. 19) and each of the first sub-branch portions B1-2 has the second width W2-1 (refer to FIG. 19) smaller than the first width. In the illustrated exemplary embodiment, a width of each of the fifth branch portions B5-1 is equal to the first width W1-1, a width of the fifth sub-branch portions B5-2' is smaller than the second width W2-1, a width of each of the sixth sub-branch portions B6-2' is smaller than the second width W2-1, a width of each of the seventh sub-branch portions B7-2' is smaller than the second width W2-1, and a width of each of the eighth sub-branch portions B8-2' is smaller than the second width W2-1.

As described above, when the width of each of the fifth, sixth, seventh and eighth sub-branch portions B5-2', B6-2', B7-2' and B8-2' is smaller than the width of each of the first, second, third, and fourth sub-branch portions B1-2, B2-2, B3-2, and B4-2 of the first sub-pixel electrode PE16, the degree in increase of the intensity of the second inner fringe field acting on the fifth to eighth domains DM5 to DM8 by the fifth, sixth, seventh, and eighth sub-branch portions B5-2', B6-2', B7-2', and B8-2' is greater than the degree in increase of the intensity of the first inner fringe field acting on the first to fourth domains DM1 to DM4 by the first, second, third, and fourth sub-branch portions B1-2, B2-2, B3-2, and B4-2.

Thus, as described above, when the second inner fringe field becomes stronger by using the structure of the fifth, sixth, seventh, and eighth sub-branch portions B5-2', B6-2', B7-2', and B8-2', the liquid crystal molecules arranged corresponding to the second sub-pixel electrode PE26 may be easily aligned by using the second inner fringe field that becomes strong even though the size of the second sub-pixel electrode PE26 is smaller than the size of the first sub-pixel electrode PE16.

Figure 23:
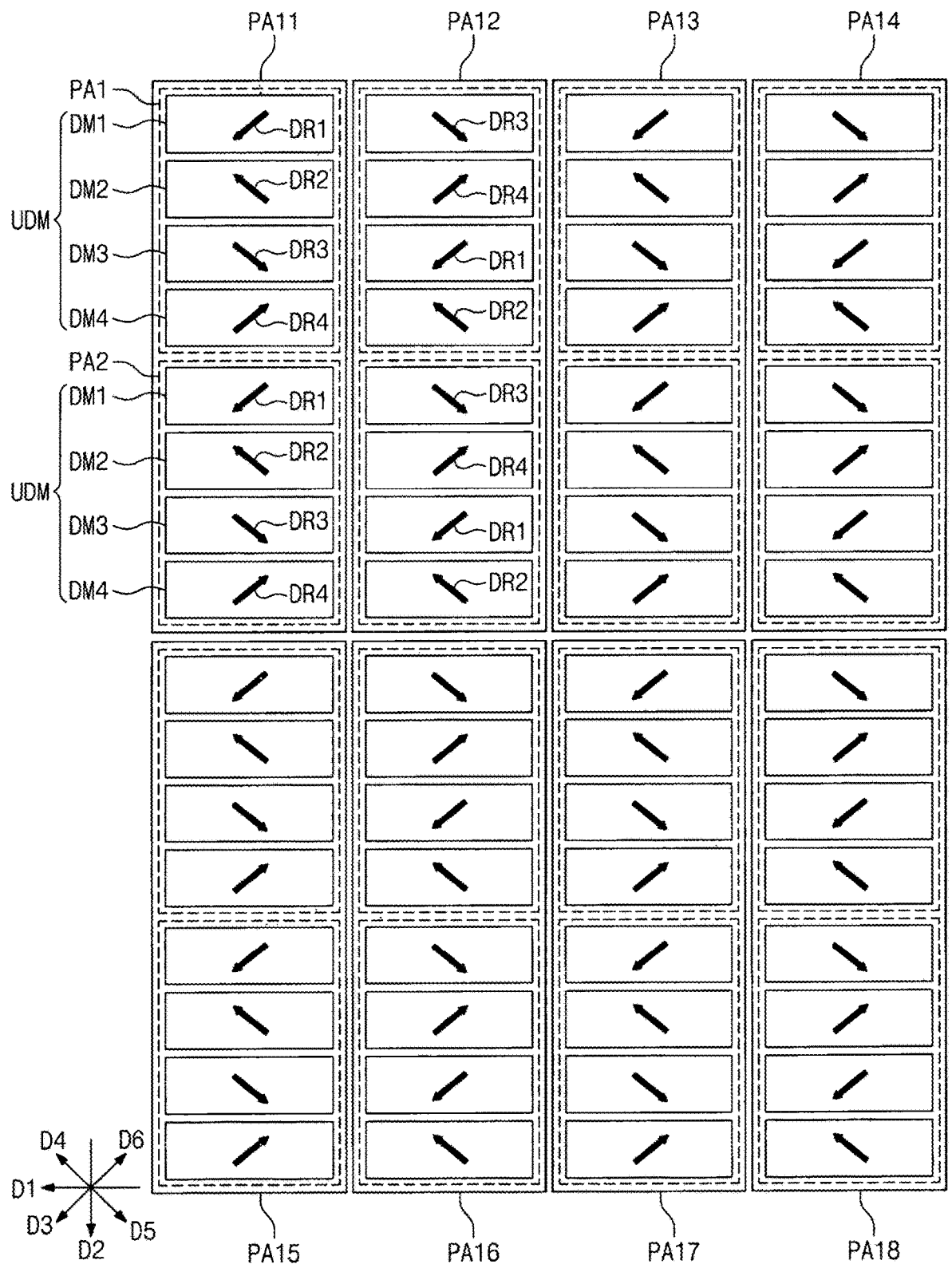
FIG. 23 is a view showing another exemplary embodiment of alignment directions of liquid crystal molecules in domains defined in pixels according to the invention.

FIG. 23 is a view showing alignment directions of liquid crystal molecules in domains defined in pixels according to another exemplary embodiment of the invention.

FIG. 23 shows eight pixel areas defined in the display area DA (refer to FIG. 1B) of the display substrate 100 (refer to FIG. 1B) as representative examples. In the illustrated exemplary embodiment, the eight pixel areas will be referred to as first to eighth pixel areas PA11 to PA18.

As described above, each of the first to eighth pixel areas PA11 to PA18 includes the first sub-pixel area PA1 and the second sub-pixel area PA2, and a unit domain group UDM configured to include first to fourth domains DM1 to DM4 is defined in each of the first and second sub-pixel areas PA1 and PA2. In this case, the unit domain group UDM is defined in the first to eighth pixel areas PA11 to PA18, and thus the number of the unit domain group UDM is sixteen.

In an exemplary embodiment, the liquid crystal alignment directions of the first to fourth domains DM1 to DM4 are different from each other in each unit domain group UDM. In an exemplary embodiment, the liquid crystal molecules are aligned in the first liquid crystal alignment direction DR1 in the first domain DM1, the liquid crystal molecules are aligned in the second liquid crystal alignment direction DR2 in the first domain DM2, the liquid crystal molecules are aligned in the third liquid crystal alignment direction DR3 in the third domain DM3, and the liquid crystal molecules are aligned in the fourth liquid crystal alignment direction DR4 in the fourth domain DM4.

A plurality of groups each configured to include first to fourth domains DM1 to DM4 defined in each of the first to eighth pixel areas PA11 to PA18 is arranged in a matrix form. A row direction of the matrix form is substantially parallel to the first direction D1 and a column direction of the matrix form is substantially parallel to the second direction D2. As a result, the first to fourth domains DM1 to DM4 are arranged in sixteen rows by four columns in the matrix form.

Hereinafter, an arrangement pattern of the first to fourth domains DM1 to DM4 in the matrix form will be described in detail.

In the matrix form, the liquid crystal alignment directions are different from each other in at least two domains among domains arranged in the same row direction. That is, the liquid crystal alignment directions are different from each other in the domains arranged in the same row direction of the matrix form. In an exemplary embodiment, the first domain DM1 and the third domain DM3 are alternately arranged with each other in a first row and the second domain DM2 and the fourth domain DM4 are alternately arranged with each other in a second row, for example. That is, any one of the first to fourth domains DM1 to DM4 is not successively arranged in the first row or the second row of the matrix form.

Different from the illustrated exemplary embodiment, when the liquid crystal alignment directions are the same in the domains arranged in the same row direction, a refractive index anisotropy of the liquid crystal molecules is varied depending on a viewing direction against the display substrate. As a result, a brightness perceived in a left side of the display substrate 100 is different from a brightness perceived in a right side of the display substrate 100. However, according to the illustrated exemplary embodiment, when the first to fourth domains DM1 to DM4 are arranged in the above-described arrangement pattern in the matrix form, the variation in the refractive index anisotropy of the liquid crystal molecules, which is caused by the viewing direction against the display substrate, may be minimized. Therefore, a difference in brightness between the left and right sides of the display substrate 100 (refer to FIG. 1B) is reduced, and thus the display quality of the display substrate is improved.

In an exemplary embodiment, the arrangement of the first to fourth domains DM1 to DM4 is constant in the unit domain groups UDM as shown in FIG. 23. In an exemplary embodiment, according to two unit domain groups UDM adjacent to each other in a first column of the matrix form, the first to fourth domains DM1 to DM4 are sequentially arranged in each of the two unit domain groups UDM along the second direction D2.

Figure 24:
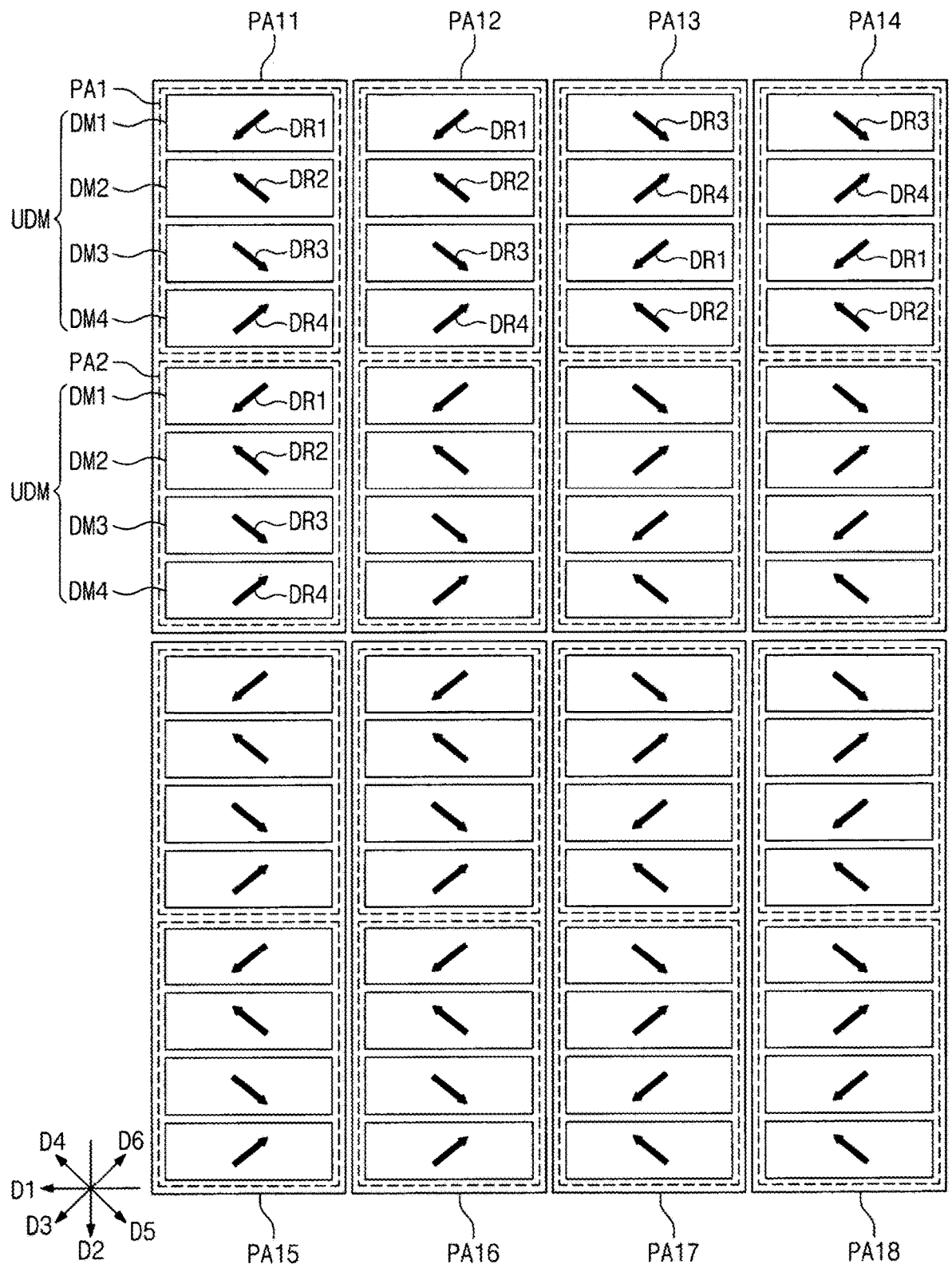
FIG. 24 is a view showing another exemplary embodiment of alignment directions of liquid crystal molecules in domains defined in pixels according to the invention.

FIG. 24 is a view showing alignment directions of liquid crystal molecules in domains defined in pixels according to another exemplary embodiment of the invention.

Referring to FIGS. 23 and 24, the arrangement pattern of the domains arranged in the same column of the matrix form according to the illustrated exemplary embodiment shown in FIG. 23 is the same as the arrangement pattern of the domains arranged in the same column of the matrix form according to the illustrated exemplary embodiment shown in FIG. 24, but the arrangement pattern of the domains arranged in the same row according to the illustrated exemplary embodiment shown in FIG. 23 is different from the arrangement pattern of the domains arranged in the same row according to the illustrated exemplary embodiment shown in FIG. 24. Hereinafter, the arrangement pattern of the domains arranged in the same row will be described in detail with reference to FIG. 24.

In the illustrated exemplary embodiment, m ("m" is a natural number equal to or larger than 2) first domains DM1 successively arranged are alternately arranged with k ("k" is a natural number equal to or larger than 2) third domains DM3 successively arranged in an n-th ("n" is a natural number) row of the matrix form. In an exemplary embodiment, m second domains DM2 successively arranged are alternately arranged with k fourth domains DM4 successively arranged in an (n+1)th row of the matrix form.

In an exemplary embodiment, two first domains DM1 are successively arranged and two third domains DM3 are successively arranged in the first row of the matrix form, for example. Although not shown in figures, another two first domains DM1 are successively arranged following the two third domains DM3, and then another two third domains DM3 are successively arranged.

In an exemplary embodiment, two second domains DM2 are successively arranged and two fourth domains DM4 are successively arranged in the second row of the matrix form, for example. Although not shown in figures, another two second domains DM2 are successively arranged following the two fourth domains DM4, and then another two fourth domains DM4 are successively arranged.

According to another exemplary embodiment, six first domains DM1 successively arranged may be alternately arranged with six third domains DM3 successively arranged in the first row of the matrix form, and six second domains DM2 successively arranged may be alternately arranged with six fourth domains DM6 successively arranged in the second row of the matrix form.

Figure 25:
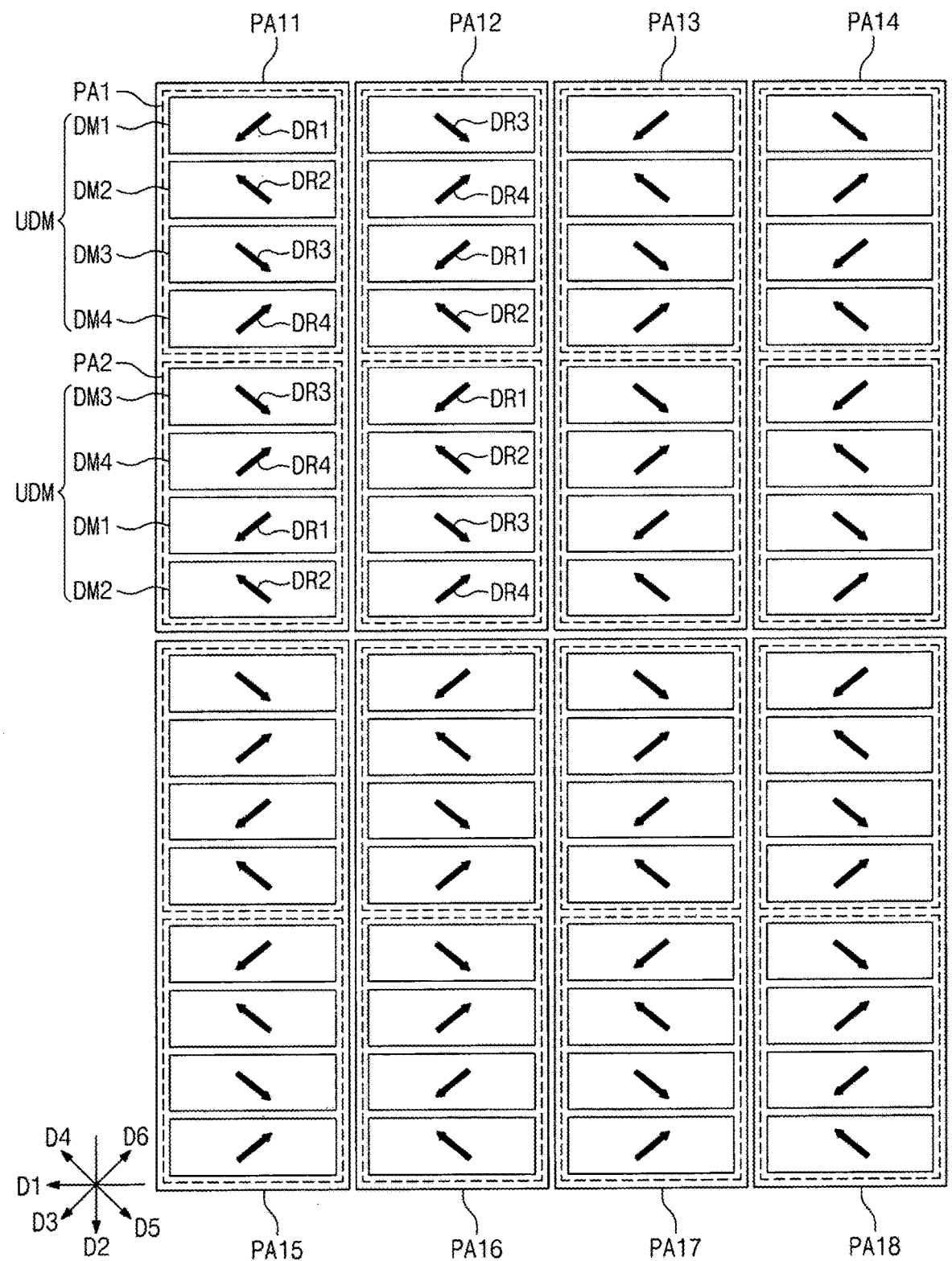
FIG. 25 is a view showing another exemplary embodiment of alignment directions of liquid crystal molecules in domains defined in pixels according to the invention.

FIG. 25 is a view showing alignment directions of liquid crystal molecules in domains defined in pixels according to another exemplary embodiment of the invention.

Referring to FIGS. 23 and 25, the arrangement pattern of the domains arranged in the same row of the matrix form according to the illustrated exemplary embodiment shown in FIG. 23 is the same as the arrangement pattern of the domains arranged in the same row of the matrix form according to the illustrated exemplary embodiment shown in FIG. 25, but the arrangement pattern of the domains arranged in the same column according to the illustrated exemplary embodiment shown in FIG. 23 is different from the arrangement pattern of the domains arranged in the same column according to the illustrated exemplary embodiment shown in FIG. 24.

In detail, the arrangements of the first to fourth domains DM1 to DM4 are the same in the unit domain groups UDM according to the illustrated exemplary embodiment shown in FIG. 23, but the arrangements of the first to fourth domains DM1 to DM4 are different from each other in at least two unit domain groups UDM of the unit domain groups UDM.

In an exemplary embodiment, the first, second, third, and fourth domains DM1, DM2, DM3, and DM4 are sequentially arranged in one unit domain group of two adjacent unit domain groups UDM to each other in the first column of the matrix form along the second direction D2. The third, fourth, first, and second domains DM3, DM4, DM1, and DM2 are sequentially arranged in the other unit domain group of two adjacent unit domain groups UDM to each other in the first column of the matrix form along the second direction D2.

Figure 26:
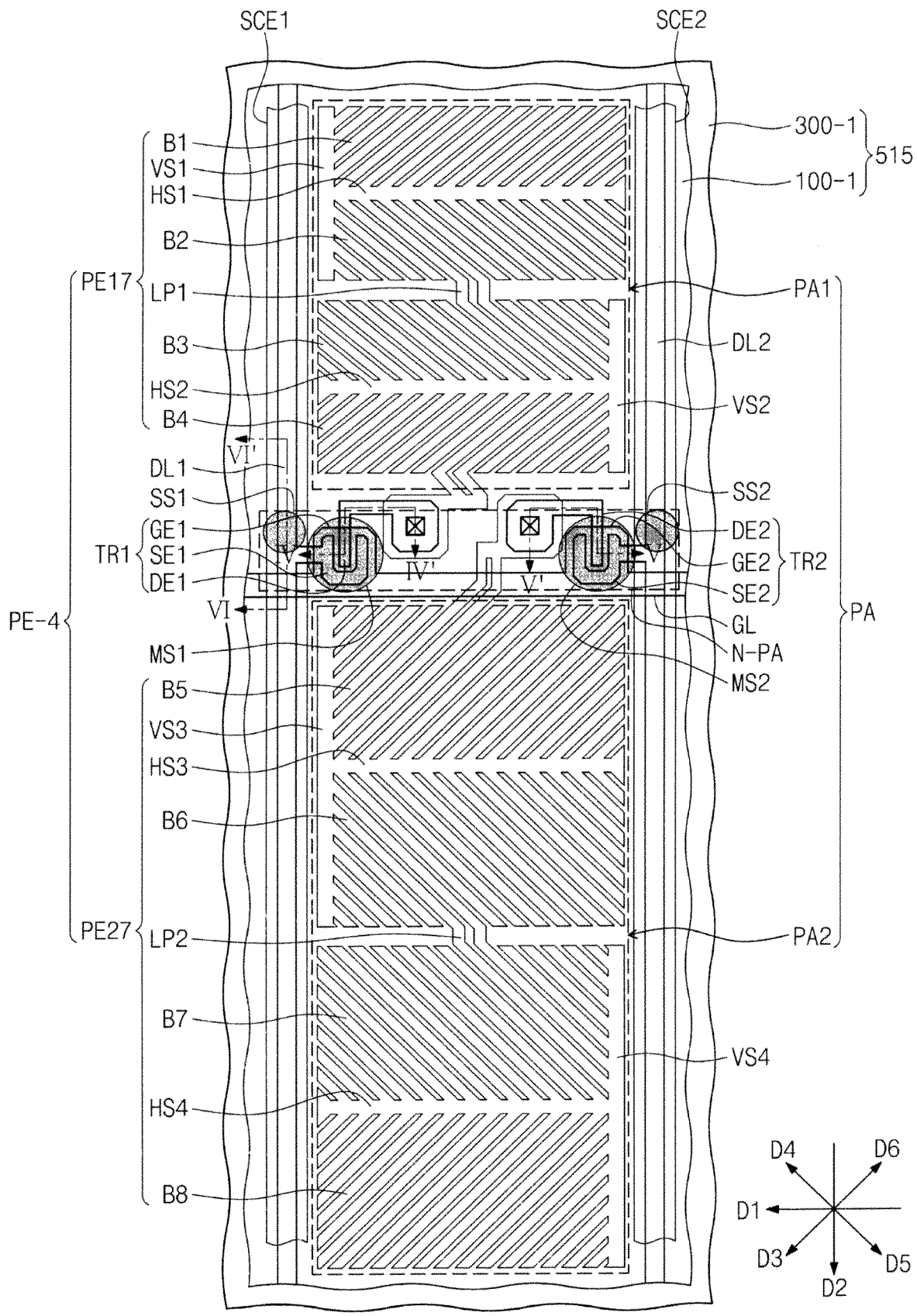
FIG. 26 is a plan view showing another exemplary embodiment of a pixel of an LCD according to the invention.
Figure 27A:
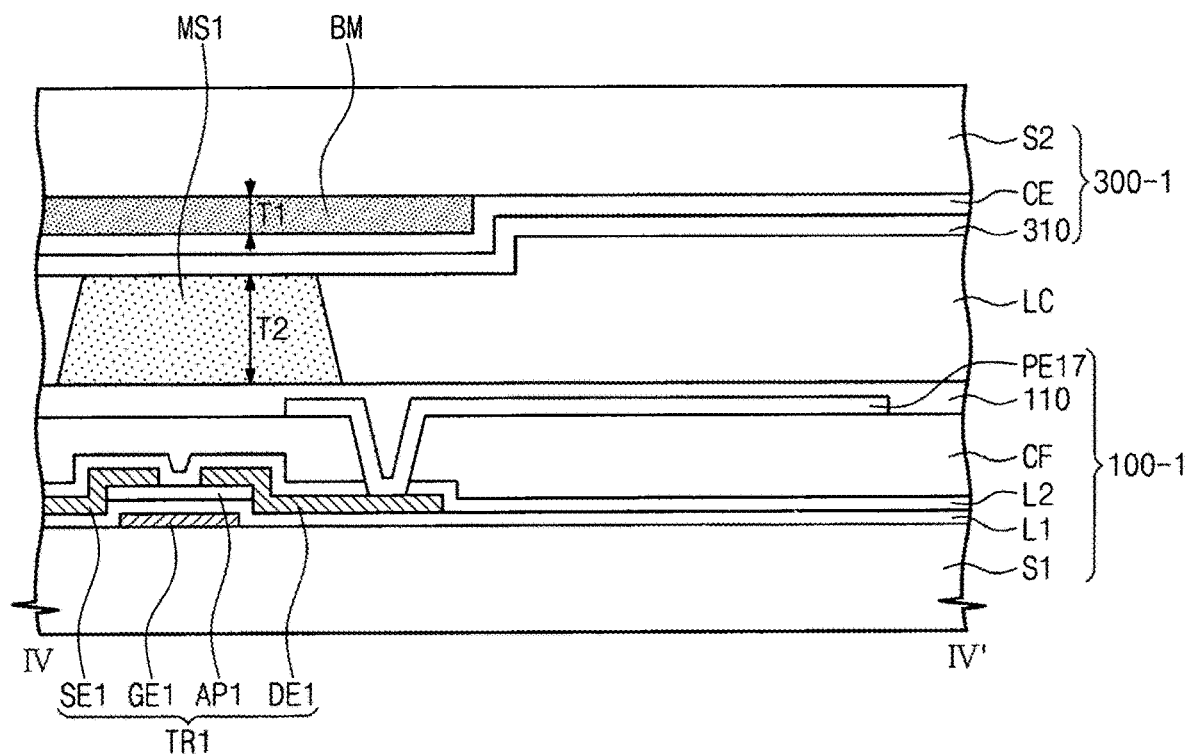
FIG. 27A is a cross-sectional view taken along line IV-IV' of FIG. 26.
Figure 27B:
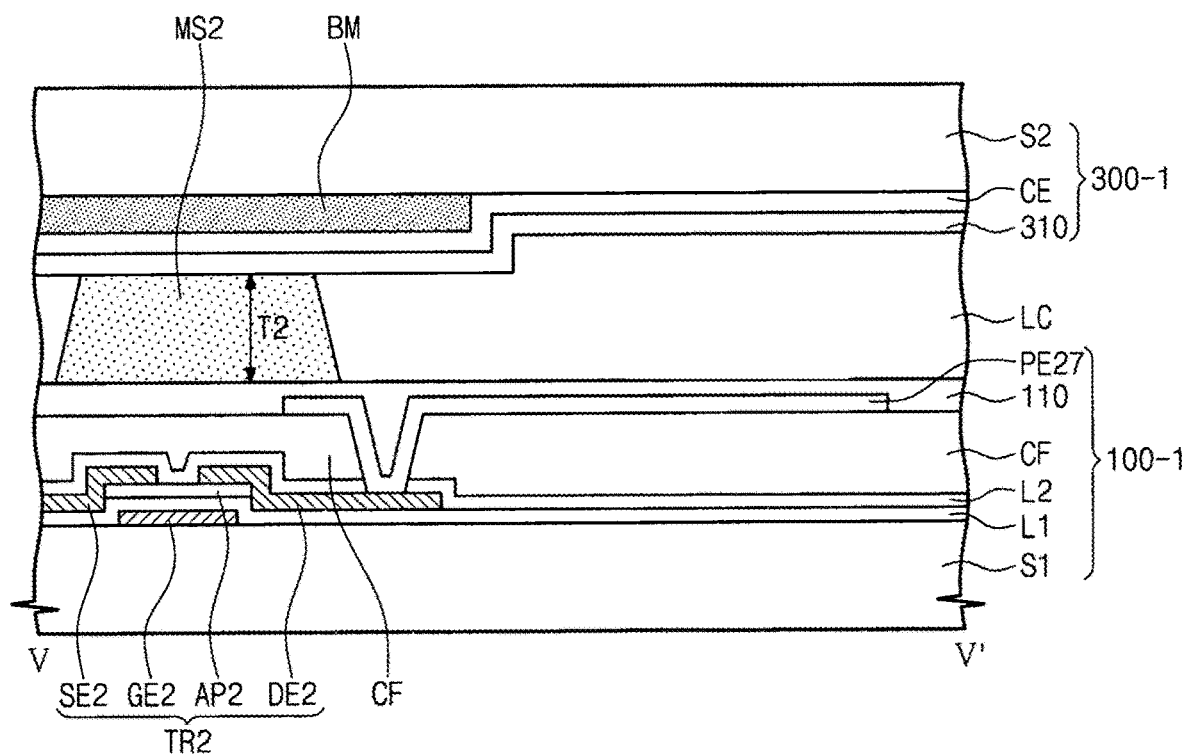
FIG. 27B is a cross-sectional view taken along line V-V' of FIG. 26.
Figure 27C:
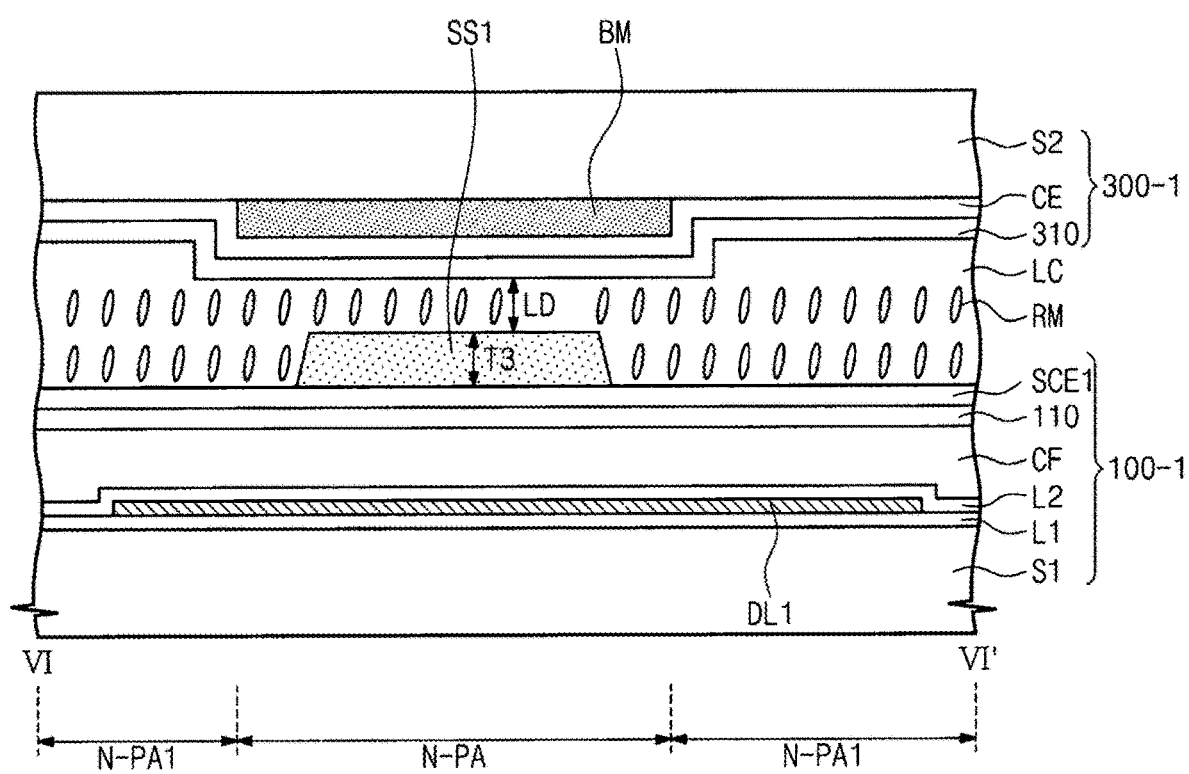
FIG. 27C is a cross-sectional view taken along line VI-VI' of FIG. 26.

FIG. 26 is a plan view showing a pixel of an LCD 515 according to another exemplary embodiment of the invention, FIG. 27A is a cross-sectional view taken along line IV-IV' of FIG. 26, FIG. 27B is a cross-sectional view taken along line V-V' of FIG. 26, and FIG. 27C is a cross-sectional view taken along line VI-VI' of FIG. 26.

Referring to FIGS. 26, 27A, 27B, and 27C, a display substrate 100-1 of the LCD 515 includes a first base substrate S1, a gate line GL, a first data line DL1, a second data line DL2, a first TFT TR1, a second TFT TR2, a pixel electrode PE-4, a color filter CF, a first alignment layer 110, a first shielding electrode SCE1, and a second shielding electrode SCE2.

The pixel electrode PE-4 includes a first sub-pixel electrode PE17 disposed in a first sub-pixel area PA1 and a second sub-pixel electrode PE27 disposed in a second sub-pixel area PA2.

The color filter CF is disposed on the second insulating layer L2 to correspond to an optical path of the liquid crystal layer LC, through which the light passes, and filters the light into the color light. The first sub-pixel electrode PE17 is disposed on the color filter CF and makes contact with the first drain electrode DE1 through a contact hole defined through the second insulating layer L2 and the color filter CF.

The second sub-pixel electrode PE27 is disposed on the color filter CF and makes contact with the second drain electrode DE2 through a contact hole defined through the second insulating layer L2 and the color filter CF.

In an exemplary embodiment, the first and second shielding electrodes SCE1 and SCE2 include a transparent conductive material, such as indium tin oxide, and are disposed to be spaced apart from the first and second sub-pixel electrodes PE17 and PE27. In the illustrated exemplary embodiment, each of the first and second shielding electrodes SCE1 and SCE2 extends in a second direction D2, the first and second shielding electrodes SCE1 and SCE2 are overlapped with the first and second data lines DL1 and DL2 in a one-to-one correspondence, and the pixel electrode PE-4 is disposed between the first and second shielding electrodes SCE1 and SCE2. The first and second shielding electrodes SCE1 and SCE2 will be described in detail later.

An opposite substrate 300-1 of the LCD 515 includes a light blocking layer BM, and the light blocking layer BM is disposed in the non-display area N-PA between the first sub-pixel area PA1 and the second sub-pixel area PA2.

The LCD 515 includes a plurality of spacers disposed between the display substrate 100-1 and the opposite substrate 300-1. In the illustrated exemplary embodiment, the spacers include a first main spacer MS1, a second main spacer MS2, a first auxiliary spacer SS1, and a second auxiliary spacer SS2. The first and second main spacers MS1 and MS2 and the first and second auxiliary spacers SS1 and SS2 are disposed in the non-pixel area N-PA to overlap with the light blocking layer BM.

In the illustrated exemplary embodiment, the first main spacer MS1 is disposed between the display substrate 100-1 and the opposite substrate 300-1 to overlap with the first TFT TR1, and the second main spacer MS2 is disposed between the display substrate 100-1 and the opposite substrate 300-1 to overlap with the second TFT TR2. In an exemplary embodiment, the first auxiliary spacer SS1 is disposed between the display substrate 100-1 and the opposite substrate 300-1 to overlap with the first data line DL1, and the second auxiliary spacer SS2 is disposed between the display substrate 100-1 and the opposite substrate 300-1 to overlap with the second data line DL2.

Each of the first and second main spacers MS1 and MS2 makes contact with the display substrate 100-1 and the opposite substrate 300-1, but each of the first and second auxiliary spacers SS1 and SS2 makes contact with one of the display substrate 100-1 and the opposite substrate 300-1 and is spaced apart from the other one of the display substrate 100-1 and the opposite substrate 300-1. As the first auxiliary spacer SS1 shown in FIG. 27C, each of the first and second auxiliary spacers SS1 and SS2 makes contact with the display substrate 100-1 and is spaced apart from the opposite substrate 300-1. In an exemplary embodiment, a distance LD between the opposite substrate 300-1 and each of the first and second auxiliary spacers SS1 and SS2 is in a range from about 0.4 µm to about 0.6 µm, for example.

Accordingly, external impacts applied to the LCD 515 are absorbed by the first and second main spacers MS1 and MS2, and then further absorbed by the first and second auxiliary spacers SS1 and SS2. That is, since the external impacts are absorbed by the spacers twice according to the structures of the spacers, the external impacts may be effectively absorbed.

As described above, the spacers are disposed in the non-display area N-PA to overlap with the light blocking layer BM, and thus a thickness of each of the spacers may be reduced by a first thickness T1 of the light blocking layer BM. In more detail, a second thickness T2 of each of the first and second main spacers MS1 and MS2 is reduced by the first thickness T1, and a third thickness T3 of each of the first and second auxiliary spacers SS1 and SS2 is reduced by the first thickness T1. When the thickness of each of the spacers is reduced by the thickness of the light blocking layer BM, the following effects are obtained.

In the illustrated exemplary embodiment, each of the spacers has a taper shape, for example. In this case, a size of bottom surface of each spacer is reduced in accordance with the reduction of the thickness of each spacer, and thus the size of each spacer may be reduced when viewed in a plan view. Therefore, the spacers may be easily disposed in the non-display area N-PA. As a result, an aperture ratio of the first and second sub-pixel areas PA1 and PA2 may be prevented from being decreased due to the spacers that infiltrate the first and second sub-pixel areas PA1 and PA2.

As described above, the light passing through the non-display area N-PA is blocked by the light blocking layer BM disposed in the non-pixel area N-PA, but the light passing through the other non-display area N-PA is required to be blocked except for the non-display area N-PA. In more detail, when the non-display area extending in the second direction D2 and being overlapped with the first and second data lines DL1 and DL2 is referred to as a sub-non pixel area N-PA1, a member or structure is required to block the light passing through the sub-non pixel area N-PA1.

To this end, the first and second shielding electrodes SCE1 and SCE2 are disposed in the sub-non pixel area N-PA1. The first shielding electrode SCE1 has a width greater than that of the first data line DL1 and is overlapped with the first data line DL1 when viewed in a plan view, and the second shielding electrode SCE2 has a width greater than that of the second data line DL2 and is overlapped with the second data lines DL2 when viewed in a plan view.

In the illustrated exemplary embodiment, an electric potential generated by the first shielding electrode SCE1 and the common electrode CE is equal to an electric potential generated by the second shielding electrode SCE2 and the common electrode CE. Accordingly, the electric field is not generated between the first shielding electrode SCE1 and the common electrode CE as shown in FIG. 27C, and therefore, the direction in which the liquid crystal molecules RM pre-tilted by the first and second alignment layers 110 and 310 are aligned may be substantially vertical to the display substrate 100-1 and the opposite substrate 300-1.

As described above, when the liquid crystal molecules RM are vertically aligned to the display substrate 100-1 and the opposite substrate 300-1, the light passing through the sub-non pixel area N-PA1 may be blocked. Thus, similar to the non-pixel area N-PA defined by the light blocking layer BM, the areas in which the first and second shielding electrodes SCE1 and SCE2 are disposed may serve as areas to block the light. As a result, the light blocking layer BM does not need to be disposed in the sub-non pixel area N-PA1.

Accordingly, as described with reference to FIGS. 1A to 1C, although at least one of the first and second shielding electrodes SCE1 and SCE2 enter the first and second sub-pixel areas PA1 and PA2 due to the misalignment generated when the display substrate 100-1 and the opposite substrate 300-1 are curved, the aperture ratio of the first and second sub-pixel areas PA1 and PA2 may be prevented from being lowered since the first and second shielding electrodes SCE1 and SCE2 have the light transmittance.

Figure 28:
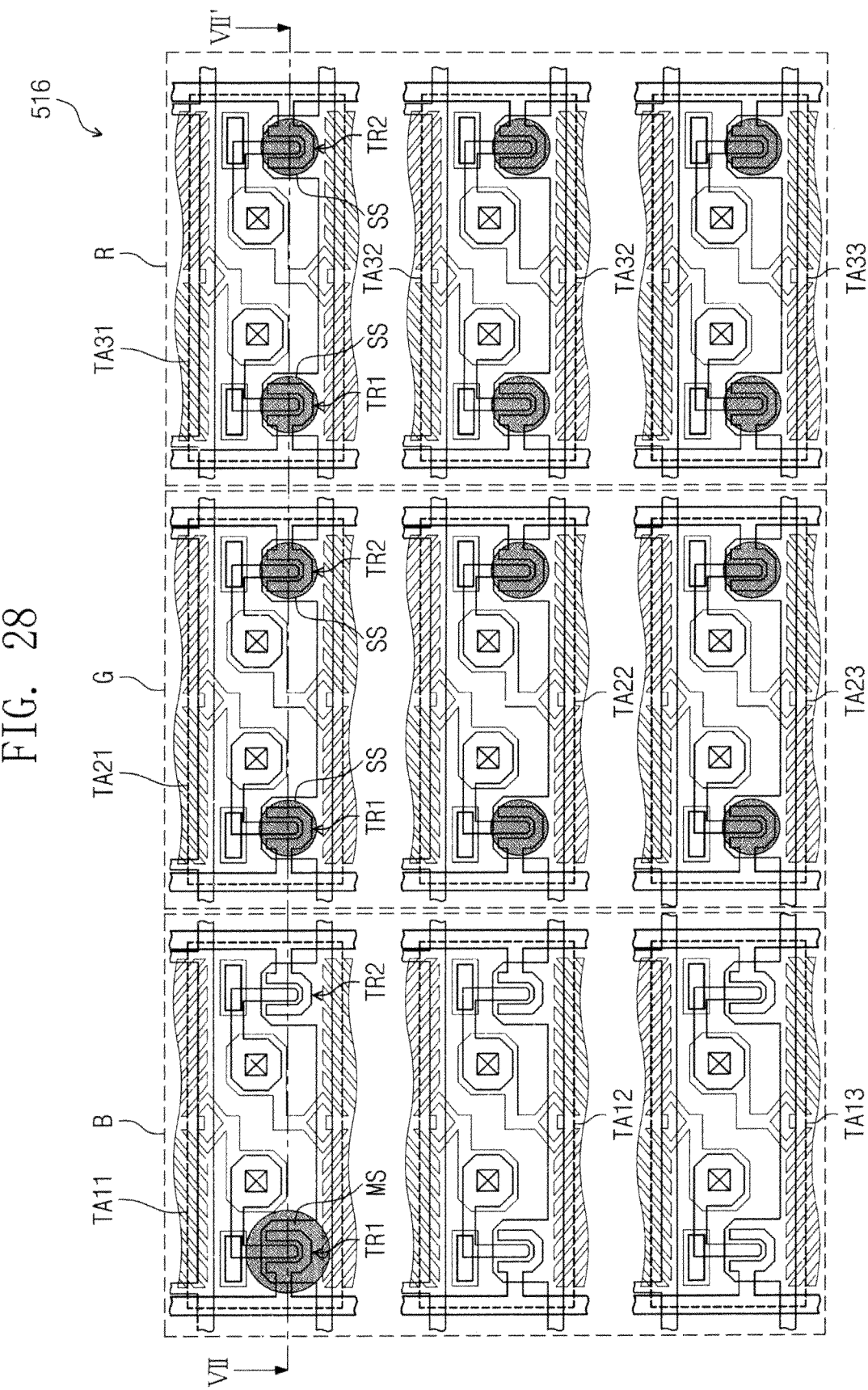
FIG. 28 is a plan view showing another exemplary embodiment of a position relation between a thin film transistor ("TFT"), a color pixel, and a spacer in an LCD according to the invention.
Figure 29:
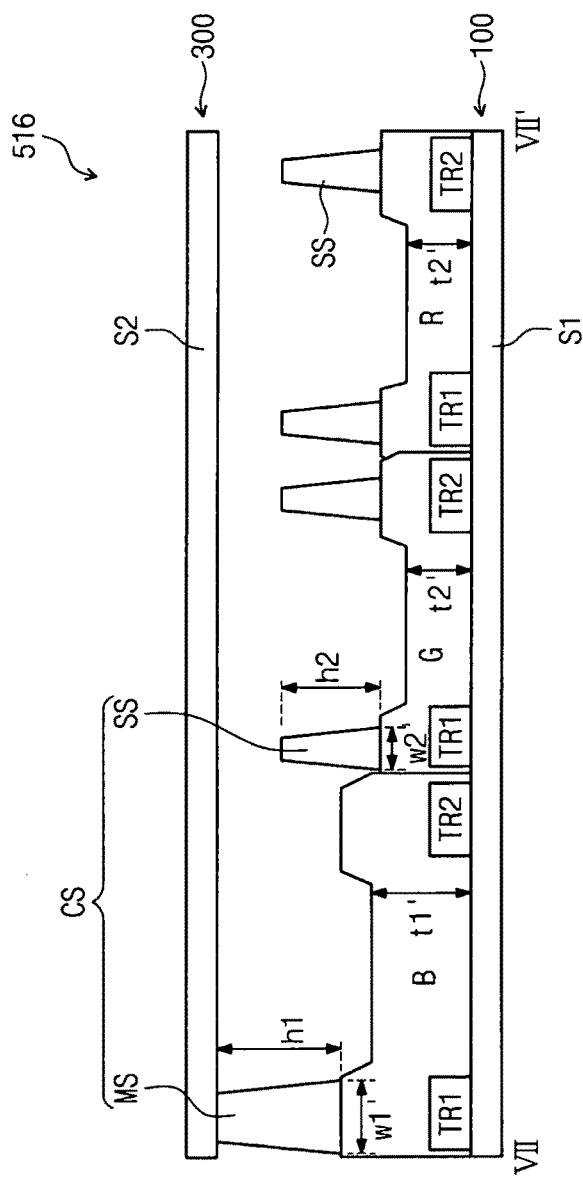
FIG. 29 is a cross-sectional view taken along line VII-VII' of FIG. 28.

FIG. 28 is a plan view showing a position relation between a TFT, a color pixel, and a spacer in an LCD according to another exemplary embodiment of the invention and FIG. 29 is a cross-sectional view taken along line VII-VII' of FIG. 28.

FIG. 28 shows nine pixels arranged in three rows by three columns of the LCD 516, and only transistor areas TA11, TA12, TA13, TA21, TA22, TA23, TA31, TA32, and TA33 each including first and second TFTs TR1 and TR2 are disposed are shown in each pixel, for example. Therefore, nine transistor areas TA11, TA12, TA13, TA21, TA22, TA23, TA31, TA32, and TA33 arranged in three rows by three columns have been shown in FIG. 28.

Referring to FIG. 28, blue, green, and red color pixels B, G, and R are sequentially arranged in the same row and color pixels having the same color are arranged in the same column. That is, the blue color pixel B is disposed in the transistor areas TA11, TA12, and TA13, the green color pixel G is disposed in the transistor areas TA21, TA22, and TA23, and the red color pixel R is disposed in the transistor areas TA31, TA32, and TA33.

In an exemplary embodiment, the first and second TFTs TR1 and TR2 are disposed in each of the transistor areas TA11 to TA33. According to another exemplary embodiment, one or three or more TFTs may be disposed in each of the transistor areas TA11 to TA33.

As shown in FIG. 29, the LCD 516 includes a column spacer CS disposed on the display substrate 100. In an exemplary embodiment, the column spacer CS includes a main spacer MS and a sub-spacer SS. The main spacer MS is disposed in the transistor area TA11 in which the blue color pixel B is disposed, and the sub-spacer SS is disposed in the transistor areas TA21, TA22, TA23, TA31, TA32, and TA33 each in which the green or red color pixel G or R is disposed.

The main spacer MS has a first height h1 and a first width w1' and the sub-spacer SS has a second height h2 smaller than the first height h1. Accordingly, an upper surface of the main spacer MS makes contact with the opposite substrate 300, but an upper surface of the sub-spacer SS is spaced apart from the opposite substrate 300 by a predetermined distance. In an exemplary embodiment, a difference in height between the main spacer MS and the sub-spacer SS is about 0.2 μm, for example. In an exemplary embodiment, the sub-spacer SS has a second width w2' equal to or smaller than the first width w1'.

In an exemplary embodiment, the blue color pixel B has a first thickness t1', but the green and red color pixels G and R have a second thickness t2' smaller than the first thickness t1. In an exemplary embodiment, a difference in thickness between the blue color pixel B and each of the green and red color pixels G and R is about 0.2 μm, for example.

When a desired step difference between the upper surface of the main spacer MS and the upper surface of the sub-spacer SS is about 0.4 μm, for example, the desired step difference between the upper surface of the main spacer MS and the upper surface of the sub-spacer SS may be secured by adjusting the height difference between the main spacer MS and the sub-spacer SS and the thickness difference between the blue color pixel B and each of the green and red color pixels G and R. As described above, when the blue color pixel B is disposed on the main spacer MS, a process time required to provide the column spacer CS on the display substrate 100 may be shortened and a process required to provide the column spacer CS on the display substrate 100 may be simplified.

In an another exemplary embodiment, when the thickness of the blue color pixel B is equal to the thickness of each of the green and red color pixels G and R, the position of the main spacer MS may be disposed in the areas of the green and red color pixels G and R without being limited to the area of the blue color pixel B.

For the convenience of explanation, the layers between the first base substrate S1 and the color filter CF and the layers disposed on the second base substrate S2 of the opposite substrate 300 are omitted from FIG. 29.

As shown in FIG. 29, the areas in which the first and second TFTs TR1 and TR2 are disposed are relatively higher than the areas in which the first and second TFTs TR1 and TR2 are not disposed in each of the transistor areas TA11 to TA33. The main and sub spacers MS and SS are disposed in areas corresponding to the areas in which the first and second TFTs TR1 and TR2 are disposed, i.e., an area in which first or second gate electrode GE1 or GE2 is disposed, in each of the transistor areas TA11 to TA33 to face the first or second gate electrode GE1 or GE2.

In an exemplary embodiment, the main spacer MS is disposed on the first TFT TR1 of one transistor area TA11, in which the blue color pixel B is disposed, among three successive transistor areas TA11, TA12, and TA13 in the column direction. That is, the number of the main spacers MS disposed in the pixels arranged in three rows by three columns is one.

In an exemplary embodiment, the sub-spacer SS is disposed on the first and second TFTs TR1 and TR2 of each of six transistor areas TA21, TA22, TA23, TA31, TA32, and TA33 each in which the green and red color pixels G and R are disposed. That is, the number of the sub-spacers SS disposed in the pixels arranged in three rows by three columns is twelve.

In an exemplary embodiment, the sub-spacers SS have the same height in FIG. 29, but the height difference may exist between the sub-spacers SS.

Figure 30:
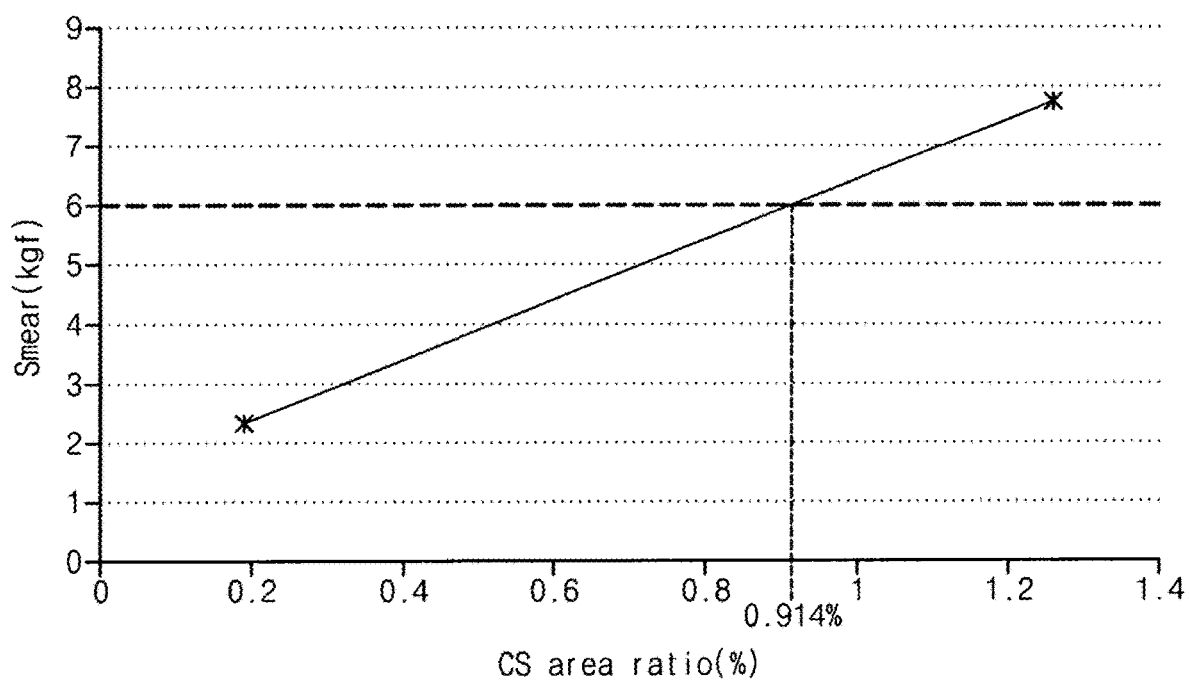
FIG. 30 is a graph showing a relation between a smear and an area ratio of a column spacer.

FIG. 30 is a graph showing a relation between a smear and an area ratio of a column spacer. In FIG. 30, an x-axis represents an area ratio in terms of percentage (%) of the column spacer CS and a y-axis represents a size of smear in terms of kilogram-force (kgf). Here, the area ratio (%) of the column spacer CS indicates a ratio of a contact area between the column spacer CS and the display substrate 100 to the display area of the LCD 516 shown in FIG. 28.

Referring to FIG. 30, as the area ratio (%) of the column spacer CS increases, the size of the smear (kgf) applied to the LCD 516 increases. To secure a smear margin of about 6 kgf or more, the LCD has the area ratio of the column spacer CS of about 0.914% or more. In this case, a variation in cell gap, i.e., reduction of the cell gap, does not occur until the size of smear reaches about 6 kgf, and thus the LCD is normally operated.

Therefore, the column spacer CS may be provided to have the area ratio of about 0.914% in the illustrated exemplary embodiment.

In another exemplary embodiment, to secure the smear margin of about 7 kgf, the LCD has the area ratio of the column spacer CS in a range from 1% to 1.2%.

Figure 31:
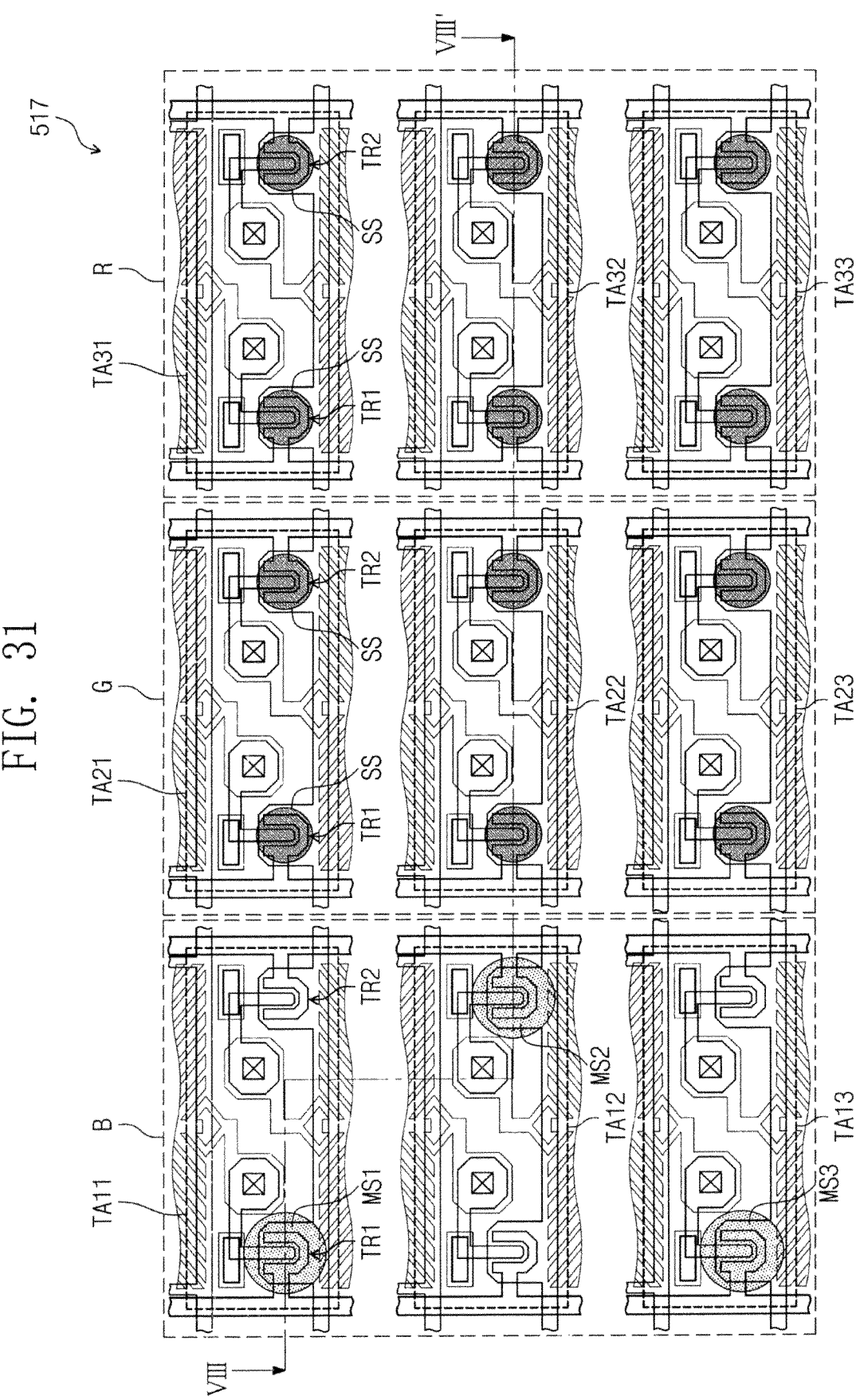
FIG. 31 is a plan view showing another exemplary embodiment of a position relation between a TFT, a color pixel, and a spacer in an LCD according to the invention.
Figure 32:
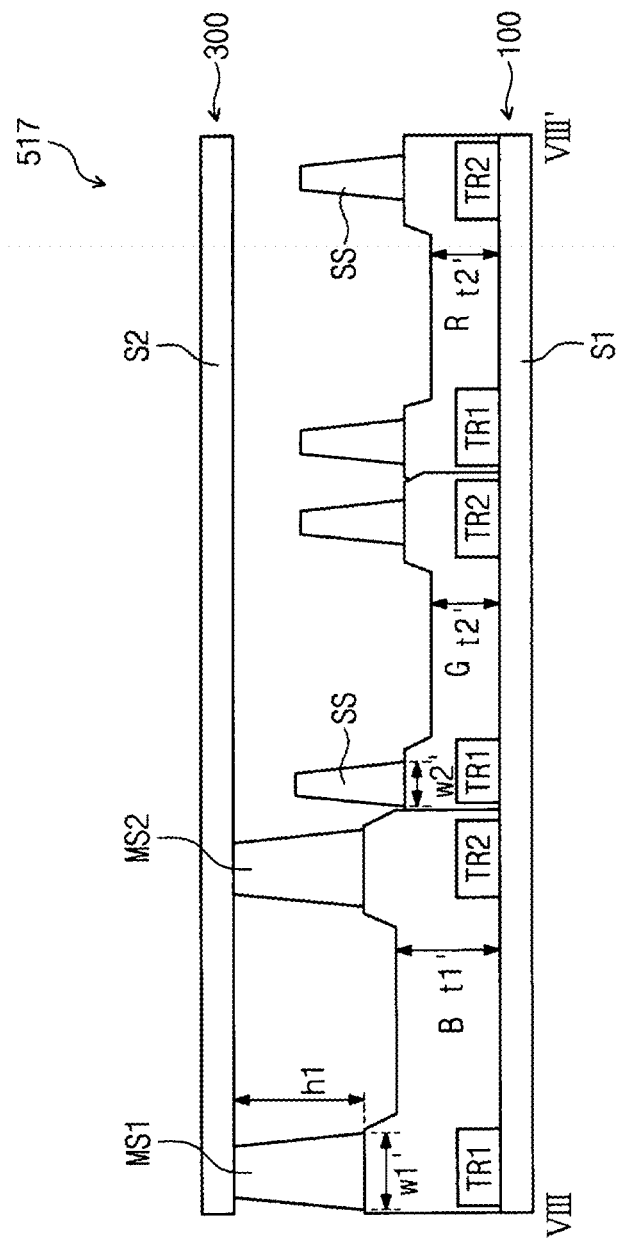
FIG. 32 is a cross-sectional view taken along line VIII-VIII' of FIG. 31.

FIG. 31 is a plan view showing a position relation between a TFT, a color pixel, and a spacer in an LCD according to another exemplary embodiment of the invention and FIG. 32 is a cross-sectional view taken along line VIII-VIII' of FIG. 31.

Referring to FIGS. 31 and 32, the blue color pixel B is disposed in the transistor areas TA11, TA12, and TA13, the green color pixel G is disposed in the transistor areas TA21, TA22, and TA32, and the red color pixel R is disposed in the transistor areas TA31, TA32, and TA33. The first and second TFTs TR1 and TR2 are disposed in each of the transistor areas TA11 to TA33.

Referring to FIG. 32, the LCD 517 includes a column spacer disposed on the display substrate 100. In an exemplary embodiment, the column spacer includes first, second, and third main spacers MS1, MS2, and MS3 and a plurality of sub-spacers SS. The first to third main spacers MS1 to MS3 are disposed in the transistor areas TA11, TA12, and TA13 in which the blue color pixel B is disposed, and the sub-spacers SS are disposed in the transistor areas TA21, TA22, TA23, TA31, TA32, and TA33 in which the green and red color pixels G and R are disposed.

The first to third main spacers MS1 to MS3 have a first height h1 and a first width w1' and each of the sub-spacers SS has a second height h2 smaller than the first height h1.

The sub-spacers SS have a second width w2' equal to or smaller than the first width w1'.

As shown in FIG. 32, the areas in which the first and second TFTs TR1 and TR2 are disposed are relatively higher than the areas in which the first and second TFTs TR1 and TR2 are not disposed in each of the transistor areas TA11 to TA33.

The first main spacer MS1 is disposed in the area of the transistor area TA11, in which the first TFT TR1 is disposed, the second main spacer MS2 is disposed in the area of the transistor area TA12, in which the second TFT TR2 is disposed, and the third main spacer MS3 is disposed in the area of the transistor area TA13, in which the first TFT TR1 is disposed. That is, the first, second, and third main spacers MS1, MS2, and MS3 are arranged in a zigzag shape when viewed in a plan view. Is an exemplary embodiment, the number of the main spacers disposed in the pixels arranged in three rows by three columns may be three. As described above, as the number of the main spacers MS1, MS2, and MS3 disposed on the LCD 517 increases, a relatively high smear margin may be secured.

The sub-spacers SS are disposed in areas, in which the first and second TFTs TR1 and TR2 are disposed, among the transistor areas TA21 to TA33. That is, the number of the sub-spacers SS disposed in the pixels arranged in three rows by three columns may be twelve.

Figure 33:
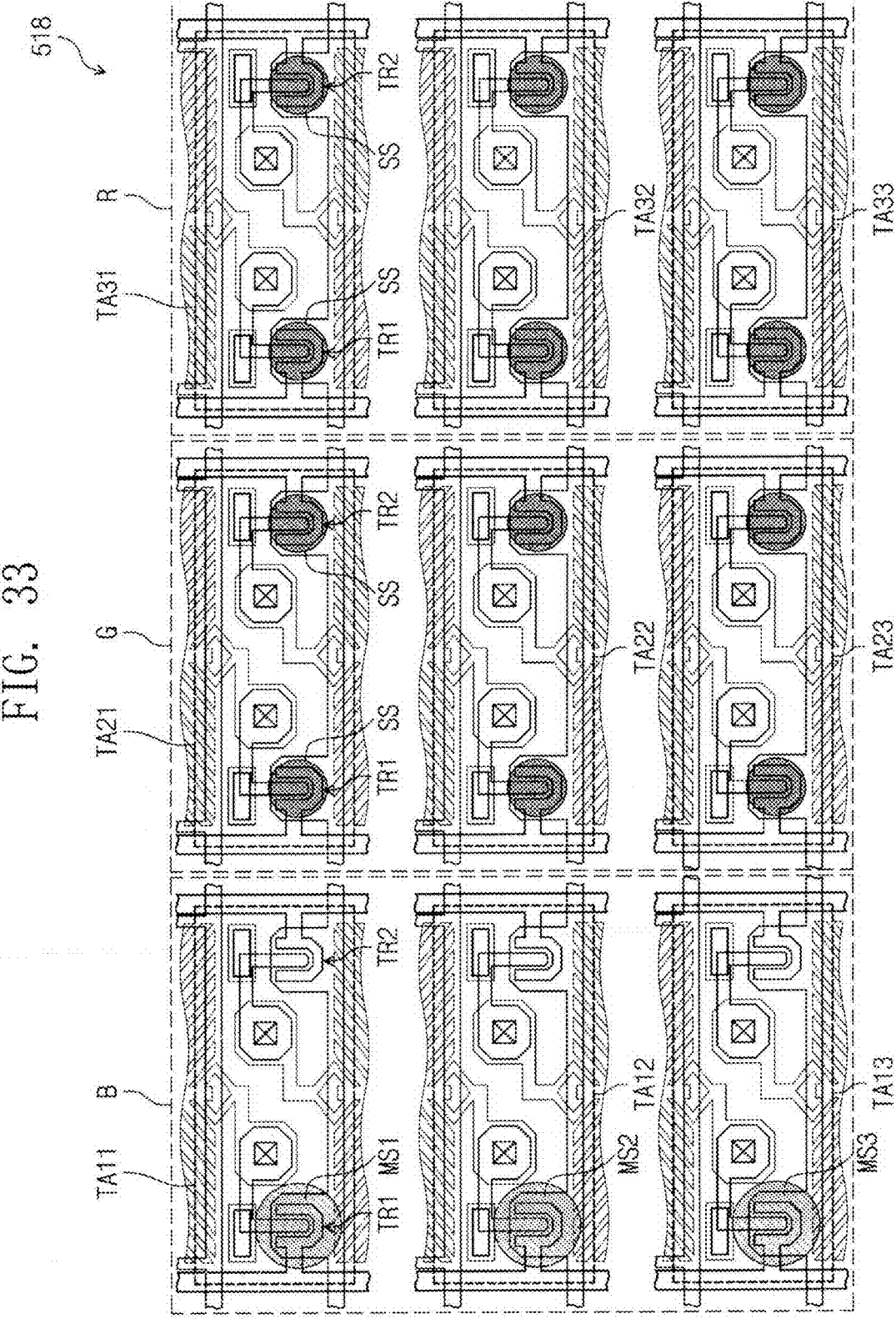
FIG. 33 is a plan view showing another exemplary embodiment of a position relation between a TFT, a color pixel, and a spacer in an LCD according to the invention.

FIG. 33 is a plan view showing a position relation between a TFT, a color pixel, and a spacer in an LCD according to another exemplary embodiment of the invention.

Referring to FIG. 33, an LCD 518 includes a column spacer disposed on the display substrate. In an exemplary embodiment, the column spacer includes first, second, and third main spacers MS1, MS2, and MS3 and a plurality of sub-spacers SS. The first to third main spacers MS1 to MS3 are disposed in the transistor areas TA11, TA12, and TA13 in which the blue color pixel B is disposed, and the sub-spacers SS are disposed in the transistor area TA21, TA22, TA23, TA31, TA32, and TA33 in which the green and red color pixels G and R are disposed.

The first main spacer MS1 is disposed in the area of the transistor area TA11, in which the first TFT TR1 is disposed, the second main spacer MS2 is disposed in the area of the transistor area TA12, in which the second TFT TR2 is disposed, and the third main spacer MS3 is disposed in the area of the transistor area TA13, in which the first TFT TR1 is disposed.

That is, the first, second, and third main spacers MS1, MS2, and MS3 are arranged in a straight line shape when viewed in a plan view. In an exemplary embodiment, the number of the main spacers disposed in the pixels arranged in three rows by three columns may be three.

The sub-spacers SS are disposed in areas, in which the first and second TFTs TR1 and TR2 are disposed, among the transistor areas TA21 to TA33. That is, the number of the sub-spacers SS disposed in the pixels arranged in three rows by three columns may be twelve.

Although the illustrated exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A liquid crystal display comprising:
a display substrate;

an opposite substrate which faces the display substrate, is coupled to the display substrate; and
a liquid crystal layer disposed between the display substrate and the opposite substrate,
wherein the display substrate comprises:
a gate line extended in a first direction;
a first data line extended in a second direction crossing the first direction;
a first thin film transistor connected to the gate line and the first data line; and
a first sub-pixel electrode connecting to the first thin film transistor, wherein the first sub-pixel electrode comprises:
a first vertical stem portion extended in the second direction;
a first horizontal stem portion extended in a direction crossing the first vertical stem portion, connected to the first vertical stem portion;
a second vertical stem portion parallel to the first vertical stem portion and apart from the first vertical stem portion in the first direction;
a second horizontal stem portion extended in a direction crossing the second vertical stem portion, connected to the second vertical stem portion;
a first branch portion connected to at least one of the first vertical stem portion and the first horizontal stem portion;
a second branch portion disposed between the first horizontal stem portion and the second horizontal stem portion, the second branch portion connected to at least one of the first vertical stem portion and the first horizontal stem portion;
a third branch portion disposed between the first horizontal stem portion and the second horizontal stem portion, the third branch portion connected to at least one of the second vertical stem portion and the second horizontal stem portion;
a fourth branch portion disposed apart from the third branch portion with the second horizontal stem portion therebetween, the fourth branch portion connected to at least one of the second vertical stem portion and the second horizontal stem portion; and
a domain connection portion apart from the first vertical stem portion and the second vertical stem portion, and the domain connection portion physically and directly connected to the second branch portion and the third branch portion.

2. The liquid crystal display of claim 1, wherein the opposite substrate comprises a common electrode that generates an electric field in cooperation with the first sub-pixel electrode.

3. The liquid crystal display of claim 2, wherein a plurality of domains is defined in a first sub-pixel area in which the first sub-pixel electrode is disposed,
wherein the domains are arrayed in the second direction,
wherein liquid crystal alignment directions, in which the liquid crystal molecules are aligned in the plurality of domains in response to the electric field, are different from each other in the plan view.

4. The liquid crystal display of claim 3, wherein the display substrate further comprises:
a second data line parallel to the first data line;
a second thin film transistor connected to the gate line and the second data line; and
a second sub-pixel electrode disposed in a second sub-pixel area, disposed between the first data line and the second data line, and connected to the second thin film transistor, and
wherein the second sub-pixel electrode comprises a third vertical stem portion and a fourth vertical stem portion, and
wherein the first data line is configured to apply a first data signal to the first sub-pixel electrode, and the second data line is configured to apply a second data signal to the second sub-pixel electrode.

5. The liquid crystal display of claim 4, wherein the plurality of the domains comprises first, second, third, and fourth domains sequentially arranged in the second direction,
wherein the first, second, third, fourth branch portions are each provided in a plural,
wherein the first, second, third, and fourth branch portions are respectively disposed in the first, second, third, and fourth domains,
the first, second, third, and fourth branch portions and the first, second, third, and fourth domains are defined in the first sub-pixel.

6. The liquid crystal display of claim 5, wherein
at least one first branch portion among the first branch portions has a width greater than a width of remaining first branch portions among the first branch portions,
at least one second branch portion among the second branch portions has a width greater than a width of remaining second branch portions among the second branch portions,
at least one third branch portion among the third branch portions has a width greater than a width of remaining third branch portions among the third branch portions, and
at least one fourth branch portion among the fourth branch portions has a width greater than a width of remaining fourth branch portions among the fourth branch portions.

7. The liquid crystal display of claim 5, wherein
the first horizontal stem portion is connected to the first and second branch portions, and is disposed between the first domain and the second domain; and
the second horizontal stem portion is connected to the third and fourth branch portions, and is disposed between the third domain and the fourth domain.

8. The liquid crystal display of claim 7, wherein
the first branch portions are symmetrical with the second branch portions with respect to the first horizontal stem portion in the plan view, and
the third branch portions are symmetrical with the fourth branch portions with respect to the second horizontal stem portion in the plan view.

9. The liquid crystal display of claim 7, wherein
the first and second branch portions have widths, respectively, that become smaller as the first and second branch portions are farther away from the first horizontal stem portion, and
the third and fourth branch portions have widths, respectively, that become smaller as the third and fourth branch portions are farther away from the second horizontal stem portion.

10. The liquid crystal display of claim 5, wherein the domain connection portion is disposed at a center portion of a boundary area between the second domain and the third domain.

11. The liquid crystal display of claim 5, wherein the domain connection portion is disposed at each of edges of a boundary area between the second domain and the third domain.

12. The liquid crystal display of claim 5, wherein the second branch portions, the domain connection portion, and the third branch portions are connected to each other in a zigzag shape in the plan view.

13. The liquid crystal display of claim 12, wherein
a connection angle between the domain connection portion and the second branch portions is in a range from about 60 degrees to about 120 degrees in the plan view, and
a connection angle between the domain connection portion and the third branch portions is in a range from about 60 degrees to about 120 degrees in the plan view.

14. The liquid crystal display of claim 13, wherein the second branch portions, and third branch portions connected to the second branch portions by the domain connection portion, extend in a same direction.

15. The liquid crystal display of claim 5, wherein
the first vertical stem portion is connected to edges of the first branch portions and edges of the second branch portions, and
the second vertical stem portion is connected to edges of the third branch portions and edges of the fourth branch portions.

16. The liquid crystal display of claim 5, wherein
the first vertical stem portion is spaced apart from edges of the first branch portions and edges of the second branch portions and connected to the first and second branch portions, and
the second vertical stem portion is spaced apart from edges of the third branch portions and edges of the fourth branch portions and connected to the third and fourth branch portions.

17. The liquid crystal display of claim 16, wherein
a direction in which the first branch portions disposed at one side of the first vertical stem portion extend is different from a direction in which the first branch portions disposed at the other side of the first vertical stem portion extend in the plan view, and
a direction in which the second branch portions disposed at one side of the first vertical stem portion extend is different from a direction in which the second branch portions disposed at the other side of the first vertical stem portion extend in the plan view.

18. The liquid crystal display of claim 17, wherein
the display substrate or the opposite substrate further comprises a light blocking member to block a light,
the light blocking member is overlapped with a portion of the first branch portions, which extends in a different direction from remaining first branch portions of the first branch portions,
the light blocking member is overlapped with a portion of the second branch portions, which extends in a different direction from remaining second branch portions of the second branch portions,
the light blocking member is overlapped with a portion of the third branch portions, which extends in a different direction from remaining third branch portions of the third branch portions, and
the light blocking member is overlapped with a portion of the fourth branch portions, which extends in a different direction from remaining fourth branch portions of the fourth branch portions.

19. The liquid crystal display of claim 7, wherein the first sub-pixel electrode further comprises a stem connection portion disposed in at least one of a position at which the first horizontal stem portion crosses the first vertical stem portion and a position at which the second horizontal stem portion crosses the second vertical stem portion.

20. The liquid crystal display of claim 5, wherein at least one of the first vertical stem portion and the second vertical stem portion has a width that becomes smaller in a direction closer to an edge thereof from a center portion thereof.

21. The liquid crystal display of claim 7, wherein
the first horizontal stem portion has a width that becomes smaller as the first horizontal stem portion become farther from the first vertical stem portion, and
the second horizontal stem portion has a width that becomes smaller as the second horizontal stem portion become farther from the second vertical stem portion.

22. The liquid crystal display of claim 5, wherein the first sub-pixel electrode further comprises:
a first branch connection portion extending in the direction in which the display substrate is curved to connect edges of the second branch portions; and
a second branch connection portion extending in the direction in which the display substrate is curved to connect edges of the third branch portions.

23. The liquid crystal display of claim 5, wherein
a direction in which each of the first branch portions extends crosses a direction in which each of the second branch portions extends in the plan view, and
a direction in which each of the third branch portions extends crosses a direction in which each of the fourth branch portions extends in the plan view.

24. The liquid crystal display of claim 23, wherein directions, in which the first branch portions, the second branch portions, the third branch portions, and the fourth branch portions extend, define an angle of about 45 degrees with first the direction in the plan view.

25. The liquid crystal display of claim 5, wherein
a direction in which each of the first branch portions extends crosses a direction in which each of the third branch portions extends in the plan view, and
a direction in which each of the second branch portions extends crosses a direction in which each of the fourth branch portions extends in the plan view.

26. The liquid crystal display of claim 25, wherein directions, in which the first branch portions, the second branch portions, the third branch portions, and the fourth branch portions extend, define an angle of about 45 degrees with first the direction in the plan view.

27. The liquid crystal display of claim 5, wherein the first sub-pixel electrode further comprises:
sub-branch portions connected to one of the first and the second vertical stem portions,
wherein each branch portion among the first to fourth branch portions has a first width, and
wherein each sub-branch portion among the sub-branch portions has a second width smaller than the first width.

28. The liquid crystal display of claim 27, wherein the first sub-pixel electrode further comprises:
first sub-branch portions disposed in the first domain, each first sub-branch portion having the second width and extending in the direction in which the first branch portions extend;
second sub-branch portions disposed in the second domain, each second sub-branch portions having the second width and extending in the direction in which the second branch portions extend;

third sub-branch portions disposed in the third domain, each third sub-branch portion having the second width and extending in the direction in which the third branch portions extend; and fourth sub-branch portions disposed in the fourth domain, each fourth sub-branch portion having the second width and extending in the direction in which the fourth branch portions extend, and each of the first branch portions, each of the second branch portions, each of the third branch portions, and each of the fourth branch portions have the first width.

29. The liquid crystal display of claim 28, wherein
the first sub-branch portions are symmetrical with the second sub-branch portions with respect to the first horizontal stem portion in the plan view, and
the third sub-branch portions are symmetrical with the fourth sub-branch portions with respect to the second horizontal stem portion in the plan view.

30. The liquid crystal display of claim 27, wherein the first sub-pixel electrode further comprises:
first sub-branch portions disposed in the first domain and extending in a direction in which the first branch portions extend, at least a portion of the first sub-branch portions having the second width;
second sub-branch portions disposed in the second domain and extending in a direction in which the second branch portions extend, at least a portion of the second sub-branch portions having the second width;
third sub-branch portions disposed in the third domain and extending in a direction in which the third branch portions extend, at least a portion of the third sub-branch portions having the second width; and
fourth sub-branch portions disposed in the fourth domain and extending in a direction in which the fourth branch portions extend, at least a portion of the fourth sub-branch portions having the second width, and
wherein each of the first branch portions, each of the second branch portions, each of the third branch portions, and each of the fourth branch portions have the first width.

31. The liquid crystal display of claim 27, wherein the first sub-pixel electrode further comprises:
first sub-branch portions disposed in the first domain and extending in a direction in which the first branch portions extend, each of the first sub-branch portions having a width smaller than the first width;
second sub-branch portions disposed in the second domain and extending in a direction in which the second branch portions extend, each of the second sub-branch portions having a width smaller than the first width;
third sub-branch portions disposed in the third domain and extending in a direction in which the third branch portions extend, each of the third sub-branch portions having a width smaller than the first width; and
fourth sub-branch portions disposed in the fourth domain and extending in a direction in which the fourth branch portions extend, each of the fourth sub-branch portions having a width smaller than the first width, and
wherein each of the first branch portions, each of the second branch portions, each of the third branch portions, and each of the fourth branch portions have the first width.

32. The liquid crystal display of claim 4, further comprising:
a light blocking layer disposed on the display substrate or the opposite substrate to block a light; and
a plurality of spacers disposed between the display substrate and the opposite substrate, wherein the light blocking layer and the plurality of spacers are disposed in a non-pixel area defined between the first sub-pixel area and the second sub-pixel area.

33. The liquid crystal display of claim 32, wherein the plurality of spacers is overlapped with the light blocking layer in the non-pixel area in the plan view.

34. The liquid crystal display of claim 33, wherein the plurality of spacers comprises:
a main spacer which contacts with the display substrate and the opposite substrate; and
a sub-spacer which contacts one of the display substrate and the opposite substrate and is spaced apart from the other of the display substrate and the opposite substrate.

35. The liquid crystal display of claim 33, wherein the display substrate further comprises a plurality of shielding electrodes, and each of the plurality of shielding electrodes generates a same electric potential with the common electrode and is spaced apart from the pixel electrode.

36. The liquid crystal display of claim 35, wherein each of the plurality of shielding electrodes extends substantially perpendicular to the first direction.

37. The liquid crystal display of claim 5, wherein the display substrate further comprises:
a plurality of column spacers including a main spacer and a sub-spacer,
wherein
the main spacer maintains a cell gap between the display substrate and the opposite substrate, and
the sub-spacer is spaced apart from the opposite substrate by a predetermined distance.

38. The liquid crystal display of claim 37, wherein the display substrate further comprises a red color pixel, a green color pixel, and a blue color pixel disposed to correspond to the plurality of pixel areas, and the blue color pixel has a thickness larger than thicknesses of the green color pixel and the red color pixel, respectively.

39. The liquid crystal display of claim 38, wherein the main spacer is disposed on the blue color pixel and the sub-spacer is disposed on each of the green color pixel and the red color pixel.

40. The liquid crystal display of claim 38, wherein the main spacer has a height higher than a height of the sub-spacer.

41. The liquid crystal display of claim 38, wherein the main spacer has a width greater than a width of the sub-spacer.

42. The liquid crystal display of claim 37, wherein a ratio of a contact area between the column spacer and the display substrate to the display area is more than about 0.914 percent.

43. The liquid crystal display of claim 1, wherein
the display substrate further comprises a first alignment layer to align the liquid crystal molecules to be inclined, and
the opposite substrate comprises a second alignment layer to align the liquid crystal molecules to be inclined.

44. The liquid crystal display of claim 43, wherein a direction in which the liquid crystal molecules are aligned by the first alignment layer in each of the plurality of domains is the same as a direction in which the liquid crystal molecules are aligned by the second alignment layer in each of the plurality of domains.

45. The liquid crystal display of claim 43, wherein the liquid crystal molecules are configured to operate in a super vertical alignment mode.

* * * * *